(12) United States Patent
Aoyama et al.

(10) Patent No.: US 7,936,942 B2
(45) Date of Patent: May 3, 2011

(54) IMAGE PROCESSING APPARATUS, IMAGE PROCESSING METHOD, RECORDING MEDIUM, AND PROGRAM

(75) Inventors: Koji Aoyama, Saitama (JP); Xavier Michel, Chiba (JP)

(73) Assignee: Sony Corporation, Tokyo (JP)

( * ) Notice: Subject to any disclaimer, the term of this patent is extended or adjusted under 35 U.S.C. 154(b) by 1097 days.

(21) Appl. No.: 11/680,783

(22) Filed: Mar. 1, 2007

(65) Prior Publication Data
US 2008/0317373 A1 Dec. 25, 2008

(30) Foreign Application Priority Data

Mar. 6, 2006 (JP) .............................. P2006-058957

(51) Int. Cl.
G06K 9/40 (2006.01)
(52) U.S. Cl. ....................................... 382/269; 382/266
(58) Field of Classification Search .................. 382/269, 382/266, 267, 268, 254, 190, 195, 199
See application file for complete search history.

(56) References Cited

U.S. PATENT DOCUMENTS
6,195,445 B1 * 2/2001 Dubuisson-Jolly et al. .. 382/107
2005/0041871 A1 2/2005 Abe FOREIGN PATENT DOCUMENTS
| AU | 745562 | 6/2000 |
| JP | 04-088582 | 3/1992 |
| JP | 06-237375 | 8/1994 |
| JP | 07-115567 | 5/1995 |
| JP | 08-046777 | 2/1996 |
| JP | 09-050516 | 2/1997 |
| JP | 2000-099713 | 4/2000 |
| JP | 2001-216124 | 8/2001 |
| JP | 2004-153668 | 5/2004 |
| JP | 2005-101949 | 4/2005 |

OTHER PUBLICATIONS

Qing Wang et al.; A Contour-Preserving Image Interpolation Method; Proceedings 2003 International Conference on Image Processing; ICIP-2003; Barcelona, Spain, Sep. 14-17, 2003.
Shigeru Ando; Image Field Categorization and Edge/Corner Detection from Gradient Covariance; IEEE Transactions on Pattern Analysis and Machine Intelligence; IEEE Service Center, Los Alamitos, CA, US; vol. 22, No. 2, Feb. 2000.
Jia-Guu Leu; Sharpness preserving image enlargement based on a ramp edge model; Pattern Recognition, Elsevier, Kidlington, GB; vol. 34, No. 10, Oct. 2001, pp. 1927-1938.
European Search Report dated Aug. 17, 2007.
Japanese Office Action issued on Sep. 28, 2010 in connection with counterpart JP Appl. No. 2006-058957.

* cited by examiner

Primary Examiner — Yon Couso
(74) Attorney, Agent, or Firm — SNR Denton US LLP

(57) ABSTRACT

An image processing apparatus includes a ridge strength detecting unit for detecting a ridge strength that is the strength of a ridge included in an image. When a pixel value is changed in the form of a pulse in accordance with a positional change in a region that includes a plurality of pixels, the ridge strength is represented by a gradient and height of the pulse.

16 Claims, 36 Drawing Sheets

FIG. 1

| | RINGING | ALIASING DISTORTION | JAGGY | ERROR |
|---|---|---|---|---|
| NEAREST NEIGHBOR INTERPOLATION | ○ | × | × | ○ |
| BILINEAR INTERPOLATION | ○ | × | × | ○ |
| BICUBIC INTERPOLATION | ○ | ○ | × | ○ |
| HIGH-ORDER FILTER INTERPOLATION | × | × | × | ○ |
| DIAGONAL INTERPOLATION | ○ | × | ○ | × |

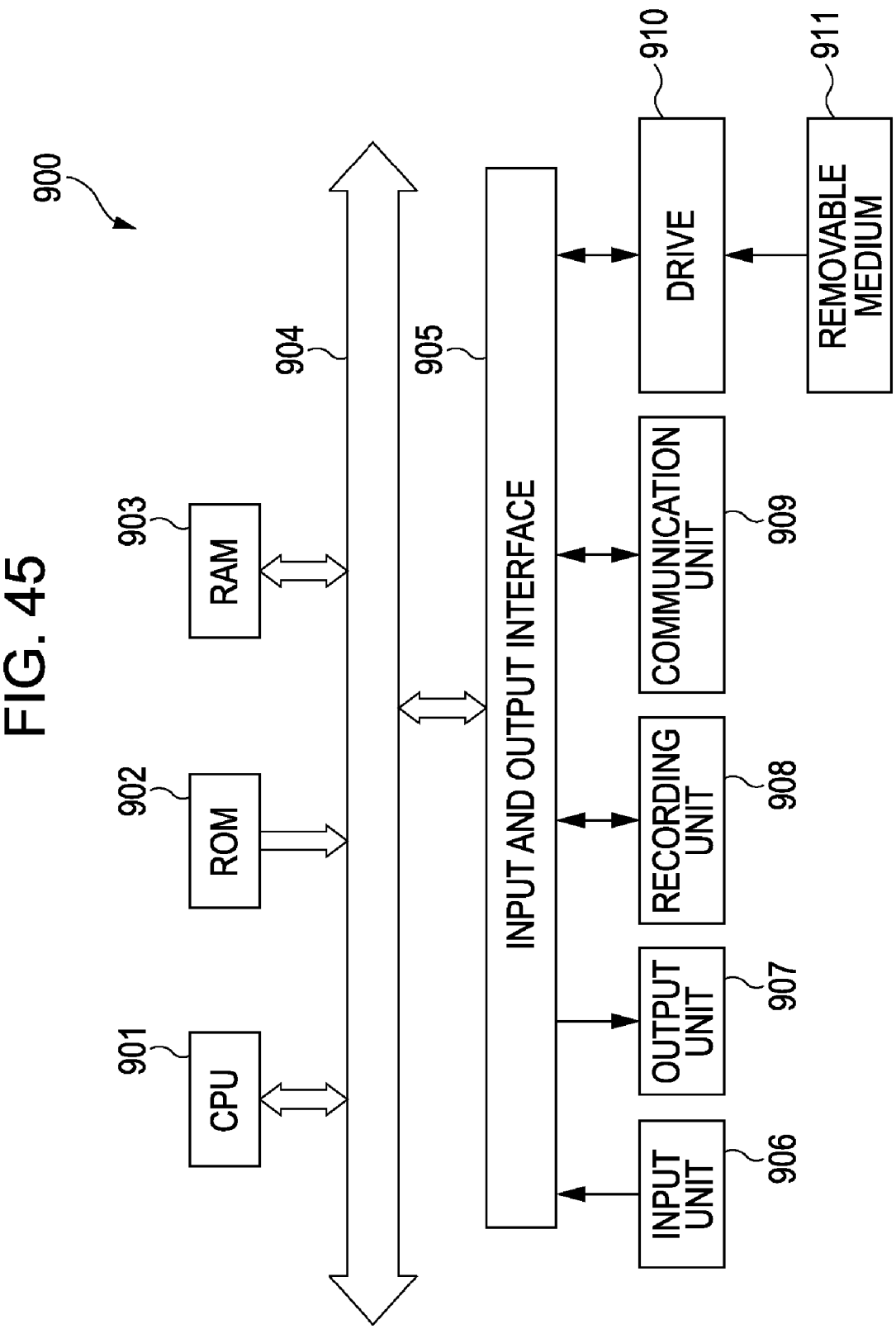

IMAGE PROCESSING APPARATUS, IMAGE PROCESSING METHOD, RECORDING MEDIUM, AND PROGRAM

CROSS REFERENCES TO RELATED APPLICATIONS

The present invention contains subject matter related to Japanese Patent Application JP 2006-058957 filed in the Japanese Patent Office on Mar. 6, 2006, the entire contents of which are incorporated herein by reference.

BACKGROUND OF THE INVENTION

1. Field of the Invention

The present invention relates to image processing apparatuses, image processing methods, recording media, and programs, and, more particularly, to an image processing apparatus and image processing method capable of easily and accurately detecting ridge strength of an image, a recording medium, and a program.

2. Description of the Related Art

A new television broadcasting standard such as the HDTV (High Definition Television) standard enabling high-definition broadcasting is currently becoming increasingly popular in addition to the known NTSC (National Television Standards Committee) and PAL (Phase Alternation by Line) standards. Furthermore, electric home appliances such as digital still cameras using digital image data are becoming increasingly widespread. Thus, image data resolutions used by users are becoming diversified.

On the other hand, in Flat Panel Displays (FPDs) that are image display devices currently in widespread use, the number of pixels used is fixed regardless of whether the display system thereof is a plasma display system or a liquid crystal display system. Accordingly, if the displayable resolution of a display device does not match the resolution of image data, the resolution of the image data is required to be converted into the displayable resolution of the display device. This resolution conversion is achieved by horizontally and vertically performing one-dimensional interpolation processing upon original image data using pixels included in the image data.

As image interpolation methods, for example, there are the nearest neighbor interpolation method (see, for example, Japanese Unexamined Patent Application Publication No. 09-50516) in which a pixel is interpolated at an interpolation position using the value of a pixel nearest to the interpolation position included in original image data, the bilinear interpolation method (see, for example, Japanese Unexamined Patent Application Publication No. 09-50516) in which a pixel is interpolated at an interpolation position using a weighted average of pixel values of two pixels adjacent to the interpolation position, the bicubic interpolation method (see, for example, Japanese Unexamined Patent Application Publication No. 2001-216124) in which a pixel is interpolated at an interpolation position using a weighted average of pixel values of four pixels near the interpolation position, the diagonal interpolation method (see, for example, Japanese Unexamined Patent Application Publication No. 2004-153668) in which the direction of an edge included in an image is detected, and a pixel is interpolated at an interpolation position using pixels on the both sides of the interpolation position in the edge direction, and an interpolation method (hereinafter, referred to also as a high-order filter interpolation method) in which the number of taps and the order of an interpolation filter (filter factor) are increased, and image interpolation is performed using an interpolation filter having characteristics close to ideal filter characteristics (sinc function).

SUMMARY OF THE INVENTION

FIG. 1 is a table showing features of the above-described interpolation methods.

The nearest neighbor interpolation method is effective in performing CG (Computer Graphics) processing, because the method is simple, and blurring does not occur when an image is enlarged at an integral scaling factor. However, the method is impractical when an image is scaled at a non-integral scaling factor, because the line thickness varies, jaggies (jagged edges) becomes pronounced, and aliasing distortion occurs.

In the bilinear interpolation method, the amount of data to be processed is small. In addition, a pixel interpolated using the bilinear interpolation method can be more harmonized with adjacent pixels compared with a pixel interpolated using the nearest neighbor interpolation method (that is, interpolation accuracy is improved). However, aliasing distortion and jaggies occur in this method. In addition, an image is sometimes blurred, and it is therefore difficult to obtain a high-quality image.

In the bicubic interpolation method, the occurrence of ringing around an edge included in an image can be prevented. In addition, interpolation accuracy of this method is higher than that of the nearest neighbor interpolation and bilinear interpolation methods. In particular, when this method is used for an image of nature acquired by an image pickup apparatus, a high-quality image can be obtained. However, it is also difficult in this method to prevent the occurrence of aliasing distortion and jaggies. In particular, when an image is reduced, image quality degradation due to aliasing distortion becomes more pronounced.

FIG. 3 is a diagram showing an image acquired by enlarging an original image shown in FIG. 2 using the bicubic interpolation method. On the right side of the image shown in FIG. 3, there is a region in which vertical thin lines are arranged. In this region, a number of high-frequency components exist, and aliasing distortion occurs. In addition, on the left side of the image shown in FIG. 3, slanting stepped edges exist due to the occurrence of jaggies.

In the high-order filter interpolation method, the occurrence of aliasing distortion can be prevented. However, in a region around an edge included in an image in which a change in a pixel value is small (hereinafter referred to as a flat region), ringing sometimes occurs. In addition, it is also difficult in this method to prevent the occurrence of jaggies.

FIG. 4 is a diagram showing an image acquired by enlarging the original image shown in FIG. 2 using the high-order filter interpolation method. In a region on the right side of the image shown in FIG. 4 in which vertical thin lines are arranged and a number of high-frequency components exist, the occurrence of aliasing distortion is prevented compared with the image shown in FIG. 3. However, ringing occurs in flat regions on both sides of this region. In addition, like the image shown in FIG. 3, slanting stepped edges exist due to the occurrence of jaggies on the left side of the image shown in FIG. 4.

FIG. 5 is a graph showing a change in a pixel value in an area extending from the left end of the image shown in FIG. 3 or 4 to the vicinity of the right end of the region on the right side of the image shown in FIG. 3 or 4 in which vertical thin lines are arranged and a number of high-frequency components are included. The area is included in a part sandwiched between arrows A1 and A2 shown in FIG. 3 or 4, which corresponds to a part sandwiched between arrows A1 and A2 in the original image show in FIG. 2. In FIG. 5, the horizontal direction represents the position of a pixel, and the vertical direction represents the value (brightness level) of the pixel. A line of a type 1 represents a change in a pixel value in the image (FIG. 3) enlarged using the bicubic interpolation method. A line of a type 2 represents a change in a pixel value in the image (FIG. 4) enlarged using the high-order filter interpolation method.

As shown in FIG. 5, in the case of the image shown in FIG. 3, it can be shown that the pixel value change is not constant due to the occurrence of aliasing distortion in the region in which a number of high-frequency components are included and a pixel value is sharply changed in a short cycle. In the case of the image shown in FIG. 4, it can be shown that the occurrence of aliasing distortion is prevented and the pixel value change is therefore almost constant in the region in which a number of high-frequency components are included, on the other hand, a pixel value is slightly and repeatedly changed due to the occurrence of ringing in the flat region on the left side of the region.

Referring back to FIG. 1, in the diagonal interpolation method, the occurrence of jaggies can be prevented, because a pixel is interpolated in accordance with the direction of an edge included in an image. On the other hand, however, errors sometimes occur. In addition, it is difficult to prevent the occurrence of aliasing distortion, because there is a limitation on a controllable angle of an oblique line.

FIG. 6 is a diagram showing an image acquired by enlarging the original image shown in FIG. 2 using the diagonal interpolation method. In the image shown in FIG. 6, the occurrence of jaggies around slanting edges is prevented compared with the images shown in FIGS. 3 and 4. On the other hand, however, errors occur on the left side of a region near the right end of the image in which portions of figures are displayed. In addition, like the image shown in FIG. 3, aliasing distortion occurs in the region in which a number of high-frequency components are included.

Thus, each of the above-described interpolation methods has merits and demerits. If edge or contrast enhancement is performed so as to improve image quality, jaggies, ringing, aliasing distortion, and noise in a flat region are sometimes pronounced. This leads to reduction in image quality.

It is desirable to accurately detect the features of an image and perform various pieces of image processing such as image interpolation processing and image enhancement processing in accordance with the features of the image so as to prevent reduction in image quality and improve image quality.

According to an embodiment of the present invention, there is provided an image processing apparatus and image processing method capable of easily and accurately detecting the ridge strength of an image, and performing image processing in accordance with the features of the image.

An image processing apparatus according to an embodiment of the present invention includes a ridge strength detecting unit for detecting a ridge strength that is the strength of a ridge included in an image. When a pixel value is changed in the form of a pulse in accordance with a positional change in a region that includes a plurality of pixels, the ridge strength is represented by a gradient and height of the pulse.

The ridge strength detecting unit can include: a first difference value calculating unit for calculating gradient values each of which is a difference value between pixel values of pixels included in the region; a first absolute value calculating unit for calculating absolute values of the gradient values; a first adding unit for calculating a sum of the absolute values of the gradient values; a second adding unit for calculating a sum of the gradient values; a second absolute value calculating unit for calculating an absolute value of the sum of the gradient values; and a second difference value calculating unit for calculating a difference value between the sum of the absolute values of the gradient values and the absolute value of the sum of the gradient values as the ridge strength.

The image processing apparatus can further include an edge strength detecting unit for detecting an edge strength that is the magnitude of a change in a pixel value with respect to a positional change in the region.

The edge strength detecting unit can include: a difference value calculating unit for calculating gradient values each of which is a difference value between pixel values of pixels included in the region; an absolute value calculating unit for calculating absolute values of the gradient values; and an adding unit for calculating a sum of the absolute values of the gradient values as the edge strength.

The image processing apparatus can further include: a first image processing unit for performing image processing for a region that includes a ridge; a second image processing unit for performing image processing for a region that includes a step edge; a third image processing unit for performing image processing for a flat region in which the magnitude of a change in a pixel value is small; and a mixing unit for mixing images by performing weighted addition of pixel values of pixels at corresponding positions in a second image which the first image processing unit generates by performing image processing upon a first image, a third image which the second image processing unit generates by performing image processing upon the first image, and a fourth image which the third image processing unit generates by performing image processing upon the first image on the basis of the ridge strength and the edge strength.

The first image processing unit, the second image processing unit, and the third image processing unit can individually perform image interpolation processing.

The first image processing unit can perform image interpolation processing using an interpolation method capable of preventing occurrence of aliasing distortion due to high-frequency components included in an image.

The second image processing unit can perform image interpolation processing using an interpolation method capable of preventing occurrence of a jaggy at a slanting edge.

The third image processing unit can perform image interpolation processing using an interpolation method capable of preventing occurrence of ringing in a flat region.

The first image processing unit, the second image processing unit, and the third image processing unit can individually perform image enhancement processing.

The first image processing unit can enhance high-frequency components included in an image which have an amplitude equal to or larger than a first amplitude using a first gain. The third image processing unit can enhance high-frequency components included in an image which have an amplitude equal to or larger than a second amplitude using a second gain. The second amplitude is equal to or larger than the first amplitude. The second gain is equal to or smaller than the first gain.

The second image processing unit can perform image enhancement processing using an image enhancement method capable of preventing occurrence of a preshoot and an overshoot at a step edge.

The mixing unit can include: a first mixing unit for mixing images by performing weighted addition of pixel values of pixels at corresponding positions in the second image and the third image on the basis of the ridge strength; and a second mixing unit for mixing images by performing weighted addition of pixel values of pixels at corresponding positions in the fourth image and a fifth image generated by the first mixing unit on the basis of the edge strength.

An image processing method according to an embodiment of the present invention, a program, or a program recorded on a recording medium includes the step of detecting a ridge strength that is the strength of a ridge included in an image. When a pixel value is changed in the form of a pulse in accordance with a positional change in a region that includes a plurality of pixels, the ridge strength is represented by a gradient and height of the pulse.

According to an embodiment of the present invention, a ridge strength that is the strength of a ridge included in an image is detected. When a pixel value is changed in the form of a pulse in accordance with a positional change in a region that includes a plurality of pixels, the ridge strength is represented by a gradient and height of the pulse.

Thus, according to an embodiment of the present invention, the ridge strength of an image can be detected. Furthermore, according to an embodiment of the present invention, the ridge strength of an image can be easily and accurately detected, whereby image processing can be performed in accordance with the features of the image.

BRIEF DESCRIPTION OF THE DRAWINGS

FIG. 1 is a table showing features of image interpolation methods;

FIG. 45 is a block diagram showing an exemplary configuration of a personal computer.

DESCRIPTION OF THE PREFERRED EMBODIMENTS

Before describing embodiments of the present invention, the correspondence between the features of the present invention and embodiments disclosed in this specification or drawings is discussed below. This description is intended to assure that embodiments supporting the present invention are described in this specification. Thus, even if an embodiment in this specification is not described as relating to a certain feature of the present invention, that does not necessarily mean that the embodiment does not relate to that feature of the present invention. Conversely, even if an embodiment is described herein as relating to a certain feature of the present invention, that does not necessarily mean that the embodiment does not relate to other features of the present invention.

An image processing apparatus according to an embodiment of the present invention (for example, an image processing section 112 shown in FIG. 7 or an image processing section 411 shown in FIG. 38) includes a ridge strength detecting unit (for example, a ridge strength detection unit 201 shown in FIG. 22) for detecting a ridge strength that is the strength of a ridge included in an image. When a pixel value is changed in the form of a pulse in accordance with a positional change in a region that includes a plurality of pixels, the ridge strength is represented by a gradient and height of the pulse.

Figure 22:
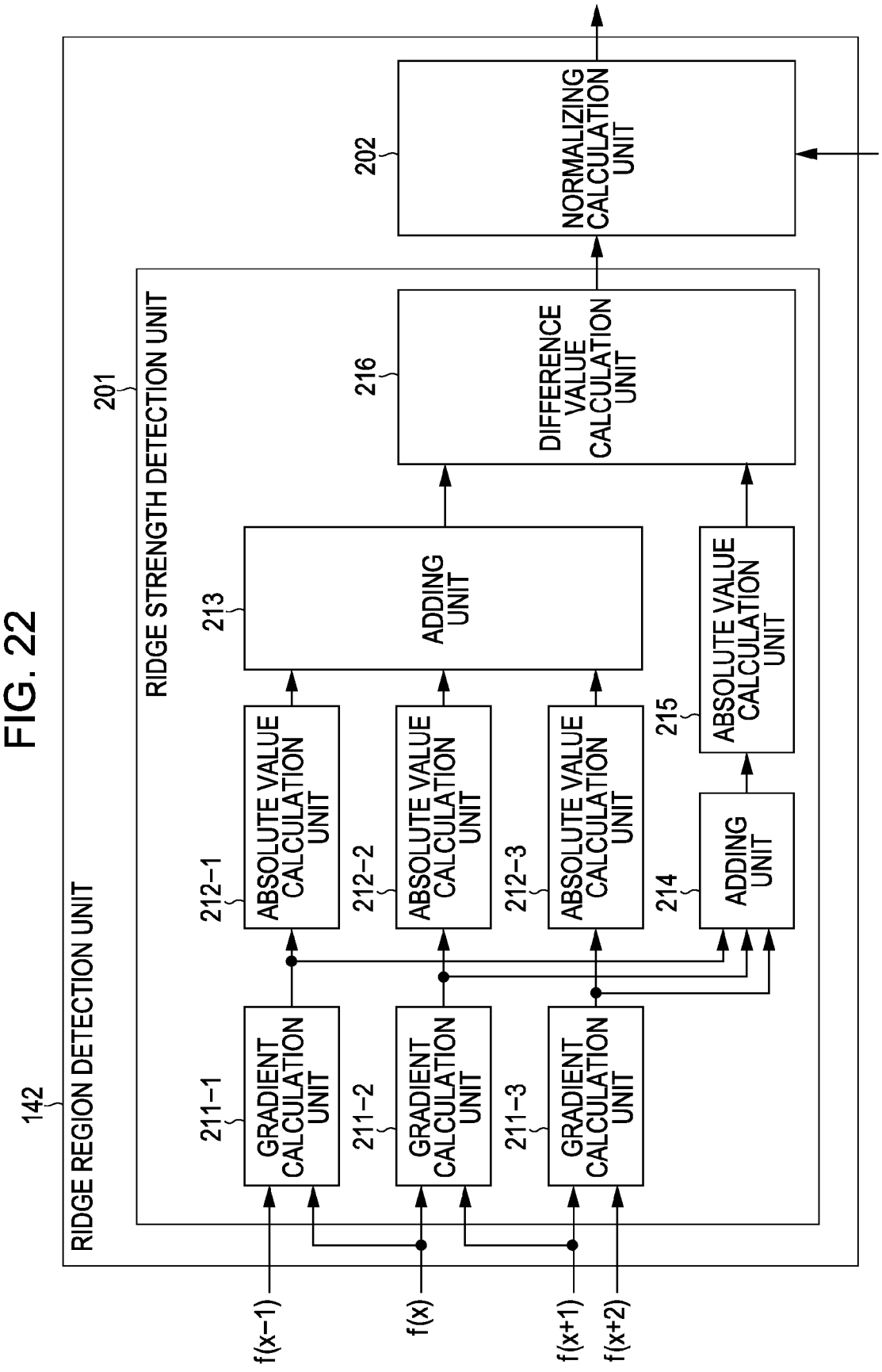
FIG. 22 is a block diagram showing an exemplary functional configuration of a ridge region detection unit shown in FIG. 8.

In the image processing apparatus according to an embodiment of the present invention, the ridge strength detecting unit can include: a first difference value calculating unit (for example, gradient calculation units 211-1, 211-2, and 211-3 shown in FIG. 22) for calculating gradient values each of which is a difference value between pixel values of pixels included in the region; a first absolute value calculating unit (for example, absolute value calculation units 212-1, 212-2, and 212-3 shown in FIG. 22) for calculating absolute values of the gradient values; a first adding unit (for example, an adding unit 213 shown in FIG. 22) for calculating a sum of the absolute values of the gradient values; a second adding unit (for example, an adding unit 214 shown in FIG. 22) for calculating a sum of the gradient values; a second absolute value calculating unit (for example, an absolute value calculation unit 215 shown in FIG. 22) for calculating an absolute value of the sum of the gradient values; and a second difference value calculating unit (for example, a difference value calculation unit 216 shown in FIG. 22) for calculating a difference value between the sum of the absolute values of the gradient values and the absolute value of the sum of the gradient values as the ridge strength.

The image processing apparatus according to an embodiment of the present invention can further include an edge strength detecting unit (for example, an edge strength detection unit 171 shown in FIG. 19) for detecting an edge strength that is the magnitude of a change in a pixel value with respect to a positional change in the region.

Figure 19:
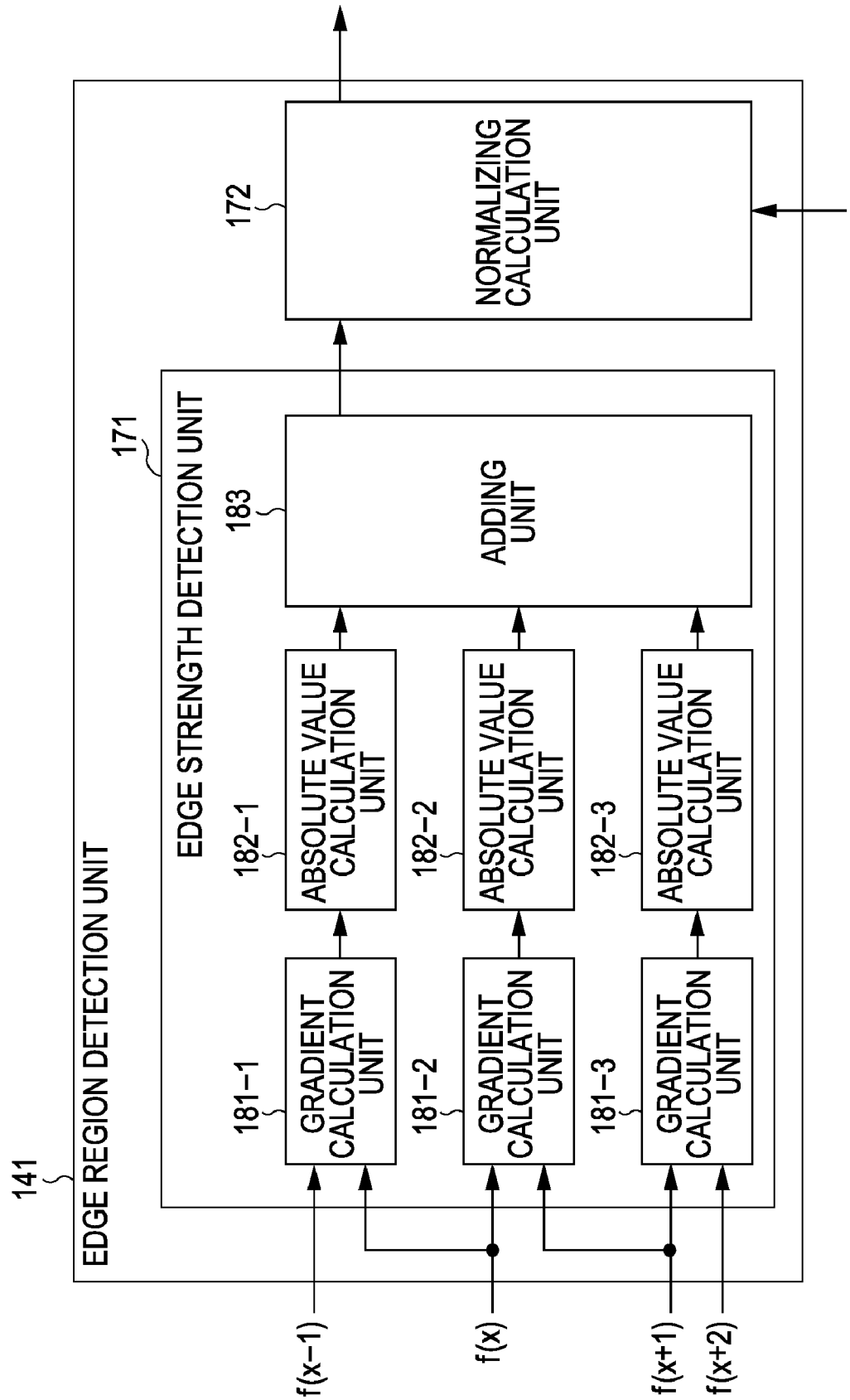
FIG. 19 is a block diagram showing an exemplary functional configuration of an edge region detection unit shown in FIG. 8.

In the image processing apparatus according to an embodiment of the present invention, the edge strength detecting unit can include: a difference value calculating unit (for example, gradient calculation units 181-1, 181-2, and 181-3 shown in FIG. 19) for calculating gradient values each of which is a difference value between pixel values of pixels included in the region; an absolute value calculating unit (for example, absolute value calculation units 182-1, 182-2, and 182-3 shown in FIG. 19) for calculating absolute values of the gradient values; and an adding unit (for example, an adding unit 183 shown in FIG. 19) for calculating a sum of the absolute values of the gradient values as the edge strength.

Figure 8:
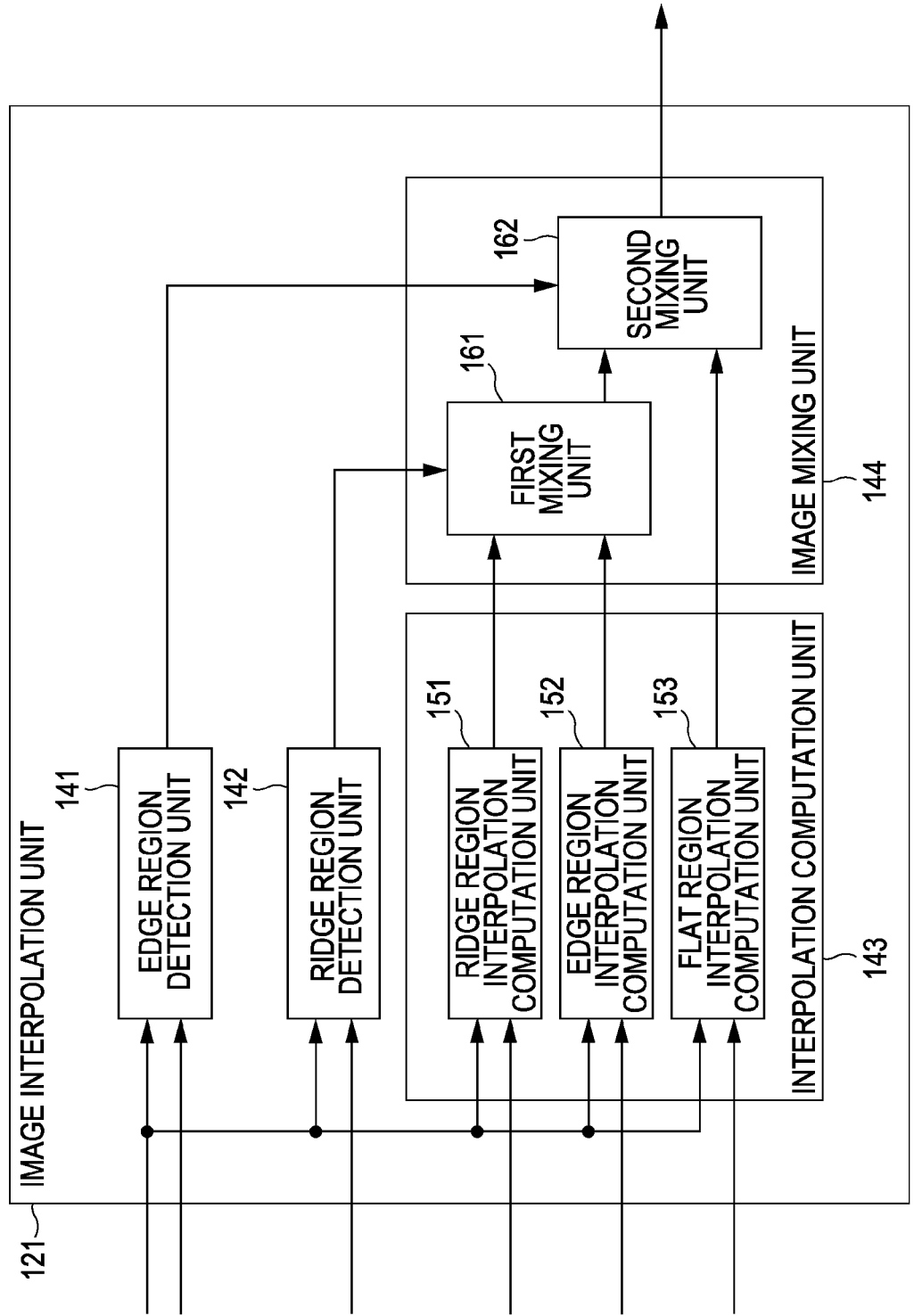
FIG. 8 is a block diagram showing an exemplary functional configuration of an image interpolation unit shown in FIG. 7.
Figure 39:
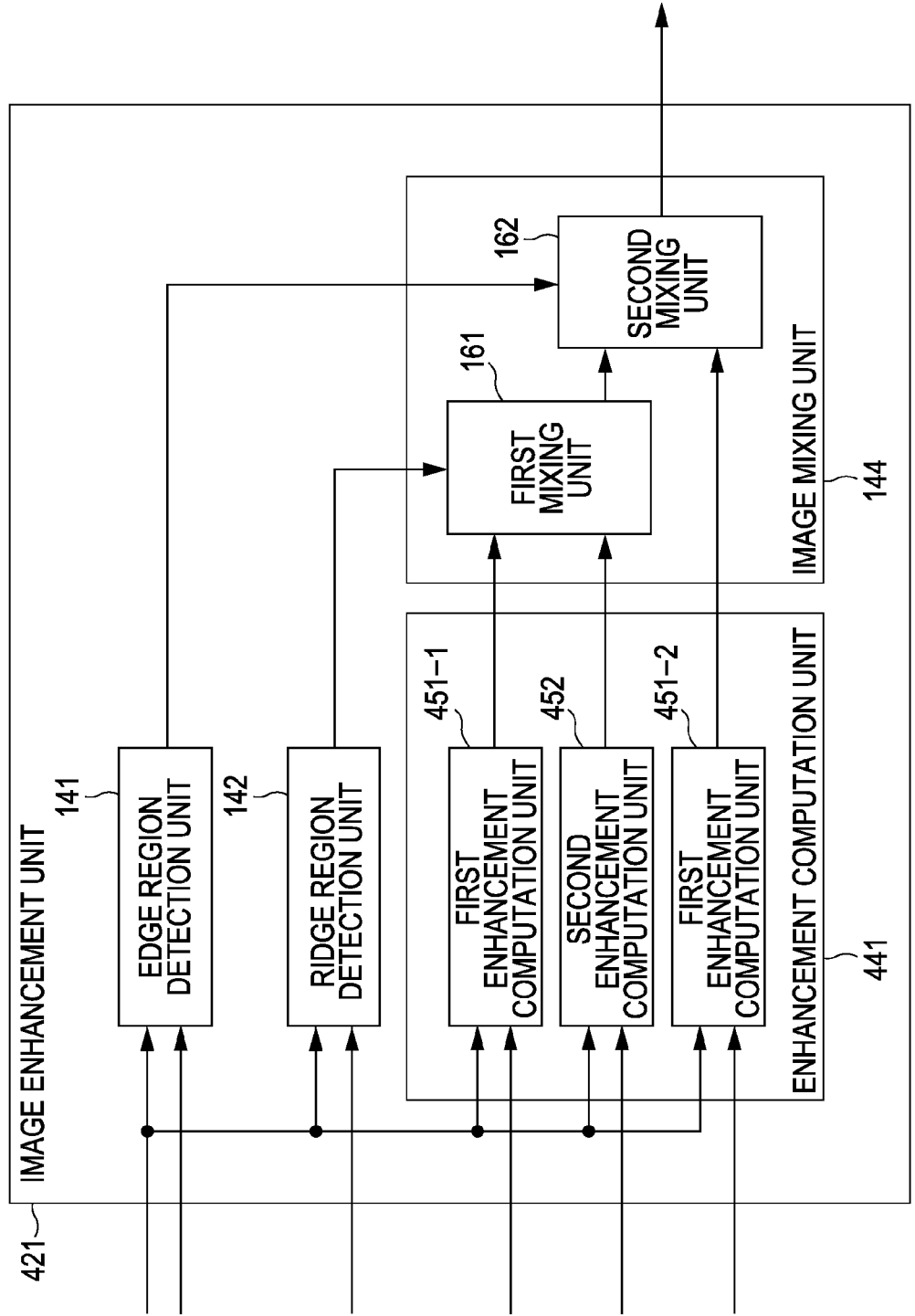
FIG. 39 is a block diagram showing an exemplary functional configuration of an image enhancement unit shown in FIG. 38.

The image processing apparatus according to an embodiment of the present invention can further include: a first image processing unit (for example, a ridge region interpolation computation unit 151 shown in FIG. 8 or a first enhancement computation unit 451-1 shown in FIG. 39) for performing image processing for a region that includes a ridge; a second image processing unit (for example, an edge region interpolation computation unit 152 shown in FIG. 8 or a second enhancement computation unit 452 shown in FIG. 39) for performing image processing for a region that includes a step edge; a third image processing unit (for example, a flat region interpolation computation unit 153 shown in FIG. 8 or a first enhancement computation unit 451-2 shown in FIG. 39) for performing image processing for a flat region in which the magnitude of a change in a pixel value is small; and a mixing unit (for example, an image mixing unit 144 shown in FIG. 8 or 39) for mixing images by performing weighted addition of pixel values of pixels at corresponding positions in a second image which the first image processing unit generates by performing image processing upon a first image, a third image which the second image processing unit generates by performing image processing upon the first image, and a fourth image which the third image processing unit generates by performing image processing upon the first image on the basis of the ridge strength and the edge strength.

In the image processing apparatus according to an embodiment of the present invention, the mixing unit can include: a first mixing unit (for example, a first mixing unit 161 shown in FIG. 8 or 39) for mixing images by performing weighted addition of pixel values of pixels at corresponding positions in the second image and the third image on the basis of the ridge strength; and a second mixing unit (for example, a second mixing unit 162 shown in FIG. 8 or 39) for mixing images by performing weighted addition of pixel values of pixels at corresponding positions in the fourth image and a fifth image generated by the first mixing unit on the basis of the edge strength.

Figure 30:
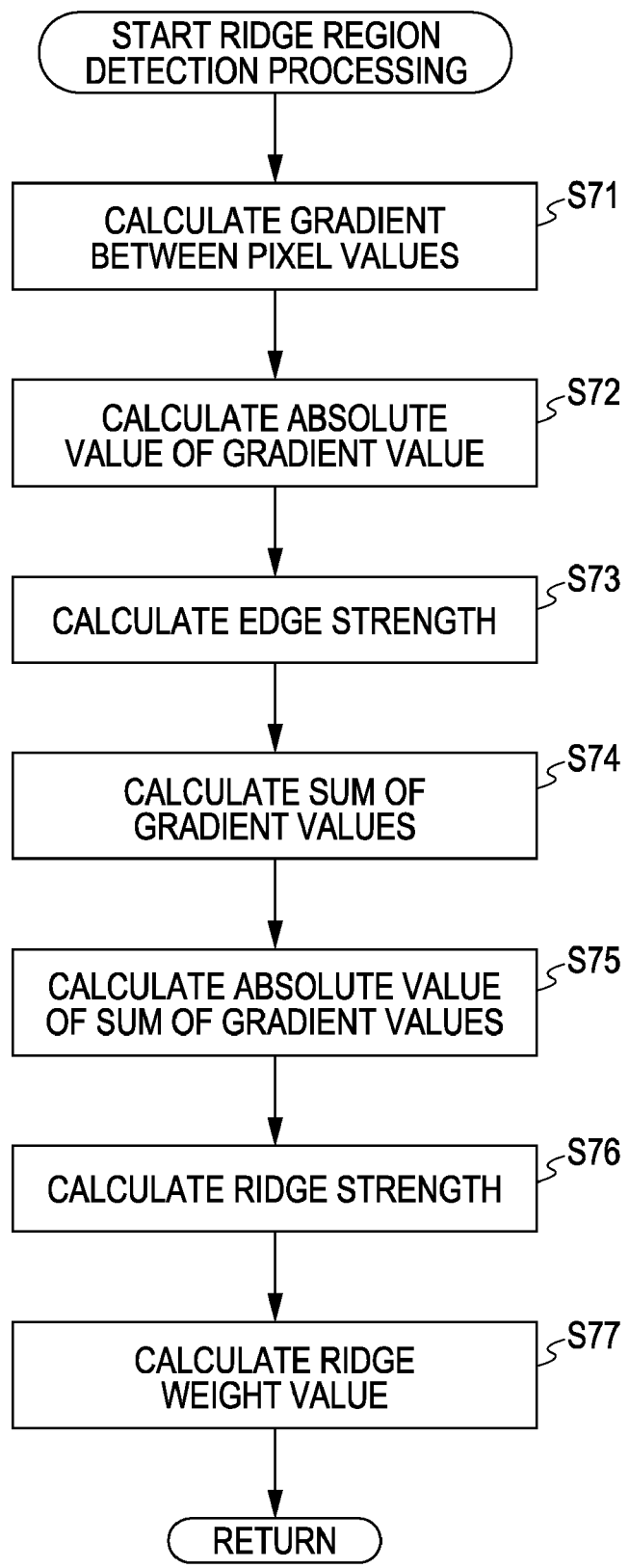
FIG. 30 is a flowchart describing details of ridge region detection processing performed in steps S3 and S11 shown in FIG. 26.

An image processing method according to an embodiment of the present invention, a program, or a program recorded on a recording medium includes the step of detecting a ridge strength that is the strength of a ridge included in an image (for example, steps S71 through S76 shown in FIG. 30). When a pixel value is changed in the form of a pulse in accordance with a positional change in a region that includes a plurality of pixels, the ridge strength is represented by a gradient and height of the pulse.

Embodiments of the present invention will be described with reference to the accompanying drawings.

Figure 7:
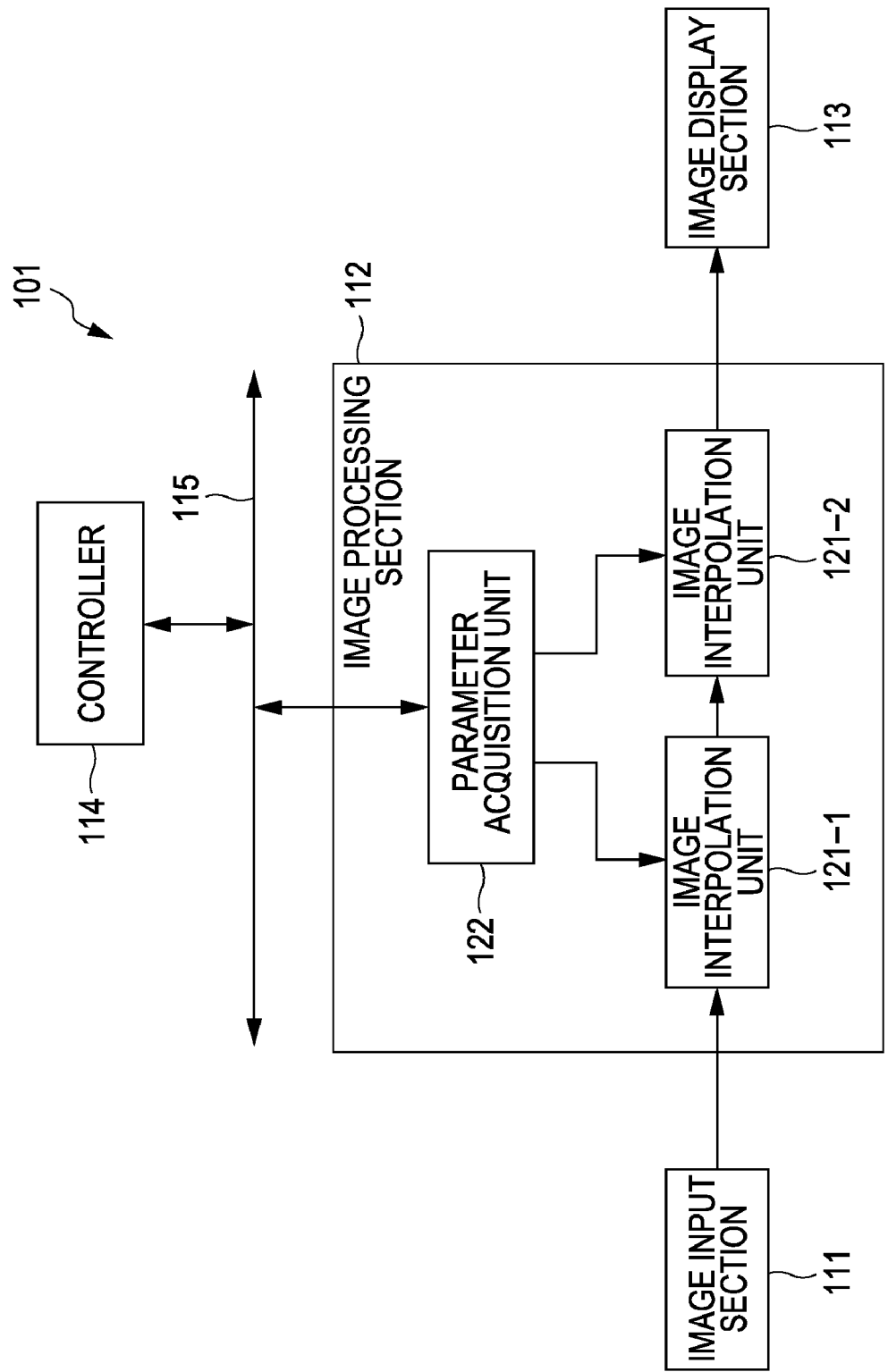
FIG. 7 is a block diagram showing a resolution converter according to an embodiment of the present invention.

FIG. 7 is a block diagram showing a resolution converter according to an embodiment of the present invention. A resolution converter 101 according to an embodiment of the present invention is provided with an image input section 111, the image processing section 112, an image display section 113, and a controller 114. The image processing section 112 is provided with image interpolation units 121-1 and 121-2 and a parameter acquisition unit 122. The parameter acquisition unit 122 included in the image processing section 112 and the controller 114 are connected to each other via a bus 115.

The image input section 111 transmits digital image data, which is acquired by discretizing an analog image signal in the time and spatial directions and quantitizing the analog image signal in the strength direction, to the image processing section 112. The image data may be provided for the image input section 111 from a recording medium or an external apparatus via a network.

As will be described later with reference to FIG. 26, the image processing section 112 performs interpolation processing upon the image data transmitted from the image input section 111.

The image interpolation unit 121-1 performs vertical interpolation processing upon the image data transmitted from the image input section 111, and transmits the interpolated image data to the image interpolation unit 121-2. The image interpolation unit 121-2 performs horizontal interpolation processing upon the image data transmitted from the image interpolation unit 121-1, and transmits the interpolated image data to the image display section 113. In the following, when it is not required to discriminate between the image interpolation units 121-1 and 121-2, the image interpolation unit 121 is simply used.

The parameter acquisition unit 122 receives various types of control information from the controller 114 via the bus 115, and transmits the received control information to the image interpolation units 121-1 and 121-2.

The image display section 113 is, for example, an FPD (Flat Panel Display) that applies the liquid crystal display system or the plasma display system, and displays an image on the basis of the image data transmitted from the image interpolation unit 121-2.

The controller 114 receives various types of instructional information input by a user, or receives various types of instructional information from another apparatus (not shown). Subsequently, the controller 114 prepares various types of control information used for causing the image processing section 112 to perform image processing on the basis of the various types of received instructional information, and transmits them to the parameter acquisition unit 122 via the bus 115.

FIG. 8 is a block diagram showing an exemplary functional configuration of the image interpolation unit 121. The image interpolation unit 121 is provided with an edge region detection unit 141, a ridge region detection unit 142, an interpolation computation unit 143, and the image mixing unit 144.

As will be described later with reference to FIG. 27, the edge region detection unit 141 detects the edge strength of externally input image data. Here, the types of edges will be described with reference to FIGS. 9 through 16. There are main four types of edges, a step edge, a ramp edge, a ridge (or a peak edge), and a roof edge.

Figure 9:
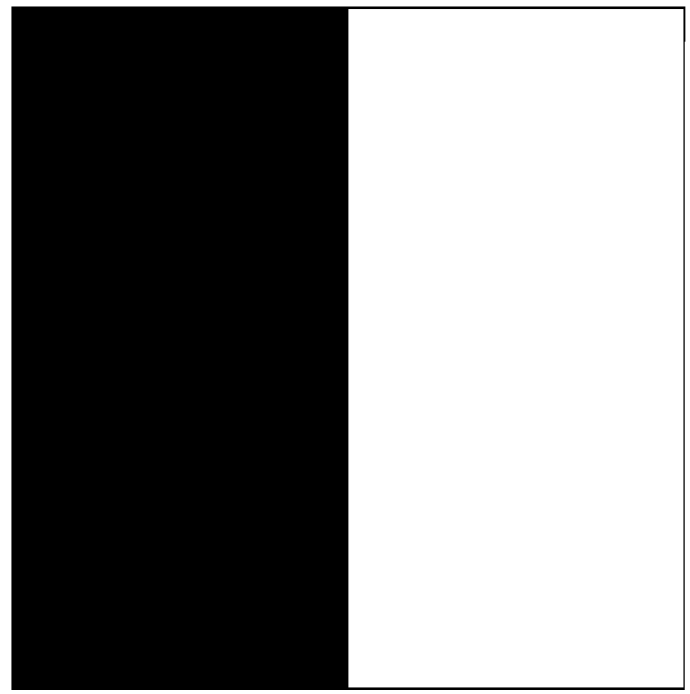
FIG. 9 is a diagram showing an example of a step edge.
Figure 10:
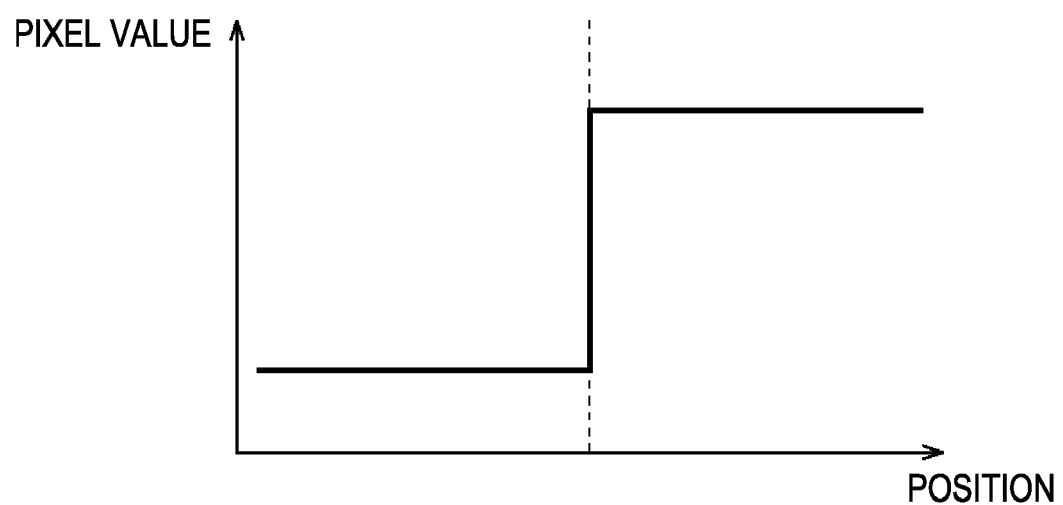
FIG. 10 is a graph showing a change in a pixel value in an image shown in FIG. 9.

FIG. 9 is a diagram showing an example of a step edge. FIG. 10 is a graph showing a change in a pixel value in the lateral direction of the image shown in FIG. 9. In FIG. 10, the horizontal axis direction represents a pixel position, and the vertical axis direction represents a pixel value. A position indicated by a dotted line in FIG. 10 substantially corresponds to the center in the lateral direction of the image shown in FIG. 9. A step edge is an edge acquired when the boundary between two regions having markedly different pixel values is clear. As shown in FIG. 10, a pixel value is abruptly changed at a step edge in the form of a step.

Figure 11:
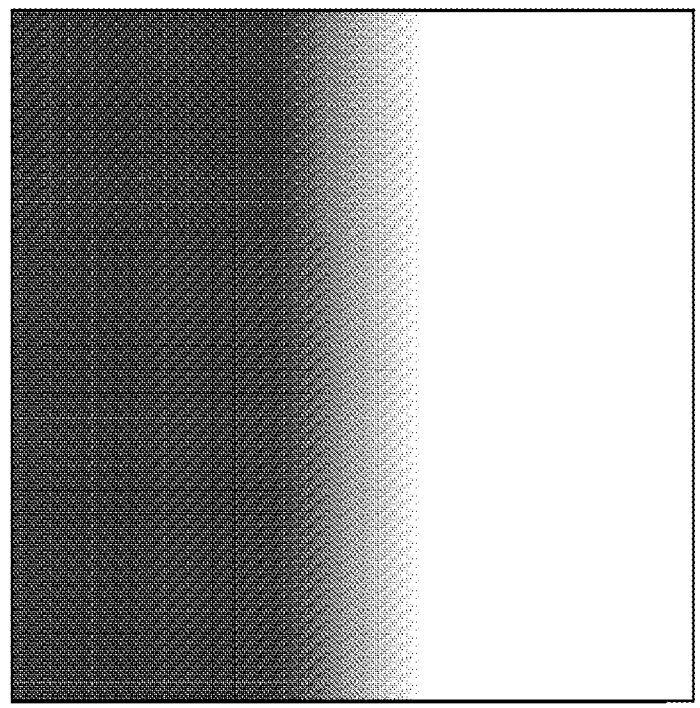
FIG. 11 is a diagram showing an example of a ramp edge.
Figure 12:
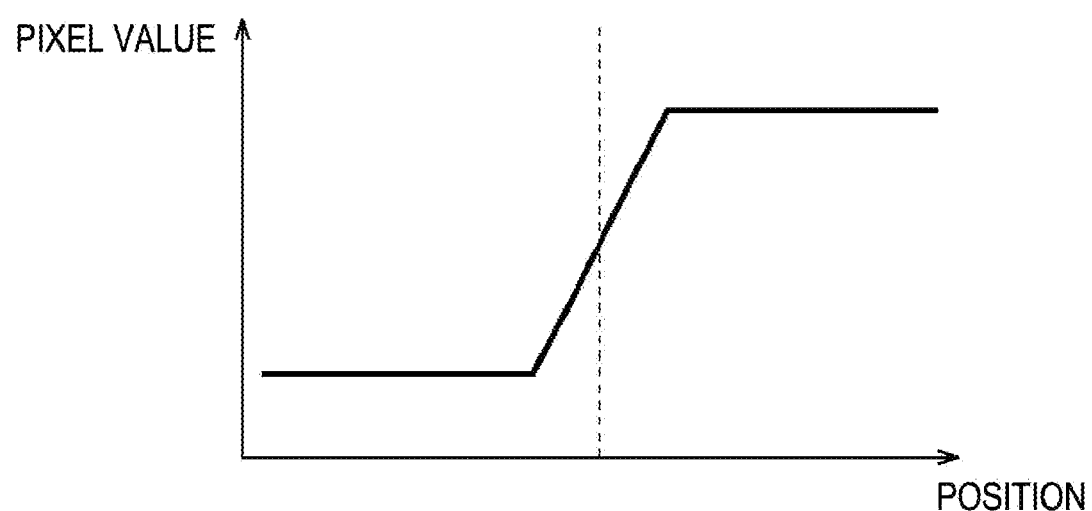
FIG. 12 is a graph showing a change in a pixel value in an image shown in FIG. 11.

FIG. 11 is a diagram showing an example of a ramp edge. FIG. 12 is a graph similar to the graph shown in FIG. 10 and shows a change in a pixel value in the lateral direction of the image shown in FIG. 11. A ramp edge is an edge acquired when the boundary between two regions having markedly different pixel values is blurred compared with a step edge. As shown in FIG. 12, a pixel value is gradually changed in the form of a ramp.

Figure 13:
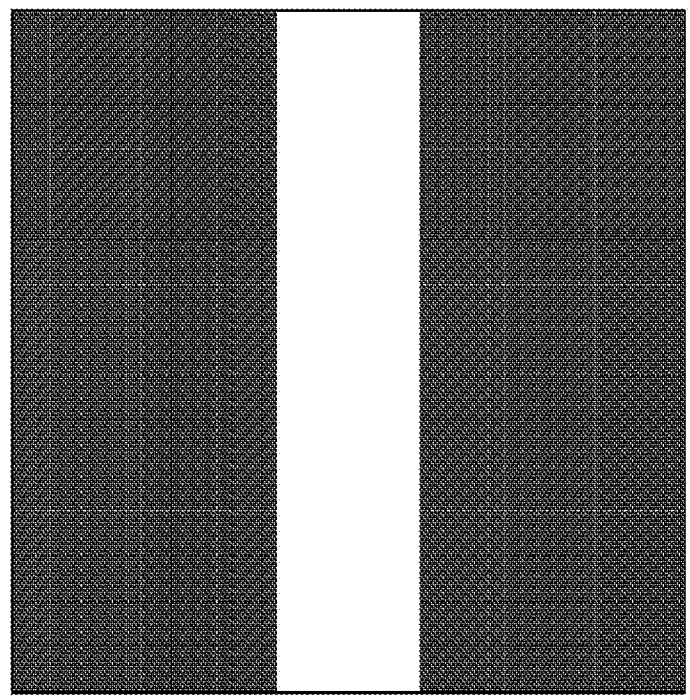
FIG. 13 is a diagram showing an example of a ridge.
Figure 14:
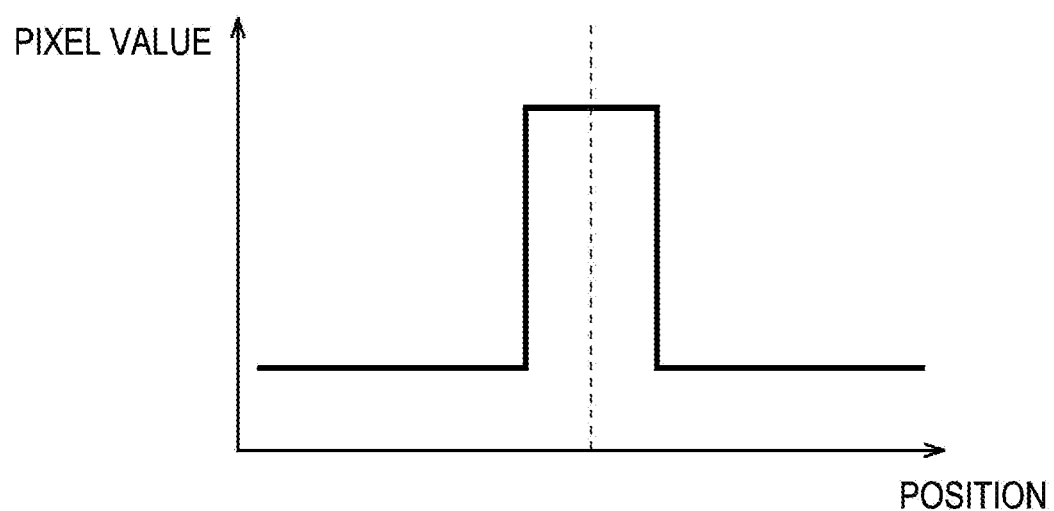
FIG. 14 is a graph showing a change in a pixel value in an image shown in FIG. 13.

FIG. 13 is a diagram showing an example of a ridge. FIG. 14 is a graph similar to the graph shown in FIG. 10 and shows a change in a pixel value in the lateral direction of the image shown in FIG. 13. A ridge is a portion corresponding to a thin line or the like included in an image. As shown in FIG. 14, a pixel value is abruptly changed in a direction substantially perpendicular to the direction of an edge (ridge) in the form of a pulse. At that time, when a pixel value is abruptly changed in the form of a pulse that is downwardly convex, the edge is sometimes called a valley.

Figure 15:
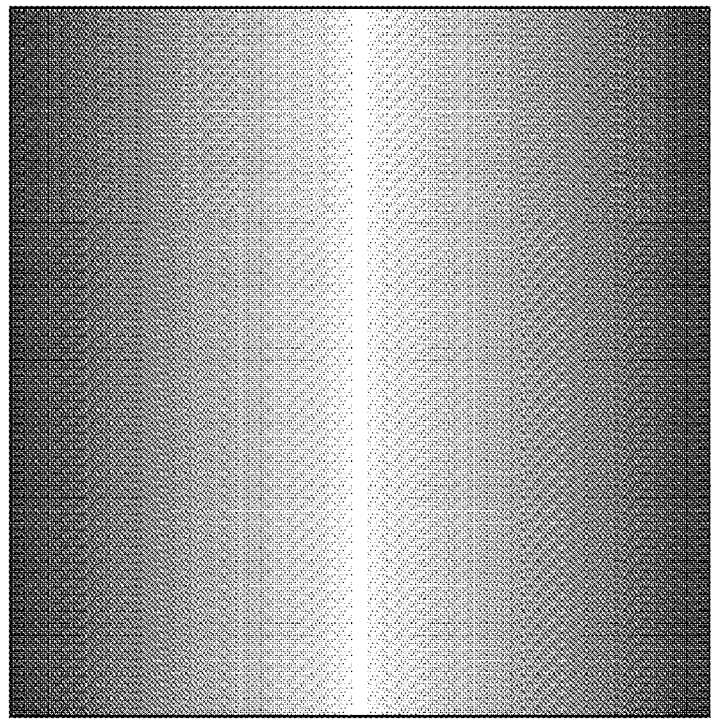
FIG. 15 is a diagram showing an example of a roof edge.
Figure 16:
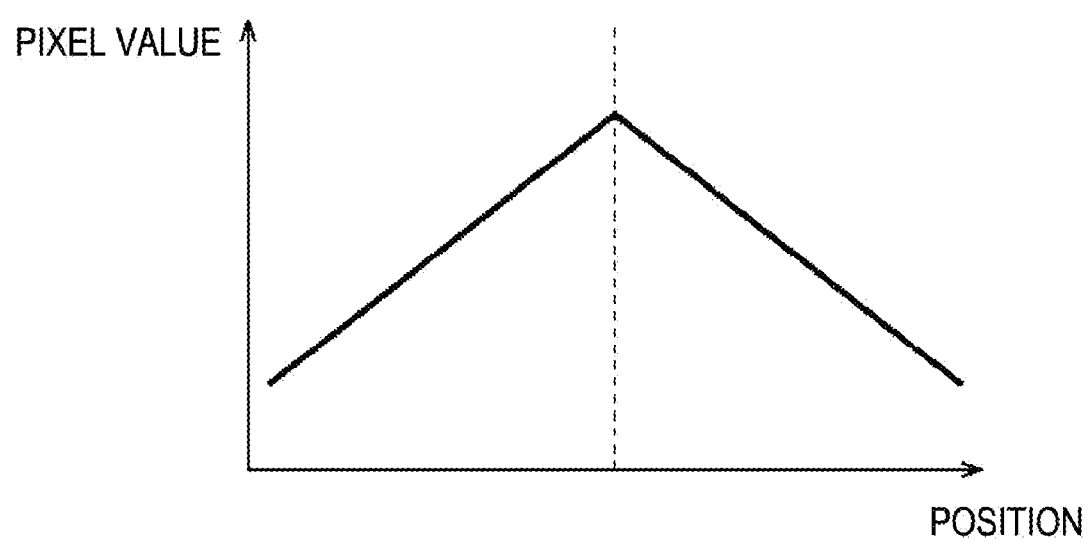
FIG. 16 is a graph showing a change in a pixel value in an image shown in FIG. 15.

FIG. 15 is a diagram showing an example of a roof edge. FIG. 16 is a graph similar to the graph shown in FIG. 10 and shows a change in a pixel value in the lateral direction of the image shown in FIG. 15. A roof edge is a portion corresponding to a thin line or the like included in an image, but the boundaries of the thin line are blurred compared with a ridge. As shown in FIG. 16, a pixel value is gradually changed compared with the pulse waveform shown in FIG. 14 in the form of a peak (or a valley).

Figure 17:
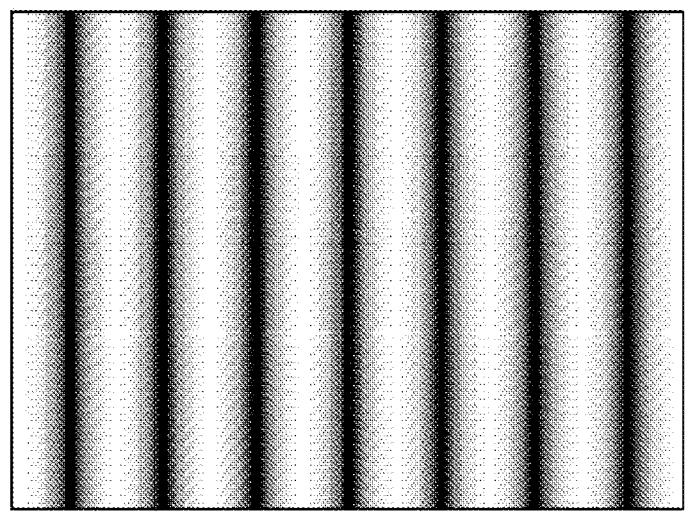
FIG. 17 is a diagram showing an example of a striped pattern.
Figure 18:
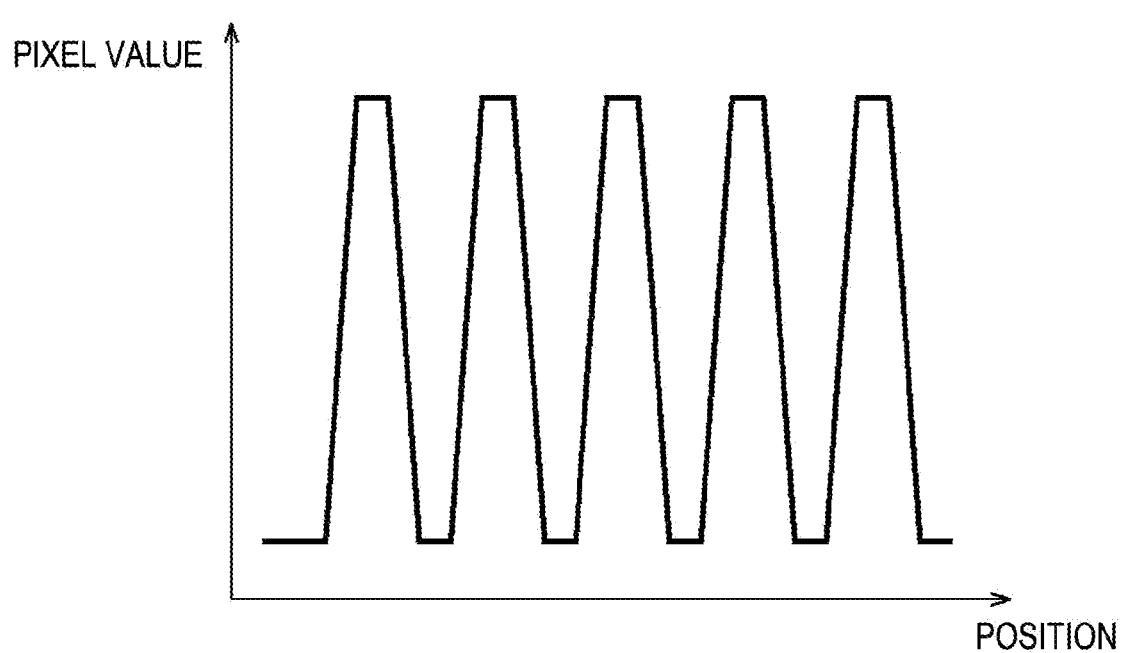
FIG. 18 is a graph showing a change in a pixel value in an image shown in FIG. 17.

As an example of an image in which a plurality of edges are included, there is an image with a striped pattern. FIG. 17 is a diagram showing an exemplary striped pattern. FIG. 18 is a graph similar to the graph shown in FIG. 10 and shows a change in a pixel value in the lateral direction of the image shown in FIG. 17. A striped pattern is obtained by arranging a plurality of ridges in the same direction at short intervals (in short cycles). As shown in FIG. 18, a pixel value is abruptly changed in short cycles in a direction substantially perpendicular to the directions of ridges in the form of a pulse.

The strength of an edge (hereinafter referred to also as edge strength) corresponds to the magnitude of a change in a pixel value that is changed in accordance with a positional change. The more sharply and markedly a pixel value is changed, the higher the edge strength becomes. On the other hand, the more gradually and slightly a pixel value is changed, the lower the edge strength becomes.

As will be described later with reference to FIG. 29, the edge region detection unit 141 creates an edge region weight signal on the basis of the detected edged strength, and transmits the created edge region weight signal to the second mixing unit 162. In addition, the edge region detection unit 141 acquires from the parameter acquisition unit 122 control information including various types of parameters required for the creation of the edge region weight signal.

As will be described later with reference to FIG. 30, the ridge region detection unit 142 detects a ridge strength representing the strength of a ridge included in externally input image data. As shown in FIG. 13, the ridge strength is represented by the gradient and height of a pulse when a pixel value changes in accordance with a positional change in the form of a pulse. The higher the gradient and height of a pulse become, the higher the ridge strength becomes. On the other hand, the lower the gradient and height of a pulse become, the lower the ridge strength becomes. In the case of a high-frequency pattern, that is, a striped pattern in which the widths of lines and spacing between the lines are small, the ridge strength is continuously high. On the other hand, in the case of a low-frequency pattern, that is, a striped pattern in which the widths of lines are small and spacing between the lines are large, the ridge strength repeatedly becomes high and low in short cycles. A striped pattern in which the widths of lines and spacing between the lines are large corresponds to a pattern in which step edges continuously exist. In this case, the ridge strength becomes low.

As will be described later with reference to FIG. 31, the ridge region detection unit 142 creates a ridge region weight signal on the basis of the detected ridge strength, and transmits the created ridge region weight signal to the first mixing unit 161. In addition, the ridge region detection unit 142 acquires from the parameter acquisition unit 122 control information including various types of parameters required for the creation of the ridge region weight signal.

The interpolation computation unit 143 is provided with the ridge region interpolation computation unit 151, the edge region interpolation computation unit 152, and the flat region interpolation computation unit 153, and performs interpolation processing upon externally input image data.

The ridge region interpolation computation unit 151 determines a more effective method for a region including a ridge (a method intended mainly for performing processing upon the region including a ridge) compared with a region including a step edge and a flat region, and performs interpolation processing upon externally input image data using the method. An image including many ridges (for example, a line drawing) often has a number of high-frequency components. Accordingly, an interpolation method capable of preventing the occurrence of aliasing distortion due to the high-frequency components (for example, the high-order filter interpolation method) is suitable for use by the ridge region interpolation computation unit 151. In the following, a case in which the ridge region interpolation computation unit 151 performs interpolation processing using the high-order filter interpolation method will be described by way of example. The ridge region interpolation computation unit 151 acquires from the parameter acquisition unit 122 control information including various types of parameters required for the performance of image interpolation. The ridge region interpolation computation unit 151 transmits the interpolated image data to the first mixing unit 161.

The edge region interpolation computation unit 152 determines a more effective method for a region including a step edge (a method intended mainly for performing processing upon the region including a step edge) compared with a region including a ridge and a flat region, and performs interpolation processing upon externally input image data using the method. An interpolation method capable of preventing the occurrence of jaggies in a slanting edge (for example, the diagonal interpolation method) is suitable for use by the edge region interpolation computation unit 152. In the following, a case in which the edge region interpolation computation unit 152 performs interpolation processing using the diagonal interpolation method will be described by way of example. The edge region interpolation computation unit 152 acquires from the parameter acquisition unit 122 control information including various types of parameters required for the performance of image interpolation. The edge region interpolation computation unit 152 transmits the interpolated image data to the first mixing unit 161.

The flat region interpolation computation unit 153 determines a more effective method for a flat region (a method intended mainly for performing processing upon the flat region) compared with a region including a ridge and a region including a step edge, and performs interpolation processing upon externally input image data using the method. An interpolation method that can prevent the occurrence of ringing in a flat region and has plain characteristics (for example, the bicubic interpolation method) is suitable for use by the flat region interpolation computation unit 153. In the following, a case in which the flat region interpolation computation unit 153 performs interpolation processing using the bicubic interpolation method will be described by way of example. The flat region interpolation computation unit 153 acquires from the parameter acquisition unit 122 control information including various types of parameters required for the performance of image interpolation. The flat region interpolation computation unit 153 transmits the interpolated image data to the second mixing unit 162.

The image mixing unit 144 is provided with the first mixing unit 161 and the second mixing unit 162. The image mixing unit 144 mixes a plurality of pieces of image data in the following manner.

The first mixing unit 161 performs weighted addition of pixel values of pixels at corresponding positions included in two pieces of image data interpolated by the ridge region interpolation computation unit 151 and the edge region interpolation computation unit 152 on the basis of a ridge region weight signal, thereby mixing the two pieces of image data. The first mixing unit 161 transmits the mixed image data to the second mixing unit 162.

The second mixing unit 162 performs weighted addition of the image data mixed by the first mixing unit 161 and a pixel value of a pixel at a corresponding position included in image data interpolated by the flat region interpolation computation unit 153 on the basis of an edge region weight signal, thereby mixing the two pieces of image data. The second mixing unit 162 externally outputs the mixed image data.

FIG. 19 is a block diagram showing an exemplary functional configuration of the edge region detection unit 141 shown in FIG. 8. The edge region detection unit 141 is provided with the edge strength detection unit 171 and a normalizing calculation unit 172.

The edge strength detection unit 171 is provided with the gradient calculation units 181-1, 181-2, and 181-3, the absolute value calculation units 182-1, 182-2, and 182-3, and the adding unit 183. The edge strength detection unit 171 detects the edge strength of externally input image data, and transmits data representing the edge strength to the normalizing calculation unit 172.

Figure 20:
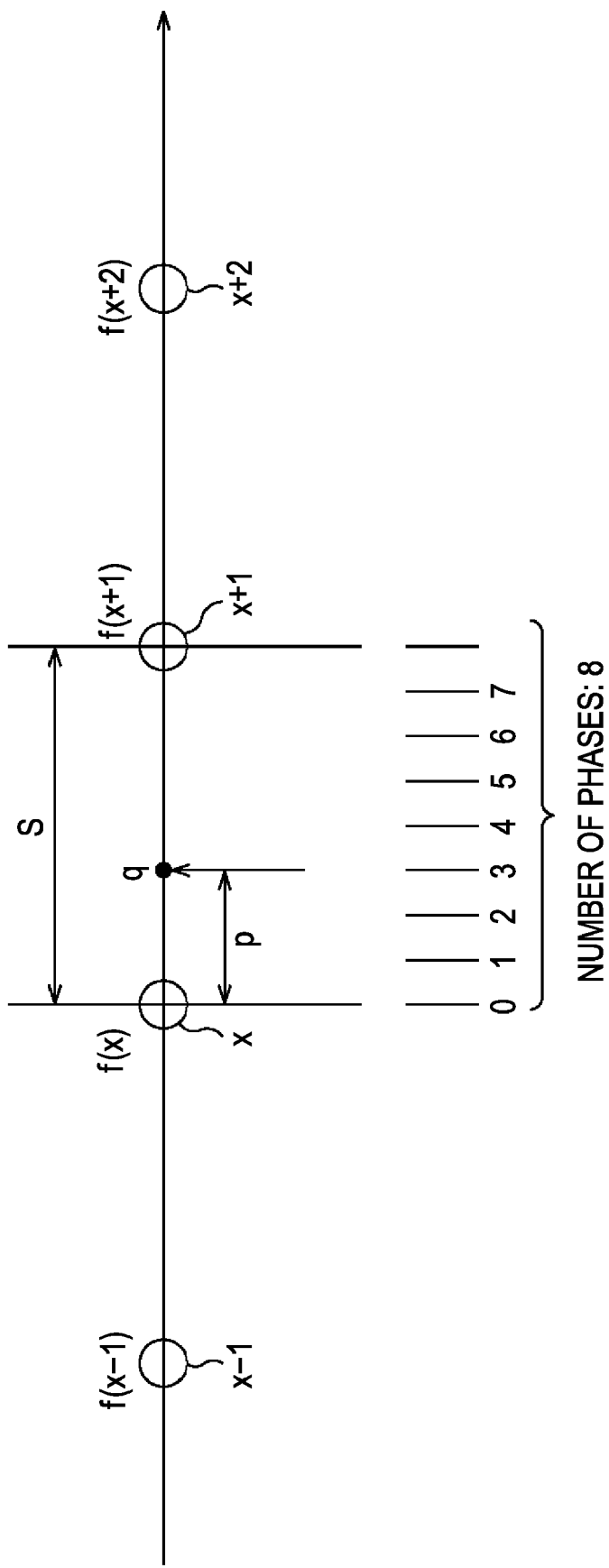
FIG. 20 is a diagram showing exemplary pixel values input into the edge region detection unit shown in FIG. 8.

For example, if the edge strength detection unit 171 interpolates a pixel at a position q shown in FIG. 20, the edge strength detection unit 171 acquires data representing a pixel value f(x−1) of a pixel x−1 on the left side of the position q, data representing a pixel value f(x) of a pixel x on the left side of the position q, data representing a pixel value f(x+1) of a pixel x+1 on the right side of the position q, and data representing a pixel value f(x+2) of a pixel x+2 on the right side of the position q from a buffer (not shown) included in the image interpolation unit 121. The data representing the pixel value f(x−1) and the data representing the pixel value f(x) are input into the gradient calculation unit 181-1. The data representing the pixel value f(x) and the data representing the pixel value f(x+1) are input into the gradient calculation unit 181-2. The data representing the pixel value f(x+1) and the data representing the pixel value f(x+2) are input into the gradient calculation unit 181-3.

Here, the number of positions, at which a pixel may be interpolated, between adjacent pixels (in a sampling interval S) included in original image data is called the number of phases. An interpolation position measured on the basis of one of the adjacent pixels is called a phase. In the example shown in FIG. 20, the number of phases is eight, and the phase of the position q located a distance p from the pixel x is ⅜.

FIG. 20 shows a case in which a pixel is interpolated in a horizontal direction, that is, the image interpolation unit 121-2 interpolates the pixel. If a pixel is interpolated in a vertical direction, that is, the image interpolation unit 121-1 interpolates the pixel, the edge strength detection unit 171 acquires data representing pixel values of four pixels above and beneath the position q from a buffer (not shown) included in the image interpolation unit 121.

The gradient calculation units 181-1, 181-2, and 181-3 calculate a gradient value that is the difference between pixel values of pixels in a region in which a plurality of pixels are included. More specifically, each of the gradient calculation units 181-1, 181-2, and 181-3 calculates the value of a gradient between pixels in a region in which the pixels x−1, x, x+1, and x+2 are included by calculating the difference between received pixel values of two adjacent pixels. The gradient calculation units 181-1, 181-2, and 181-3 transmit data representing the calculated gradient value to the absolute value calculation units 182-1, 182-2, and 182-3, respectively.

Each of the absolute value calculation units 182-1, 182-2, and 182-3 calculates an absolute value of the received data, and transmits data representing the calculated absolute value to the adding unit 183.

The adding unit 183 adds a plurality of pieces of received data, and transmits data representing the sum to the normalizing calculation unit 172.

Figure 21:
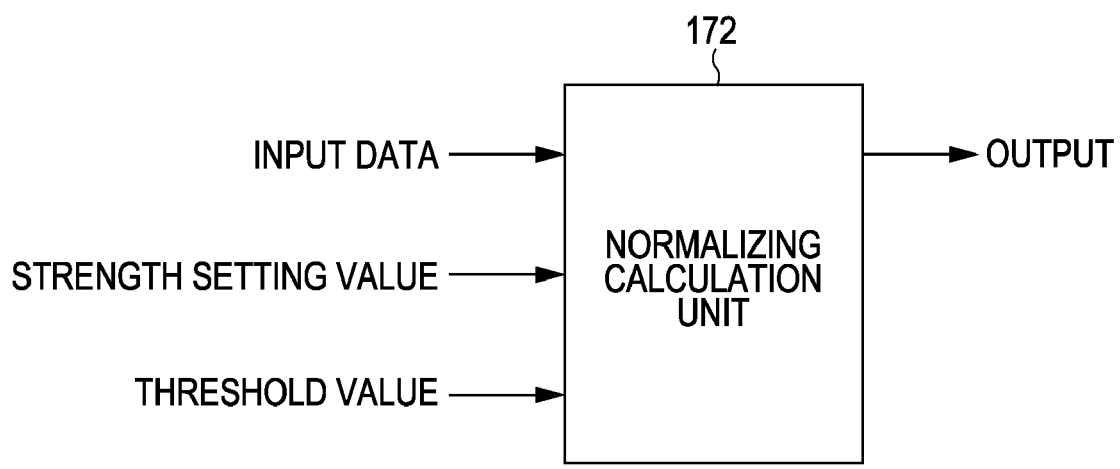
FIG. 21 is a diagram showing details of data input into a normalizing calculation unit shown in FIG. 19.

FIG. 21 is a diagram showing details of data transmitted to the normalizing calculation unit 172 shown in FIG. 19. The normalizing calculation unit 172 receives data from the adding unit 183 and receives data representing a given strength setting value and a given threshold value from the parameter acquisition unit 122. As will be described later with reference to FIG. 29, the normalizing calculation unit 172 normalizes the data received from the adding unit 183 using the strength setting value and the threshold value, and transmits an edge region weight signal representing the normalized value to the second mixing unit 162.

FIG. 22 is a block diagram showing an exemplary functional configuration of the ridge region detection unit 142 shown in FIG. 8. The ridge region detection unit 142 is provided with the ridge strength detection unit 201 and a normalizing calculation unit 202.

The ridge strength detection unit 201 is provided with the gradient calculation units 211-1, 211-2, and 211-3, the absolute value calculation units 212-1, 212-2, and 212-3, the adding units 213 and 214, the absolute value calculation unit 215, and the difference value calculation unit 216. The ridge strength detection unit 201 detects the ridge strength of externally input image data, and transmits data representing the detected ridge strength to the normalizing calculation unit 202.

Like the edge strength detection unit 171 shown in FIG. 19, for example, if the ridge strength detection unit 201 interpolates a pixel at the position q shown in FIG. 20, the ridge strength detection unit 201 acquires data representing the pixel value f(x−1) of the pixel x−1 on the left side of the position q, data representing the pixel value f(x) of the pixel x on the left side of the position q, data representing the pixel value f(x+1) of the pixel x+1 on the right side of the position q, and data representing the pixel value f(x+2) of the pixel x+2 on the right side of the position q from a buffer (not shown) included in the image interpolation unit 121. The data representing the pixel value f(x−1) and the data representing the pixel value f(x) are input into the gradient calculation unit 211-1. The data representing the pixel value f(x) and the data representing the pixel value f(x+1) are input into the gradient calculation unit 211-2. The data representing the pixel value f(x+1) and the data representing the pixel value f(x+2) are input into the gradient calculation unit 211-3.

As described previously, FIG. 20 shows a case in which a pixel is interpolated in a horizontal direction, that is, the image interpolation unit 121-2 interpolates the pixel. If a pixel is interpolated in a vertical direction, that is, the image interpolation unit 121-1 interpolates the pixel, the ridge strength detection unit 201 acquires data representing pixel values of four pixels above and beneath the position q from a buffer (not shown) included in the image interpolation unit 121.

The gradient calculation units 211-1, 211-2, and 211-3 calculate a gradient value that is the difference between pixel values of pixels in a region in which a plurality of pixels are included. More specifically, each of the gradient calculation units 211-1, 211-2, and 211-3 calculates the value of a gradient between pixels in a region in which the pixels x−1, x, x+1, and x+2 are included by calculating the difference between received pixel values of two adjacent pixels. The gradient calculation units 211-1, 211-2, and 211-3 transmit data representing the calculated gradient value to the absolute value calculation units 212-1, 212-2, and 212-3, respectively. In addition, each of the gradient calculation units 211-1, 211-2, and 211-3 transmits data representing the calculated gradient value to the adding unit 214.

Each of the absolute value calculation units 212-1, 212-2, and 212-3 calculates an absolute value of the received data, and transmits data representing the calculated absolute value to the adding unit 213.

The adding unit 213 adds a plurality of pieces of received data, and transmits data representing the sum to the difference value calculation unit 216.

The adding unit 214 adds a plurality of pieces of received data, and transmits data representing the sum to the absolute value calculation unit 215.

The absolute value calculation unit 215 calculates an absolute value of the received data, and transmits data representing the calculated absolute value to the difference value calculation unit 216.

The difference value calculation unit 216 calculates the difference between a plurality of pieces of received data, and transmits data representing the calculated difference value to the normalizing calculation unit 202.

Like the normalizing calculation unit 172 included in the edge region detection unit 141, the normalizing calculation unit 202 receives data from the difference value calculation unit 216 and receives data representing a given strength setting value and a threshold value from the parameter acquisition unit 122. As will be described later with reference to FIG. 31, the normalizing calculation unit 202 normalizes the data received from the difference value calculation unit 216 using the strength setting value and the threshold value, and transmits a ridge region weight signal representing the normalized value to first mixing unit 161.

Figure 23:
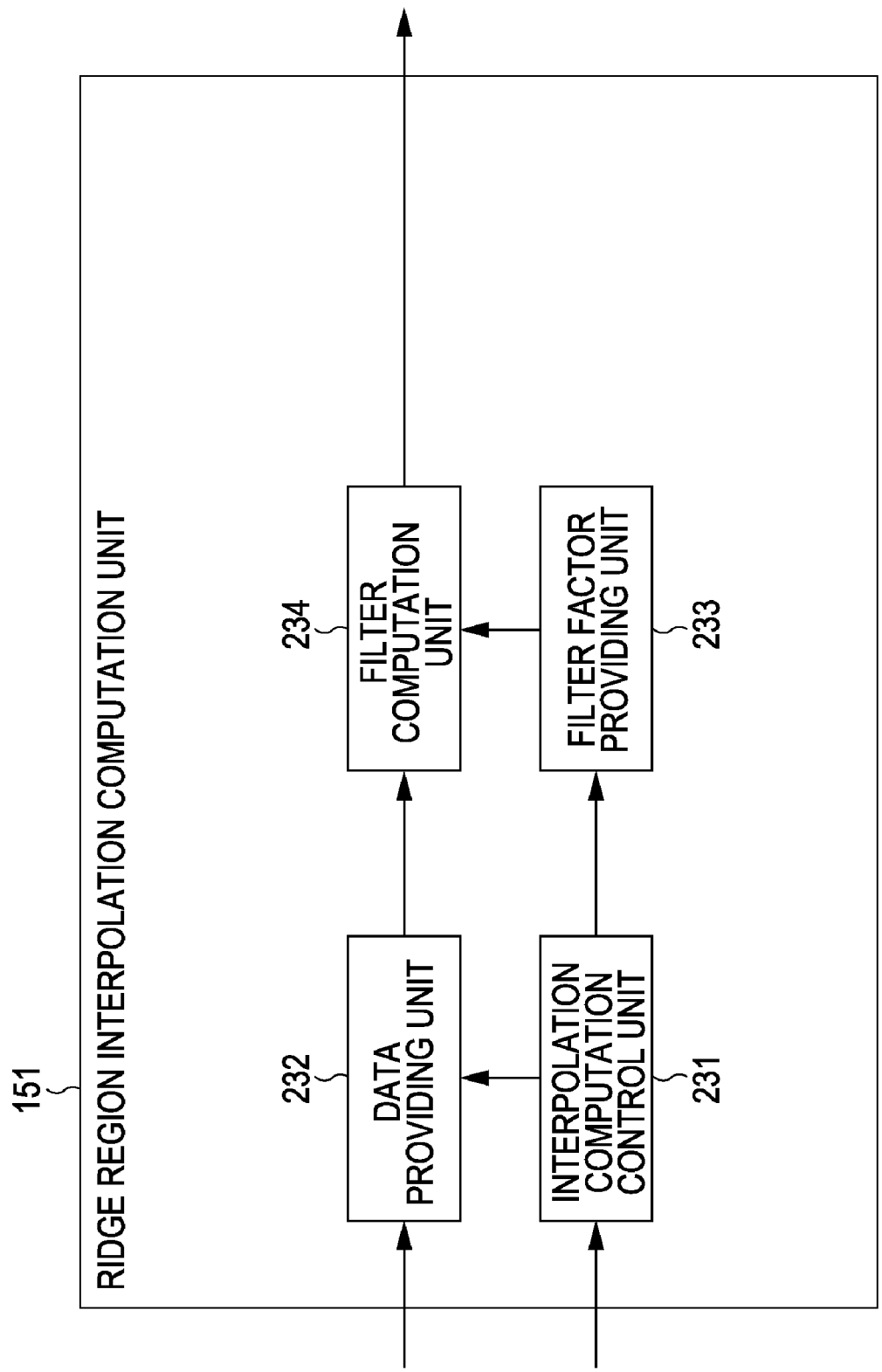
FIG. 23 is a block diagram showing an exemplary functional configuration of a ridge region interpolation computation unit shown in FIG. 8.

FIG. 23 is a block diagram showing an exemplary functional configuration of the ridge region interpolation computation unit 151 shown in FIG. 8. The ridge region interpolation computation unit 151 is provided with an interpolation computation control unit 231, a data providing unit 232, a filter factor providing unit 233, and a filter computation unit 234.

The interpolation computation control unit 231 creates a data request signal requesting acquirement of pixel values of pixels used to calculate a pixel value of a pixel to be interpolated on the basis of control information including the scaling factor of an image and an image transformation position which is transmitted from the parameter acquisition unit 122, and transmits the created data request signal to the data providing unit 232. In addition, the interpolation computation control unit 231 transmits an interpolation phase signal representing a phase of an interpolation position to the filter factor providing unit 233.

The data providing unit 232 includes a buffer for enabling externally received image data to be stored. The data providing unit 232 transmits data representing pixel values of pixels requested by the data request signal to the filter computation unit 234.

Upon receiving the interpolation phase signal, the filter factor providing unit 233 transmits a set of filter factors used for interpolation processing to the filter computation unit 234.

As will be described later with reference to FIG. 26, the filter computation unit 234 calculates a pixel value of a pixel to be interpolated at the interpolation position using the pixel values transmitted from the data providing unit 232 and the set of filter factors transmitted from the filter factor providing unit 233, and transmits data representing the calculated pixel value to the first mixing unit 161.

Figure 24:
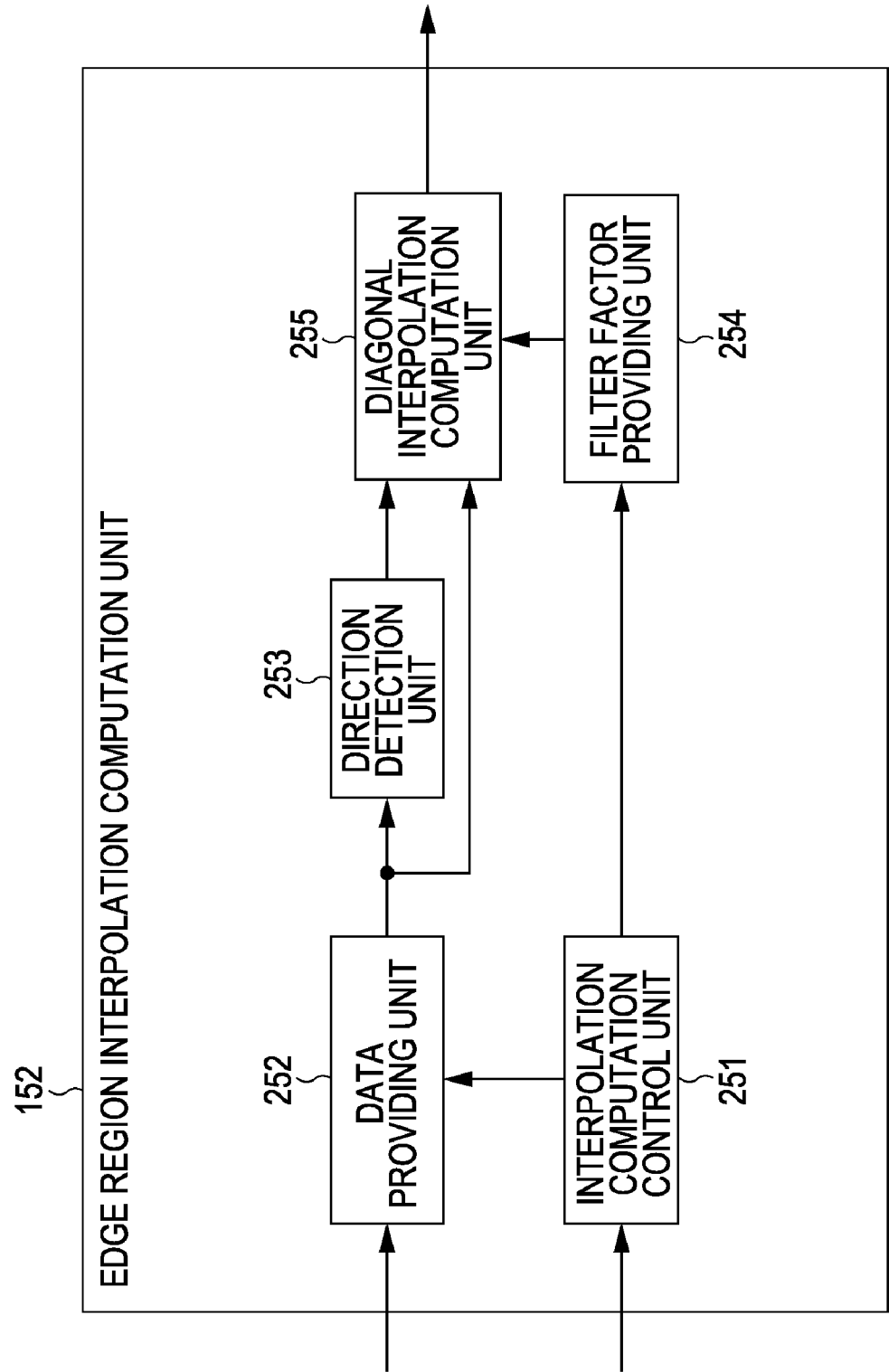
FIG. 24 is a block diagram showing an exemplary functional configuration of an edge region interpolation computation unit shown in FIG. 8.

FIG. 24 is a block diagram showing an exemplary functional configuration of the edge region interpolation computation unit 152 shown in FIG. 8. The edge region interpolation computation unit 152 is provided with an interpolation computation control unit 251, a data providing unit 252, a direction detection unit 253, a filter factor providing unit 254, and a diagonal interpolation computation unit 255.

The interpolation computation control unit 251 creates a data request signal requesting acquirement of pixel values of pixels used to calculate a pixel value of a pixel to be interpolated on the basis of control information including the scaling factor of an image and an image transformation position which is transmitted from the parameter acquisition unit 122, and transmits the created data request signal to the data providing unit 252. In addition, the interpolation computation control unit 251 transmits an interpolation phase signal representing a phase of an interpolation position to the filter factor providing unit 254.

The data providing unit 252 includes a buffer for enabling externally received image data to be stored. The data providing unit 252 transmits data representing pixel values of pixels requested by the data request signal to the direction detection unit 253 and the diagonal interpolation computation unit 255.

Figure 32:
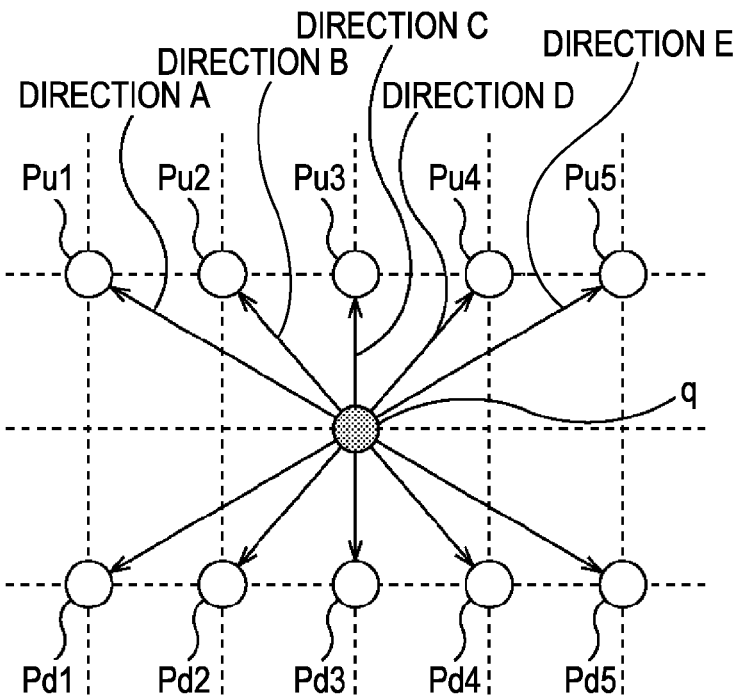
FIG. 32 is a diagram describing the diagonal interpolation.

As will be described later with reference to FIG. 32, the direction detection unit 253 determines correlations between the pixels in the vicinity of the interpolation position on the basis of the data transmitted from the data providing unit 252, and transmits to the diagonal interpolation computation unit 255 direction information representing a direction indicated by a combination of pixels between which there is the highest correlation.

Upon receiving the interpolation phase signal or receiving a request from the diagonal interpolation computation unit 255, the filter factor providing unit 254 transmits a set of filter factors used for interpolation processing to the diagonal interpolation computation unit 255.

The diagonal interpolation computation unit 255 acquires a set of filter factors used for pixel interpolation from the filter factor providing unit 254 as appropriate. As will be described later with reference to FIG. 32, the diagonal interpolation computation unit 255 calculates a pixel value of a pixel to be interpolated at the interpolation position using the pixel values transmitted from the data providing unit 252, the direction information transmitted from the direction detection unit 253, and the set of filter factors transmitted from the filter factor providing unit 254, and transmits data representing the calculated pixel value to the first mixing unit 161.

Figure 25:
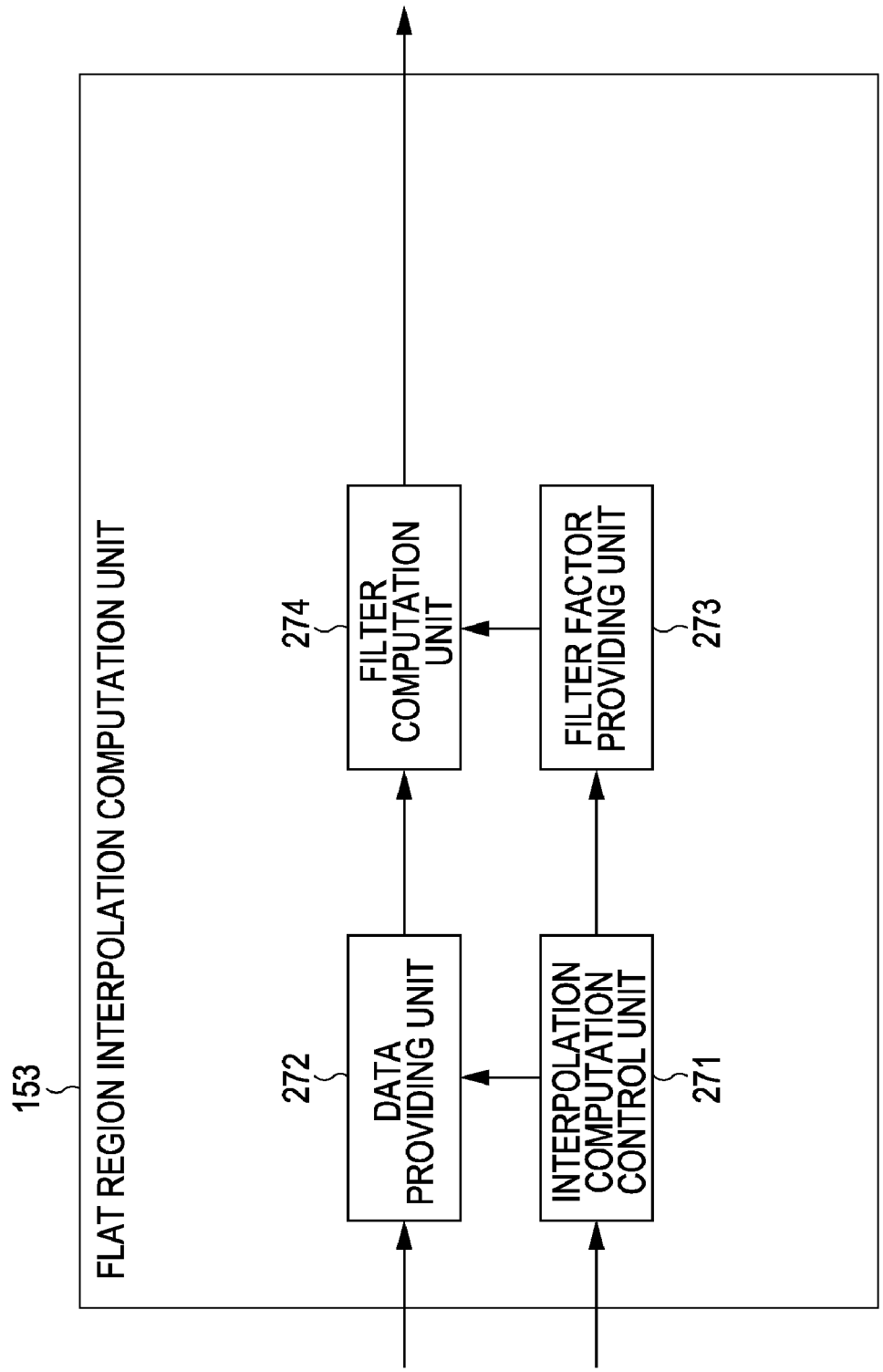
FIG. 25 is a block diagram showing an exemplary functional configuration of a flat region interpolation computation unit shown in FIG. 8.

FIG. 25 is a block diagram showing an exemplary functional configuration of the flat region interpolation computation unit 153 shown in FIG. 8. The flat region interpolation computation unit 153 is provided with an interpolation computation control unit 271, a data providing unit 272, a filter factor providing unit 273, and a filter computation unit 274.

The interpolation computation control unit 271 creates a data request signal requesting acquirement of pixel values of pixels used to calculate a pixel value of a pixel to be interpolated on the basis of control information including the scaling factor of an image and an image transformation position which is transmitted from the parameter acquisition unit 122, and transmits the created data request signal to the data providing unit 272. In addition, the interpolation computation control unit 271 transmits an interpolation phase signal representing a phase of an interpolation position to the filter factor providing unit 273.

The data providing unit 272 includes a buffer for enabling externally received image data to be stored. The data providing unit 272 transmits data representing pixel values of pixels requested by the data request signal to the filter computation unit 274.

Upon receiving the interpolation phase signal, the filter factor providing unit 273 transmits a set of filter factors used for interpolation processing to the filter computation unit 274.

As will be described later with reference to FIG. 26, the filter computation unit 274 calculates a pixel value of a pixel to be interpolated at the interpolation position using the pixel values transmitted from the data providing unit 272 and the set of filter factors transmitted from the filter factor providing unit 273, and transmits data representing the calculated pixel value to the second mixing unit 162.

Next, a resolution conversion process performed by the resolution converter 101 will be described with reference to a flowchart shown in FIG. 26. This process is started when a user operates an operation unit (not shown) included in the resolution converter 101 so as to instruct the resolution converter 101 to convert a resolution of image data.

In step S1, the image interpolation unit 121-1 receives image data upon which resolution conversion will be performed from the image input section 111, and stores the received image data in a buffer (not shown). The data providing unit 232 included in the ridge region interpolation computation unit 151, the data providing unit 252 included in the edge region interpolation computation unit 152, and the data providing unit 272 included in the flat region interpolation computation unit 153 store the received image data in their buffers (not shown).

In step S2, the edge region detection unit 141 included in the image interpolation unit 121-1 performs edge region detection processing. Here, the edge region detection processing will be described in detail with reference to a flowchart shown in FIG. 27.

In step S51, each of the gradient calculation units 181-1, 181-2, and 181-3 calculates a gradient between pixel values. More specifically, if a pixel is interpolated at an interpolation position q shown in FIG. 28, the edge region detection unit 141 acquires from the buffer (not shown) included in the image interpolation unit 121-1 data representing a pixel value $f(y-1)$ of a pixel y−1 above the interpolation position q, data representing a pixel value $f(y)$ of a pixel y above the interpolation position q, data representing a pixel value $f(y+1)$ of a pixel y+1 beneath the interpolation position q, and data representing a pixel value $f(y+2)$ of a pixel y+2 beneath the interpolation position q. The data representing the pixel value $f(y-1)$ and the data representing the pixel value $f(y)$ are input into the gradient calculation unit 181-1. The data representing the pixel value $f(y)$ and the data representing the pixel value $f(y+1)$ are input into the gradient calculation unit 181-2. The data representing the pixel value $f(y+1)$ and the data representing the pixel value $f(y+2)$ are input into the gradient calculation unit 181-3.

The gradient calculation units 181-1, 181-2, and 181-3 calculate gradient values, each of which is the difference between pixel values of adjacent pixels, using the following equations 1, 2, and 3, respectively.

$$Da = f(y) - f(y-1) \qquad 1$$

$$Db = f(y+1) - f(y) \qquad 2$$

$$Dc = f(y+2) - f(y+1) \qquad 3$$

The gradient calculation unit 181-1 transmits data representing a gradient value Da to the absolute value calculation unit 182-1. The gradient calculation unit 181-2 transmits data representing a gradient value Db to the absolute value calculation unit 182-2. The gradient calculation unit 181-3 transmits data representing a gradient value Dc to the absolute value calculation unit 182-3.

In step S52, the absolute value calculation units 182-1, 182-2, and 182-3 calculate absolute values of the gradient values. More specifically, the absolute value calculation units 182-1, 182-2, and 182-3 calculate absolute values of the received gradient values Da, Db, and Dc using the following equations 4, 5, and 6, respectively.

$$Aa = |Da| \qquad 4$$

$$Ab = |Db| \qquad 5$$

$$Ac = |Dc| \qquad 6$$

The absolute value calculation units 182-1, 182-2, and 182-3 transmit data representing the calculated absolute value Aa, data representing the calculated absolute value Ab, and data representing the calculated absolute value Ac to the adding unit 183, respectively.

In step S53, the adding unit 183 calculates an edge strength. More specifically, the adding unit 183 adds the received absolute values Aa, Ab, and Ac using the following equation 7.

$$S = Aa + Ab + Ac \qquad 7$$

Figure 28:
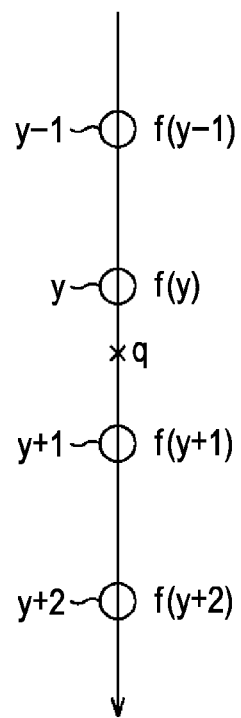
FIG. 28 is a diagram showing exemplary pixel values input into the edge region detection unit shown in FIG. 8.

The adding unit 183 transmits data representing a sum S to the normalizing calculation unit 172 as an value representing the magnitude of a change in a pixel value in a region (hereinafter referred to as a tap region) in which the pixels y−1, y, y+1, and y+2 shown in FIG. 28 are included, that is, as an edge strength.

In step S54, the normalizing calculation unit 172 calculates an edge weight value, and then this edge region detection process ends. More specifically, the normalizing calculation unit 172 calculates an edge weight value Ew using the sum S transmitted from the adding unit 183, a strength setting value Ge and a threshold value Te which are transmitted from the parameter acquisition unit 122 on the basis of the following equation 8.

$$EW = \begin{cases} 0.0 & (S < Te) \\ (S - Te) \times Ge & \left(Te \leq S \leq Te + \dfrac{1}{Ge}\right) \\ 1.0 & \left(S > Te + \dfrac{1}{Ge}\right) \end{cases} \qquad 8$$

Figure 29:
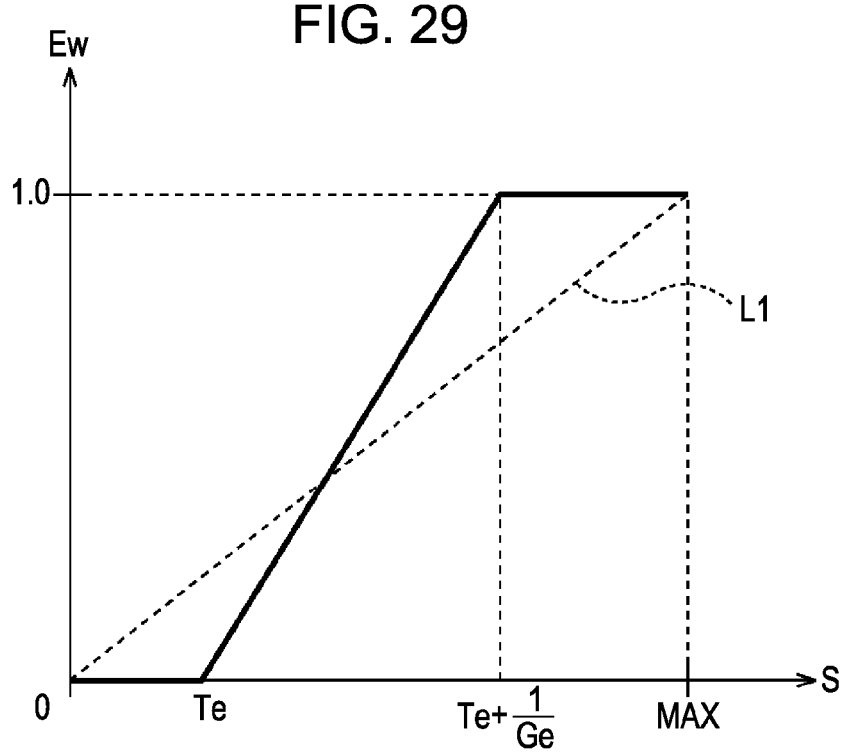
FIG. 29 is a graph showing a relationship between the input and output of the normalizing calculation unit shown in FIG. 19.

FIG. 29 is a graph showing the relationship between the sum S and the edge weight value Ew. When the sum S<the threshold value Te, the edge weight value Ew is 0.0. When the threshold value Te≦the sum S≦Te+1/Ge, the edge weight value Ew is a value acquired by converting the sum S at a rate of change larger than that of an additional line L1 that represents a case in which the sum S is proportional to the edge weight value Ew. When the sum S>Te+1/Ge, the edge weight value Ew is 1.0. Accordingly, the higher the edge strength in a tap region including the interpolation position q becomes (the larger the sum S becomes), the larger the edge weight value Ew becomes. The smaller the edge strength becomes (the smaller the sum S becomes), the smaller the edge weight value Ew becomes. That is, as the edge strength in the vicinity of the interpolation position q becomes higher, the edge weight value Ew becomes closer to 1.0.

The normalizing calculation unit 172 transmits an edge region weight signal representing the edge weight value Ew to the second mixing unit 162.

Referring back to FIG. 26, in step S3, the ridge region detection unit 142 performs ridge region detection processing. Here, the ridge region detection processing will be described in detail with reference to a flowchart shown in FIG. 30.

In step S71, each of the gradient calculation units 211-1, 211-2, and 211-3 calculates a gradient between pixel values. More specifically, if a pixel is interpolated at the interpolation position q shown in FIG. 28, the data representing the pixel value f(y−1) and the data representing the pixel value f(y) are input into the gradient calculation unit 211-1, the data representing the pixel value f(y) and the data representing the pixel value f(y+1) are input into the gradient calculation unit 211-2, and the data representing the pixel value f(y+1) and the data representing the pixel value f(y+2) are input into the gradient calculation unit 211-3.

The gradient calculation units 211-1, 211-2, and 211-3 calculate gradient values, each of which is the difference between pixel values of adjacent pixels, using the following equations 9, 10, and 11, respectively.

$$Da = f(y) - f(y-1) \qquad 9$$

$$Db = f(y+1) - f(y) \qquad 10$$

$$Dc = f(y+2) - f(y+1) \qquad 11$$

The gradient calculation unit 211-1 transmits data representing a gradient value Da to the absolute value calculation unit 212-1 and the adding unit 214. The gradient calculation unit 211-2 transmits data representing a gradient value Db to the absolute value calculation unit 212-2 and the adding unit 214. The gradient calculation unit 211-3 transmits data representing a gradient value Dc to the absolute value calculation unit 212-3 and the adding unit 214.

In step S72, the absolute value calculation units 212-1, 212-2, and 212-3 calculate absolute values of the gradient values. More specifically, the absolute value calculation units 212-1, 212-2, and 212-3 calculate absolute values of the received gradient values Da, Db, and Dc using the following equations 12, 13, and 14, respectively.

$$Aa = |Da| \qquad 12$$

$$Ab = |Db| \qquad 13$$

$$Ac = |Dc| \qquad 14$$

The absolute value calculation units 212-1, 212-2, and 212-3 transmit data representing the calculated absolute value Aa, data representing the calculated absolute value Ab, and data representing the calculated absolute value Ac to the adding unit 213, respectively.

In step S73, the adding unit 213 calculates an edge strength. More specifically, the adding unit 213 adds the received absolute values Aa, Ab, and Ac using the following equation 15.

$$SA = Aa + Ab + Ac \quad\quad 15$$

A sum SA is the same as the sum S calculated by the above-described equation 7. That is, the sum SA represents an edge strength in the region (tap region) in which the pixels y−1, y, y+1, and y+2 are included. The adding unit 213 transmits data representing the sum SA to the difference value calculation unit 216.

In step S74, the adding unit 214 calculates the sum of the received gradient values. More specifically, the adding unit 214 calculates the sum of the gradient values Da, Db, and Dc using the following equation 16.

$$SD = Da + Db + Dc \quad\quad 16$$

The adding unit 214 transmits data representing a sum SD to the absolute value calculation unit 215.

In step S75, the absolute value calculation unit 215 calculates an absolute value of the sum of the gradient values. More specifically, the absolute value calculation unit 215 calculates an absolute value of the sum SD using the following equation 17.

$$SAD = |SD| \quad\quad 17$$

It is assumed that a change in a pixel value in the tap region, in which the pixels y−1, y, y+1, and y+2 are included, is represented by a graph. If the pixel value of the pixel y or y+1 is not the maximum or minimum value, that is, if the change in a pixel value is a broadly defined monotonic increase or decrease (including a case in which pixel values of adjacent pixels are the same), the absolute value SAD and the sum SA are the same. On the other hand, if the pixel value of the pixel y or y+1 is the maximum or minimum value, that is, if the direction of a pixel value change is changed in the tap region, the absolute value SAD is smaller than the sum SA. If the pixel value change in the tap region becomes closer to a symmetrical pulse shape, the absolute value SAD becomes closer to zero.

The absolute value calculation unit 215 transmits data representing the absolute value SAD to the difference value calculation unit 216.

In step S76, the difference value calculation unit 216 calculates a ridge strength. More specifically, the difference value calculation unit 216 calculates the difference between the sum SA and the absolute value SAD using the following equation 18.

$$S = SA - SAD \quad\quad 18$$

The difference value calculation unit 216 transmits data representing a difference value S to the normalizing calculation unit 202 as the ridge strength in the tap region. The larger the difference between the sum SA and the absolute value SAD becomes, the larger the difference value S becomes. That is, when a pixel value is changed in accordance with a positional change in the tap region in the form of a pulse, the steeper the gradient of the pulse becomes and the higher the height of the pulse becomes, the larger the difference value S becomes.

In step S77, the normalizing calculation unit 202 calculates a ridge weight value, and then this ridge region detection process ends. More specifically, the normalizing calculation unit 202 calculates a ridge weight value Pw using the difference value S transmitted from difference value calculation unit 216, a strength setting value Gp and a threshold value Tp which are transmitted from the parameter acquisition unit 122 on the basis of the following equation 19.

$$PW = \begin{cases} 0.0 & (S < Tp) \\ (S - Tp) \times Gp & \left(Tp \leq S \leq Tp + \frac{1}{Gp}\right) \\ 1.0 & \left(S > Tp + \frac{1}{Gp}\right) \end{cases} \quad 19$$

Figure 31:
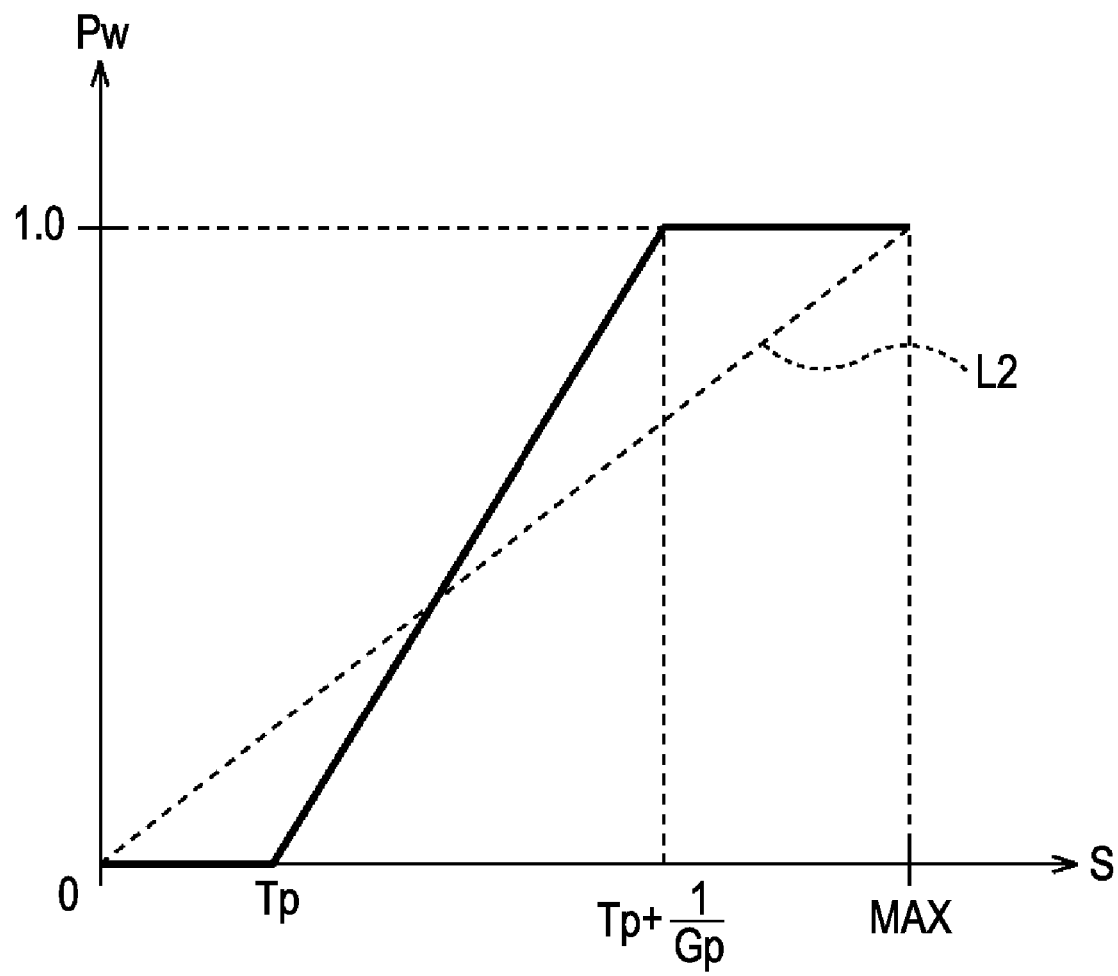
FIG. 31 is a graph showing a relationship between the input and output of a normalizing calculation unit shown in FIG. 22.

FIG. 31 is a graph showing the relationship between the difference value S and the ridge weight value Pw. When the difference value S<the threshold value Tp, the ridge weight value Pw is 0.0. When the threshold value Tp≦the difference value S≦Tp+1/Gp, the ridge weight value Pw is a value acquired by converting the difference value S at a rate of change larger than that of an additional line L2 that represents a case in which the difference value S is proportional to the ridge weight value Pw. When the difference value S>Tp+1/Gp, the ridge weight value is 1.0. Accordingly, the higher the ridge strength in the tap region including the interpolation position q becomes (the larger the difference value S becomes), the larger the ridge weight value Pw becomes. The smaller the ridge strength becomes (the smaller the difference value S becomes), the smaller the ridge weight value Pw becomes. That is, as the ridge strength in the vicinity of the interpolation position q becomes higher, the ridge weight value Pw becomes closer to 1.0.

The normalizing calculation unit 202 transmits a ridge region weight signal representing the ridge weight value Pw to the first mixing unit 161.

Referring back to FIG. 26, in step S4, the ridge region interpolation computation unit 151 included in the image interpolation unit 121-1 performs interpolation processing suitable for a region including a ridge. More specifically, the interpolation computation control unit 231 included in the ridge region interpolation computation unit 151 creates a data request signal requesting acquirement of pixel values of pixels used to calculate a pixel value of a pixel to be interpolated on the basis of control information including the scaling factor of an image and an image transformation position which is transmitted from the parameter acquisition unit 122, and transmits the created data request signal to the data providing unit 232. In addition, the interpolation computation control unit 231 transmits an interpolation phase signal representing a phase of an interpolation position to the filter factor providing unit 233.

The data providing unit 232 transmits data representing pixel values of pixels requested by the data request signal to the filter computation unit 234. For example, if the ridge region interpolation computation unit 151 performs interpolation processing using a 16th-order interpolation filter, the data providing unit 232 transmits data representing pixel values f(y−7) through f(y+8) of the total 16 pixels in the same vertical line in which the interpolation position is located, 8 pixels of the total 16 pixels being located above the interpolation position, 8 pixels of the total 16 pixels being located beneath the interpolation position.

Upon receiving the interpolation phase signal, the filter factor providing unit 233 transmits a set of filter factors c[0] through c[15] used for interpolation processing to the filter computation unit 234.

The filter computation unit 234 calculates a pixel value Pd of a pixel to be interpolated using the pixel values transmitted from the data providing unit 232 and the set of filter factors transmitted from the filter factor providing unit 233. For example, the filter computation unit 234 calculates the pixel value Pd using the following equation 20.

$$Pd = c[15] \times f(y-7) + c[14] \times f(y-6) + \ldots + c[8] \times f(y) + c[7] \times f(y+1) + \ldots c[1] \times f(y+7) + c[0] \times f(y+8) \quad (20)$$

The filter computation unit 234 transmits data representing the calculated value Pd to the first mixing unit 161. Image data including the pixel value Pd is image data acquired by performing interpolation processing upon the input image data using the high-order filter interpolation method. Accordingly, in the image data including the pixel value Pd, the occurrence of aliasing distortion due to interpolation processing can be prevented.

In step S5, the edge region interpolation computation unit 152 included in the image interpolation unit 121-1 performs interpolation processing suitable for a region including a step edge. More specifically, the interpolation computation control unit 251 included in the edge region interpolation computation unit 152 creates a data request signal requesting acquirement of pixel values of pixels used to calculate a pixel value of a pixel to be interpolated on the basis of control information including the scaling factor of an image and an image transformation position which is transmitted from the parameter acquisition unit 122, and transmits the created data request signal to the data providing unit 252. In addition, the interpolation computation control unit 251 transmits an interpolation phase signal representing a phase of an interpolation position to the filter factor providing unit 254.

The data providing unit 252 transmits data representing pixel values of pixels requested by the data request signal to the direction detection unit 253 and the diagonal interpolation computation unit 255. For example, if a pixel is interpolated at an interpolation position q shown in FIG. 32, the data providing unit 252 transmits data representing pixel values of pixels Pu 1 through Pu 5 in a line directly above a line in which the interpolation position q is located, and data representing pixel values of pixels Pd 1 through Pd 5 in a line directly below the line in which the interpolation position q is located.

The direction detection unit 253 determines correlations between the pixels near the interpolation position q. For example, the direction detection unit 253 calculates the differences between pixel values of the pixels Pu 1 and Pd 5 in a direction A, pixel values of the pixels Pu 2 and Pd 4 in a direction B, pixel values of the pixels Pu 3 and Pd 3 in a direction C, pixel values of the pixels Pu 4 and Pd 2 in a direction D, and pixel values of the pixels Pu 5 and Pd 1 in a direction E. In each direction, the interpolation position q is the center of a line connecting two pixels. Subsequently, the direction detection unit 253 sets a combination of pixels which has the smallest absolute value of the difference between the pixels as a combination of pixels with the highest correlation, and transmits direction information on a direction indicated by the combination of pixels with the highest correlation (hereinafter referred to as a high-correlation direction) to the diagonal interpolation computation unit 255. If a plurality of combinations of pixels each of which has the smallest absolute value of the difference between the pixels are detected, the high-correlation direction is selected in accordance with a predetermined rule. For example, a direction farthest from a direction indicated by a combination of pixels which has the largest absolute value of the difference between the pixels is selected from among directions indicated by the combinations of pixels each of which has the smallest absolute value of the difference between the pixels.

The diagonal interpolation computation unit 255 calculates a pixel value Ed of a pixel to be interpolated at the interpolation position q on the basis of the received direction information. For example, the average of pixel values of two pixels in the direction indicated by the direction information is set as the pixel value Ed. Alternatively, for example, a value acquired by performing weighted addition of pixel values of the total four pixels, two pixels in the direction indicated by the direction information, two pixels above and beneath the interpolation position q, using filter factors transmitted from the filter factor providing unit 254 is set as the pixel value Ed.

Figure 33:
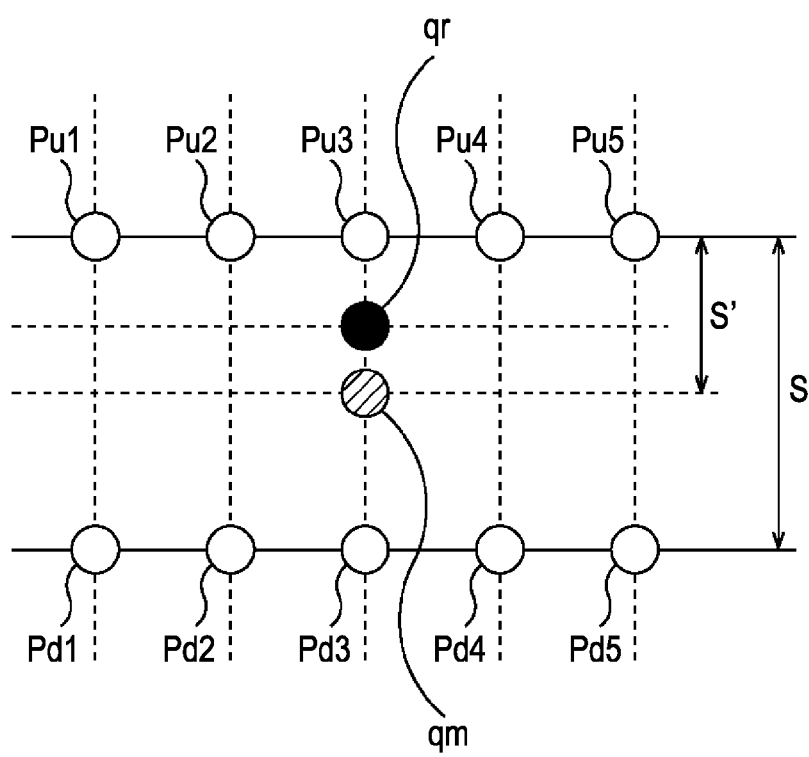
FIG. 33 is another diagram describing the diagonal interpolation.

As shown in FIG. 33, if the phase of an interpolation position qr is different from the phase of a position qm that is the midpoint of a sampling interval S, the diagonal interpolation computation unit 255 calculates a pixel of a pixel to be interpolated at the position qm. Subsequently, the diagonal interpolation computation unit 255 acquires from the filter factor providing unit 254 a set of filter factors corresponding to the phase of the interpolation position qr located in a new sampling interval S' defined by the pixel Pu 3 and the position qm, and calculates the pixel value Ed of a pixel to be interpolated at the interpolation position qr using the acquired filter factors.

The diagonal interpolation computation unit 255 transmits data representing the calculated pixel value Ed to the first mixing unit 161. Image data including the pixel value Ed is image data acquired by performing interpolation processing upon the input image data using the diagonal interpolation method. Accordingly, in the image data including the pixel value Ed, the occurrence of jaggies due to interpolation processing can be prevented.

The diagonal interpolation method is not limited to the above-described method. For example, in addition to the above-described diagonal interpolation processing, processing for preventing false direction detection, improving detection accuracy, or preventing the occurrence of interpolation errors may be performed. For example, the details of the diagonal interpolation are disclosed in Japanese Unexamined Patent Application Publication No. 2004-153668 filed by the assignee of this application.

In step S6, the flat region interpolation computation unit 153 included in the image interpolation unit 121-1 performs interpolation processing suitable for a flat region. More specifically, the interpolation computation control unit 271 included in the flat region interpolation computation unit 153 creates a data request signal requesting acquirement of pixel values of pixels used to calculate a pixel value of a pixel to be interpolated on the basis of control information including the scaling factor of an image and an image transformation position, and transmits the created data request signal to the data providing unit 272. In addition, the interpolation computation control unit 271 transmits an interpolation phase signal representing a phase of an interpolation position to the filter factor providing unit 273.

The data providing unit 272 transmits data representing pixel values of pixels requested by the data request signal to the filter computation unit 274. For example, the data providing unit 272 transmits data representing the pixel values f(y−1) and f(y) of the pixels y−1 and y above the interpolation position q shown in FIG. 28 and data representing the pixel values f(y+1) and f(y+2) of the pixels y+1 and y+2 beneath the interpolation position q.

Upon receiving the interpolation phase signal, the filter factor providing unit 273 transmits to the filter computation unit 274 a set of filter factors c[0] through c[3] used to perform interpolation processing on the basis of the bicubic interpolation method.

The filter computation unit 274 calculates a pixel value Fd of a pixel to be interpolated using the pixel values transmitted from the data providing unit 272 and the set of filter factors transmitted from the filter factor providing unit 273. For example, the filter computation unit 274 calculates the pixel value Fd using the following equation 21.

$$Fd=c[3]\times f(y-1)+c[2]\times f(y)+c[1]\times f(y+1)+c[0]\times f(y+2) \quad (21)$$

The filter computation unit 274 transmits data representing the calculated value Fd to the second mixing unit 162. Image data including the pixel value Fd is image data acquired by performing interpolation processing upon the input image data using the bicubic interpolation method. Accordingly, the image data including the pixel value Fd can achieve an accurately interpolated natural image.

The distances between the interpolation position q and the pixels y−1 through y+2 are individually defined as di (i=−1, 0, 1, and 2), filter factors c[i] (i=−1, 0, 1, and 2) may be calculated using the following equation 22.

$$C[i] = \begin{cases} |di|^3 - 2|di|^2 + 1 & (|di| \le 1) \\ -|di|^3 - 5|di|^2 - 8|di| + 4 & (1 < |di| \le 2) \\ 0 & (2 < |di|) \end{cases} \quad (22)$$

In step S7, the first mixing unit 161 mixes pixels using the ridge region weight signal. More specifically, the first mixing unit 161 performs weighted addition of the pixel value Pd transmitted from the ridge region interpolation computation unit 151 and the pixel value Ed transmitted from the edge region interpolation computation unit 152 using the ridge weight value Pw indicated by the ridge region weight signal transmitted from the ridge region detection unit 142 on the basis of the following equation 23.

$$M1=(1-Pw)\times Ed+Pw\times Pd \quad (23)$$

When the ridge weight value Pw is 1.0, a pixel value M1 is equal to the pixel value Pd. When the ridge weight value Pw is 0.0, the pixel value M1 is equal to the pixel value Ed. When the ridge weight value Pw becomes closer to 1.0, the pixel value M1 has more components of the pixel value Pd. When the ridge weight value Pw becomes closer to 0.0, the pixel value M1 has more components of the pixel value Ed.

The first mixing unit 161 transmits data representing the pixel value M1 upon which weighted addition has been performed to the second mixing unit 162.

In step S8, the second mixing unit 162 mixes pixels using the edge region weight signal. More specifically, the second mixing unit 162 performs weighted addition of the pixel value M1 transmitted from the first mixing unit 161 and the pixel value Fd transmitted from the flat region interpolation computation unit 153 using the edge weight value Ew indicated by the edge region weight signal transmitted from the edge region detection unit 141 on the basis of the following equation 24.

$$M2=(1-Ew)\times Fd+Ew\times M1 \quad (24)$$

When the edge weight value Ew is 1.0, a pixel value M2 is equal to the pixel value M1. When the edge weight value Ew is 0.0, the pixel value M2 is equal to the pixel value Fd. When the edge weight value Ew becomes closer to 1.0, the pixel value M2 has more components of the pixel value M1. When the edge weight value Ew becomes closer to 0.0, the pixel value M2 has more components of the pixel value Fd.

The second mixing unit 162 transmits data representing the pixel value M2 to a subsequent stage, in this case, to the image interpolation unit 121-2. The image interpolation unit 121-2 stores the received data in a buffer (not shown). Each of the data providing unit 232 included in the ridge region interpolation computation unit 151, the data providing unit 252 included in the edge region interpolation computation unit 152, and the data providing unit 272 included in the flat region interpolation computation unit 153, which are included in the image interpolation unit 121-2, stores the received data in its buffer (not shown).

In step S9, the image interpolation unit 121-1 determines whether vertical interpolation processing has been completed. If pixels to be interpolated still exist, the image interpolation unit 121-1 determines that the vertical interpolation has not yet been completed. Subsequently, the process returns to step S2. Until it is determined in step S9 that the vertical interpolation processing has been completed, the process from step S2 through step S9 is repeatedly performed. That is, the pixel value M2 corresponding to each interpolation position included in the image data received from the image input section 111 is calculated, and data representing the pixel value M2 is transmitted to the image interpolation unit 121-2.

If it is determined in step S9 that the vertical interpolation processing has been completed, the process proceeds to step S10. Until it is determined in step S17 that horizontal interpolation processing has been completed, the process from step S10 through step S17 is repeatedly performed. The process from step S10 through step S17 is the same as the process from step S2 through step S9, and the description thereof will be therefore omitted. Although the vertical interpolation processing is performed upon the image data received from the image input section 111 in the process from step S2 through step S9, the horizontal interpolation processing is performed upon the image data including the pixel value M2 which has undergone the vertical interpolation processing and is then transmitted from the image interpolation unit 121-1 in the process from step S10 through step S17.

If it is determined in step S17 that the horizontal interpolation processing has been completed, the process proceeds to step S18.

In step S18, the image display section 113 displays a resolution-converted image, and then the resolution conversion process ends. More specifically, the image display section 113 displays an image on the basis of the image data including the pixel value M2 which is transmitted from the image interpolation unit 121-2, that is, image data acquired by performing the vertical interpolation processing and the horizontal interpolation processing upon the image data received from the image input section 111 to convert the resolution of the original image.

Thus, in the image data received by the image interpolation unit 121-1 or 121-2, a pixel having a number of components of the pixel value Pd, which has been calculated using an interpolation method suitable for a region including a ridge, is interpolated in the vicinity of a ridge whose ridge weight value Pw is 1.0 or close to 1.0. A pixel having a number of components of the pixel value Ed, which has been calculated using an interpolation method suitable for a region including a step edge, is interpolated in the vicinity of a step edge whose edge weight value Ew is 1.0 or close to 1.0 and whose ridge weight value Pw is 0.0 or close to 0.0. A pixel having a number of components of the pixel value Fd, which has been calculated using an interpolation method suitable for a region including a flat region, is interpolated in a region located apart from a ridge and a step edge whose edge weight values Ew are 0.0 or close to 0.0. That is, appropriate interpolation processing is performed in the vicinity of ridges included in input image data, in the vicinity of step edges included in input image data, and in a region located apart from the ridges and step edges.

Figure 2:
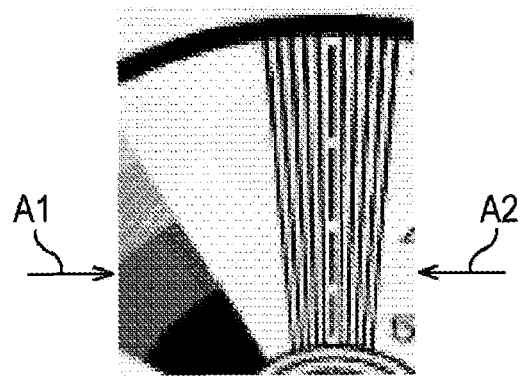
FIG. 2 is a diagram showing an original image to be enlarged.
Figure 34:
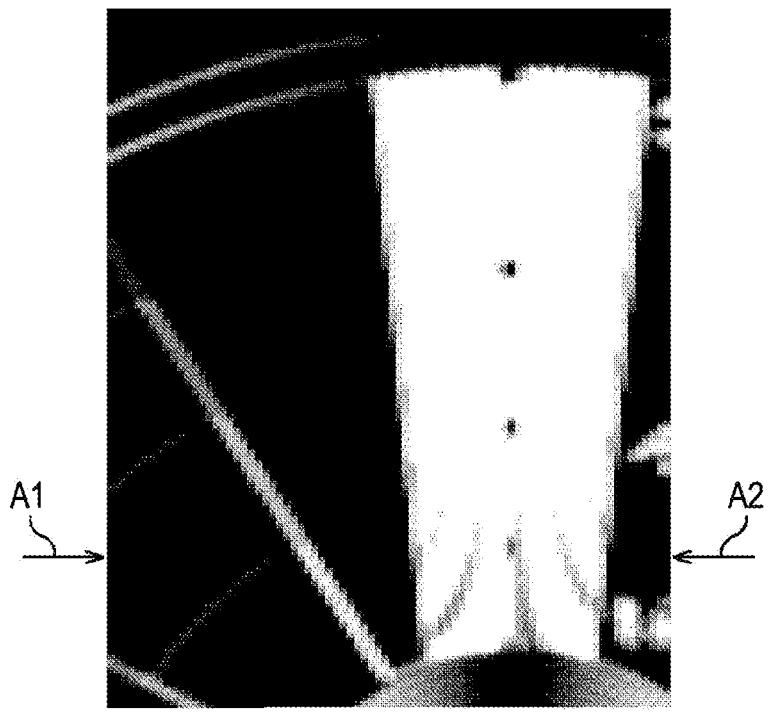
FIG. 34 is a diagram showing an image acquired from the original image shown in FIG. 2 using an edge region weight signal created by the edge region detection unit shown in FIG. 8.
Figure 35:
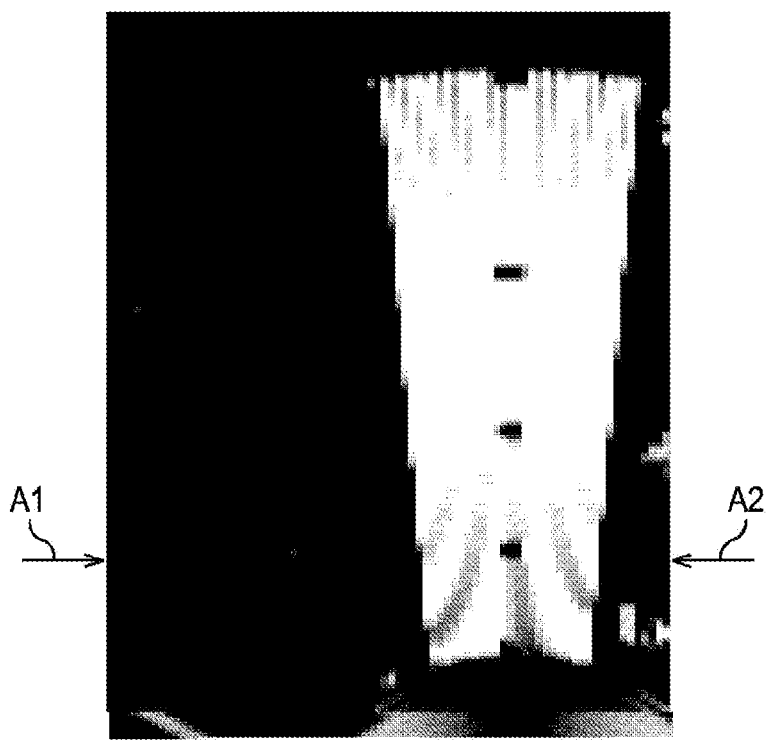
FIG. 35 is a diagram showing an image acquired from the original image shown in FIG. 2 using a ridge region weight signal created by the ridge region detection unit shown in FIG. 8.
Figure 36:
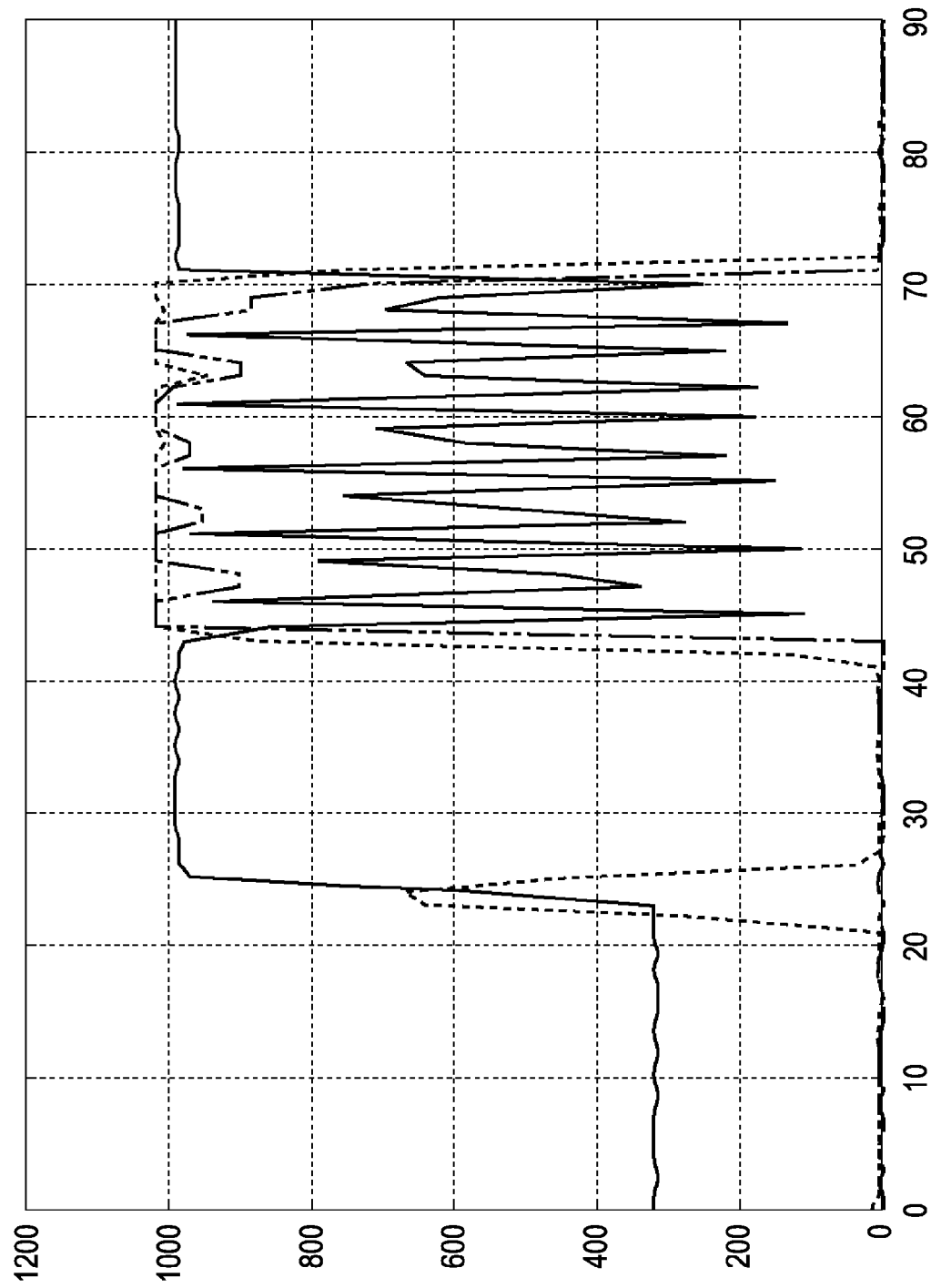
FIG. 36 is a graph showing changes in pixel values in images shown in FIGS. 2, 34, and 35.

FIG. 34 is a diagram showing an image acquired from the image data of the original image shown in FIG. 2 using an edge region weight signal created by the edge region detection unit 141. FIG. 35 is a diagram showing an image acquired from the image data of the original image shown in FIG. 2 using a ridge region weight signal created by the ridge region detection unit 142. FIG. 36 is a graph showing changes in pixel values (an edge weight value and a ridge weight value) in portions individually sandwiched between arrows A1 and arrows A2 in the images shown in FIGS. 34 and 35, the portions corresponding to the portion sandwiched between the arrows A1 and A2 in the original image shown in FIG. 2. In FIG. 36, a solid line represents a change in a pixel value in the original image (FIG. 2), a dotted line represents a change in a pixel value in the image (FIG. 34) acquired using the edge region weight signal, and a two-dot chain line represents a change in a pixel value in the image (FIG. 35) acquired using the ridge region weight signal.

As shown in FIG. 36, a pixel value (an edge weight value) is large in an edge region including ridges in the image shown in FIG. 34. The edge region corresponds to a region in the original image shown in FIG. 2 in which a pixel value is abruptly changed in the form of a pulse. That is, regions around edges in the original image shown in FIG. 2 are accurately extracted. In addition, it can be shown that a pixel value (ridge weight value) is large in ridge regions in the image shown in FIG. 35. The ridge regions correspond to regions around ridges in the original image shown in FIG. 2 in which a pixel value is abruptly changed in the form of a pulse. That is, the regions around ridges in the original image shown in FIG. 2 are accurately extracted.

Thus, the ridge strength and the edge strength can be accurately detected by using the resolution converter 101 according to an embodiment of the present invention. As described previously, the ridge strength and the edge strength can be easily calculated using simple arithmetic expressions. In addition, a ridge and a step edge can be easily extracted from an image and can be distinguished using the ridge strength and the edge strength.

Figure 3:
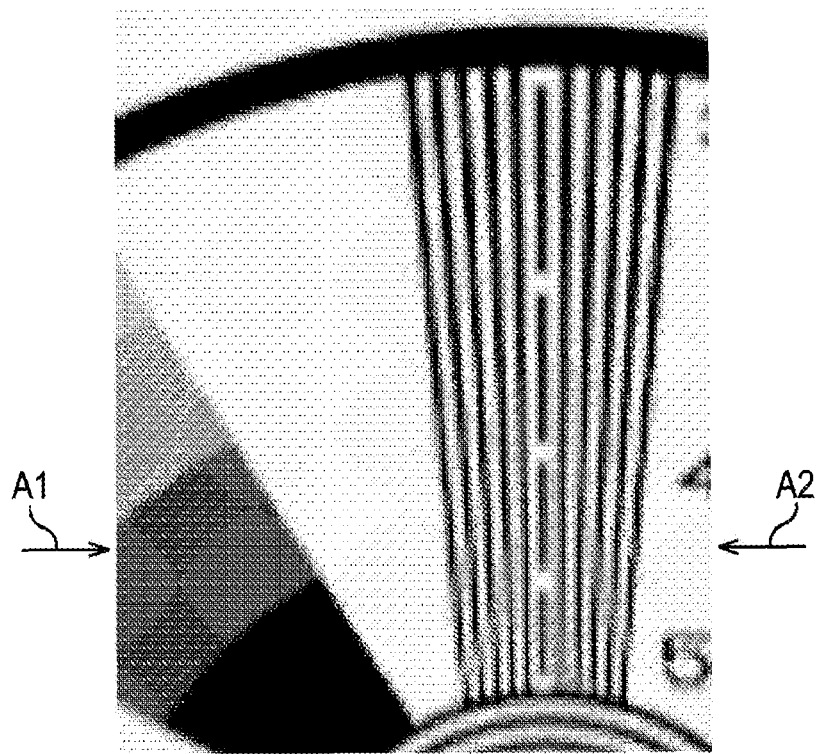
FIG. 3 is a diagram showing an image acquired by enlarging the original image shown in FIG. 2 using the bicubic interpolation method.
Figure 4:
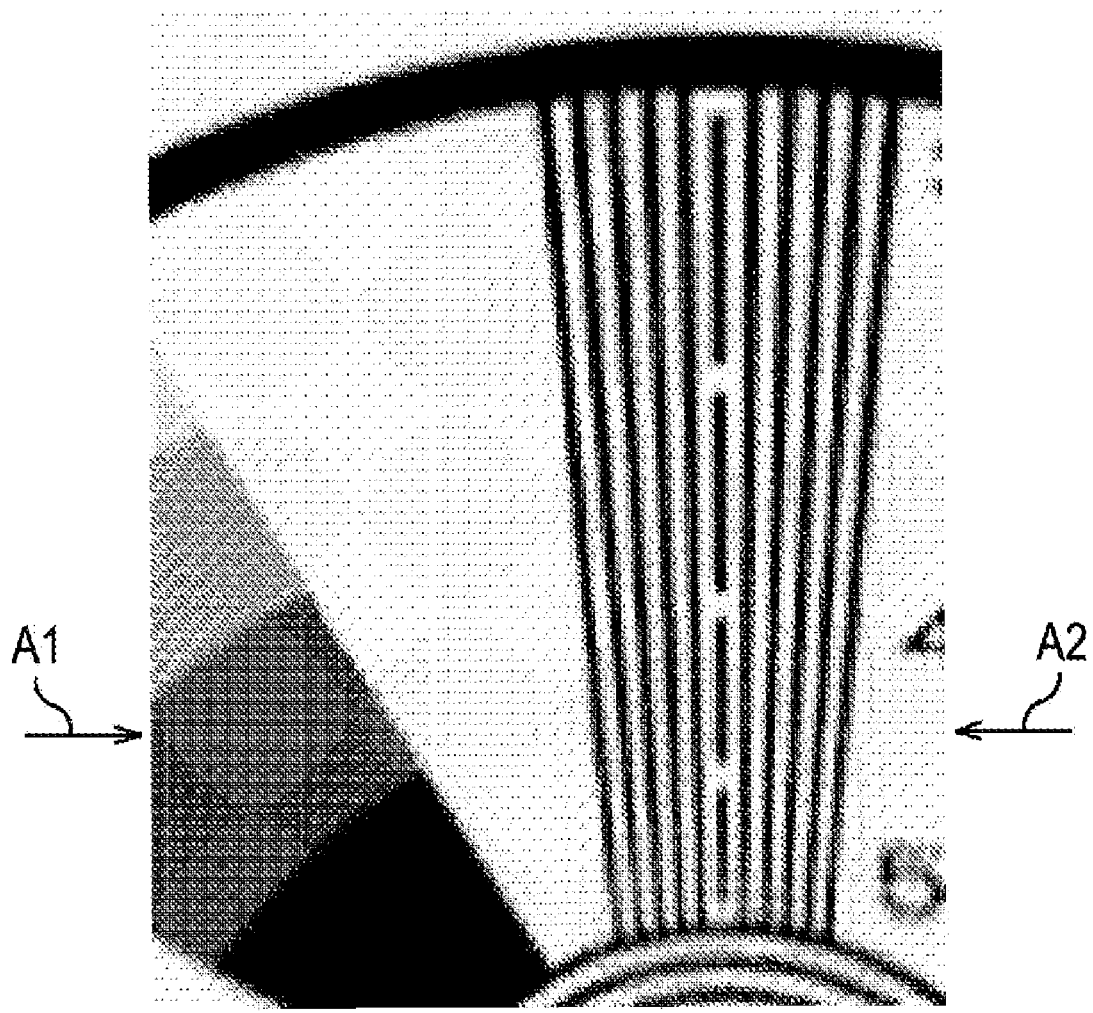
FIG. 4 is a diagram showing an image acquired by enlarging the original image shown in FIG. 2 using the high-order filter interpolation method.
Figure 5:
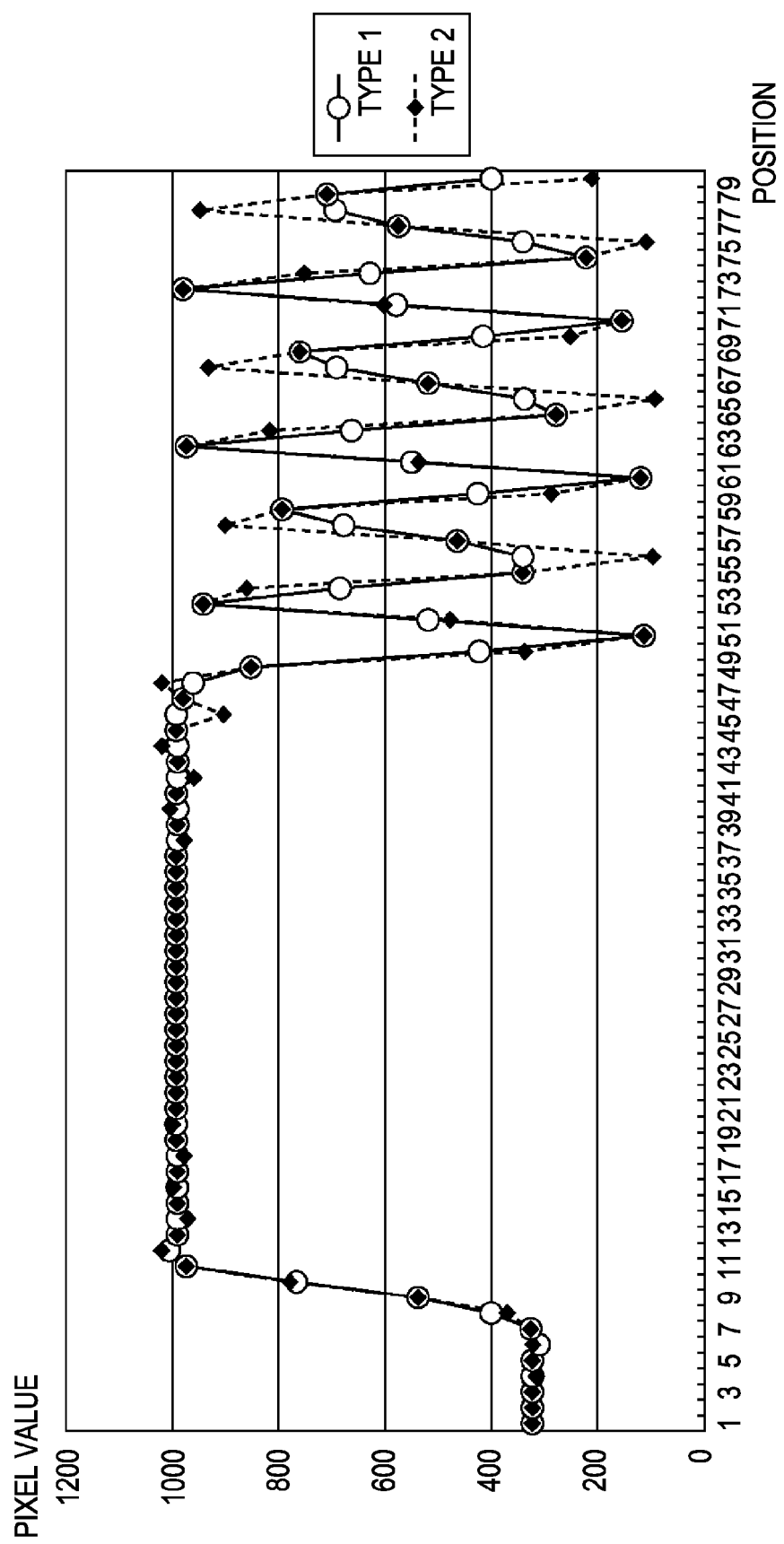
FIG. 5 is a graph showing changes in pixel values in the images shown in FIGS. 3 and 4.
Figure 6:
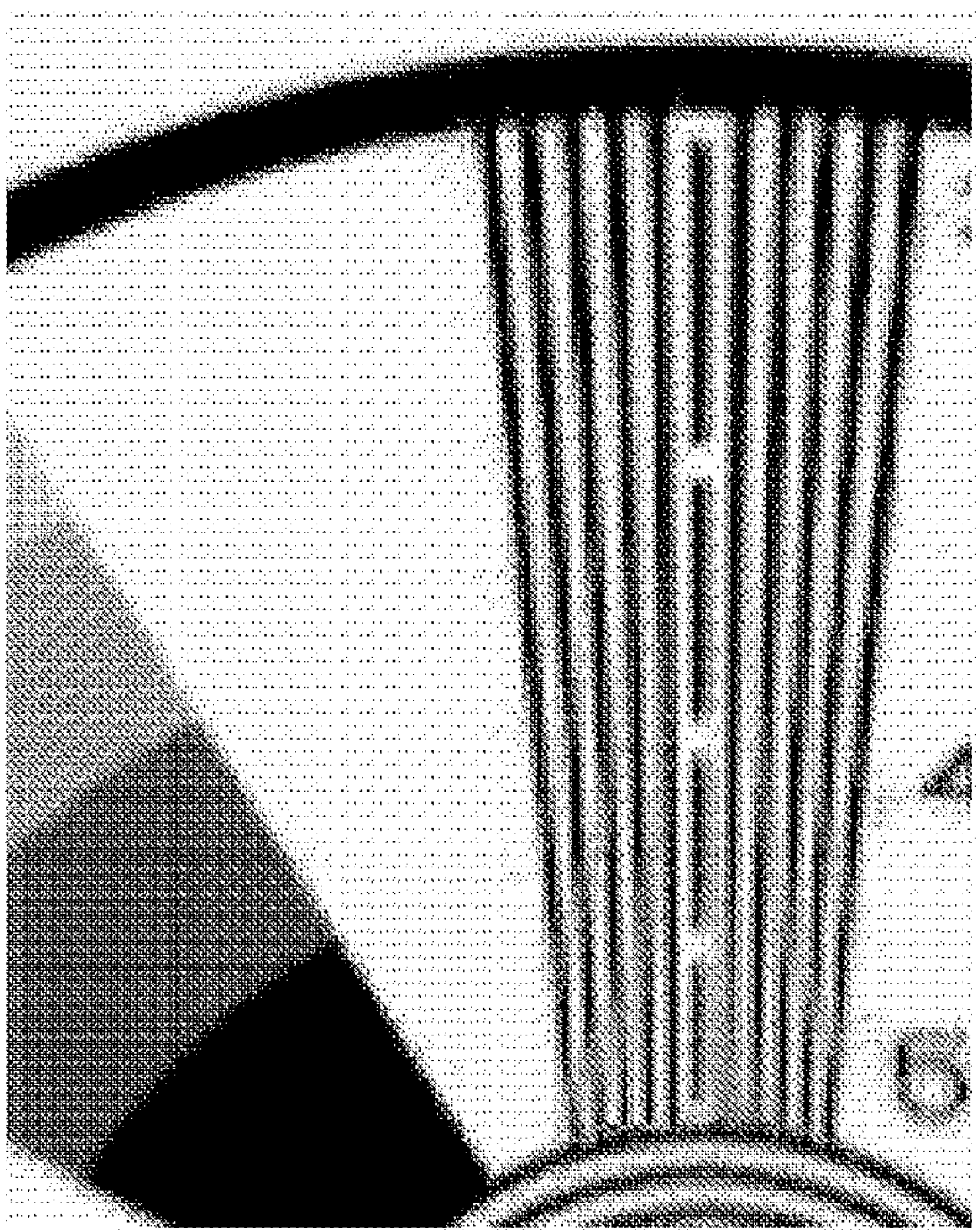
FIG. 6 is a diagram showing an image acquired by enlarging the original image shown in FIG. 2 using the diagonal interpolation method.
Figure 37:
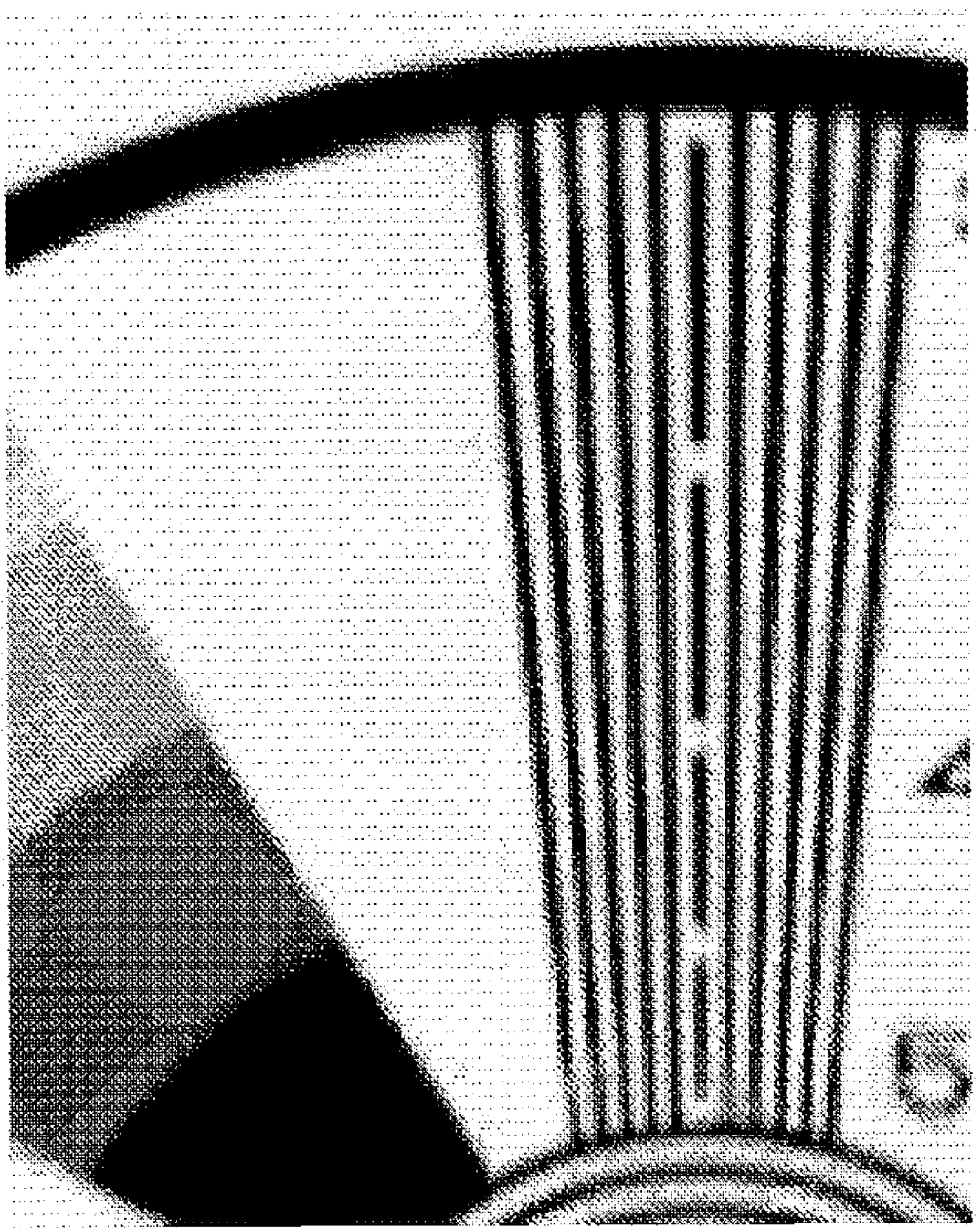
FIG. 37 is a diagram showing an exemplary image acquired by enlarging the original image shown in FIG. 2 using the resolution converter shown in FIG. 7.

FIG. 37 is a diagram showing an image acquired by enlarging the original image shown in FIG. 2 using the resolution converter 101. In the image shown in FIG. 37, the occurrence of aliasing distortion is prevented in a region on the right side of the image in which ridges are arranged and a number of high-frequency components are included compared with the images shown in FIGS. 3 and 6. In addition, the occurrence of jaggies is prevented at slanting edges on the left side of the image compared with the images shown in FIGS. 3 and 4. Furthermore, the occurrence of ringing is prevented in flat regions on the left and right sides of the region in which ridges are arranged and a number of high-frequency components are included compared with the image shown in FIG. 4. Still furthermore, the occurrence of errors is prevented in a region on the left side of a region near the right end of the image in which portions of figures are displayed compared with the image shown in FIG. 6. That is, according to the resolution converter 101, resolution conversion enabling a high-quality image can be achieved using the bicubic interpolation method, the high-order filter interpolation method, and the diagonal interpolation method.

Figure 38:
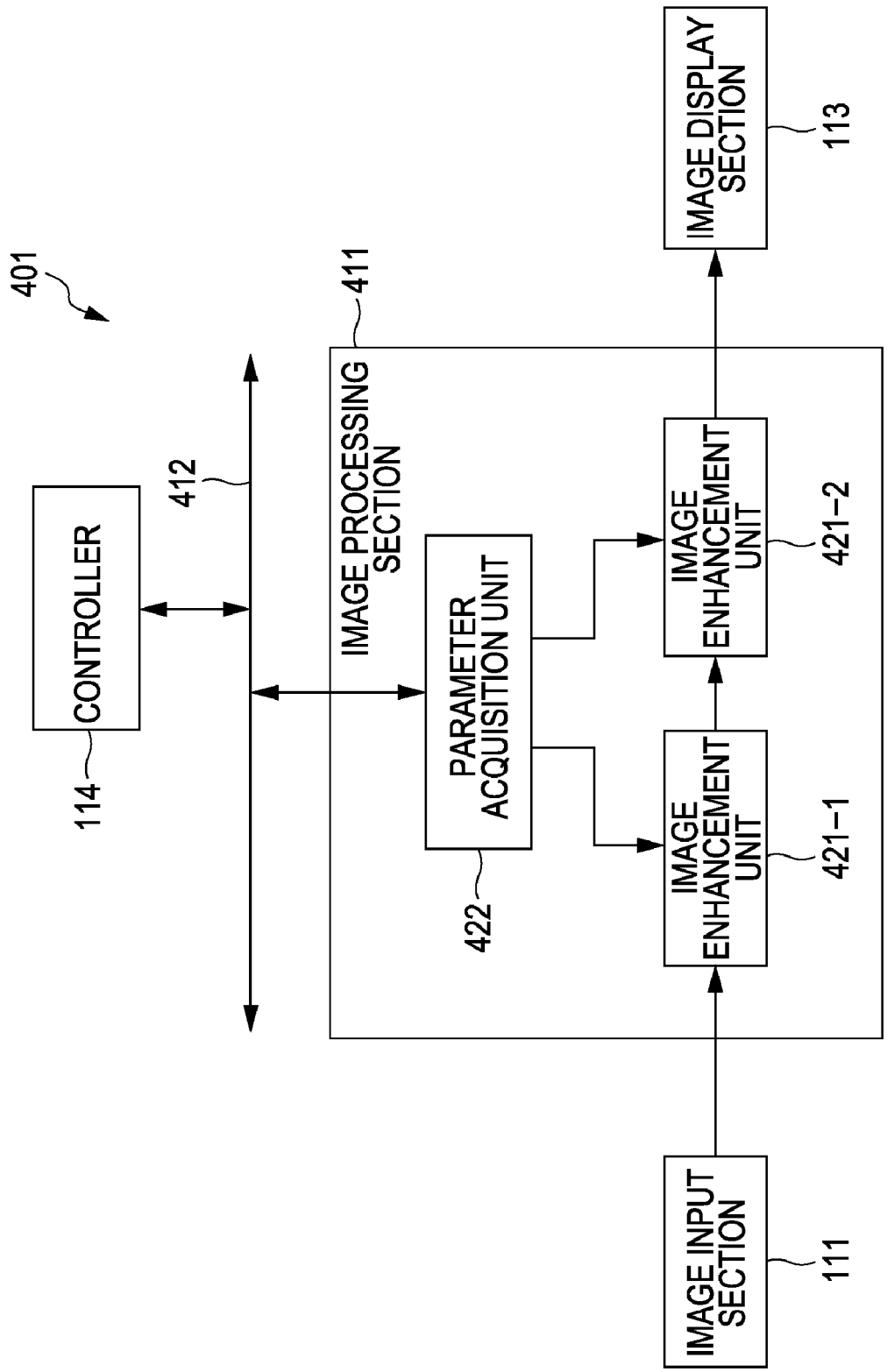
FIG. 38 is a block diagram showing an image enhancement apparatus according to an embodiment of the present invention.

Next, another embodiment of the present invention will be described. FIG. 38 is a block diagram showing an image enhancement apparatus according to an embodiment of the present invention. An image enhancement apparatus 401 according to an embodiment of the present invention is provided with the image input section 111, the image processing section 411, the image display section 113, and the controller 114. The image processing section 411 is provided with image enhancement units 421-1 and 421-2 and a parameter acquisition unit 422. The parameter acquisition unit 422 included in the image processing section 411 is interconnected to the controller 114 via a bus 412. Here, the same reference numerals are used for components having the same functions as those of FIG. 7 to avoid repeated explanation.

Figure 43:
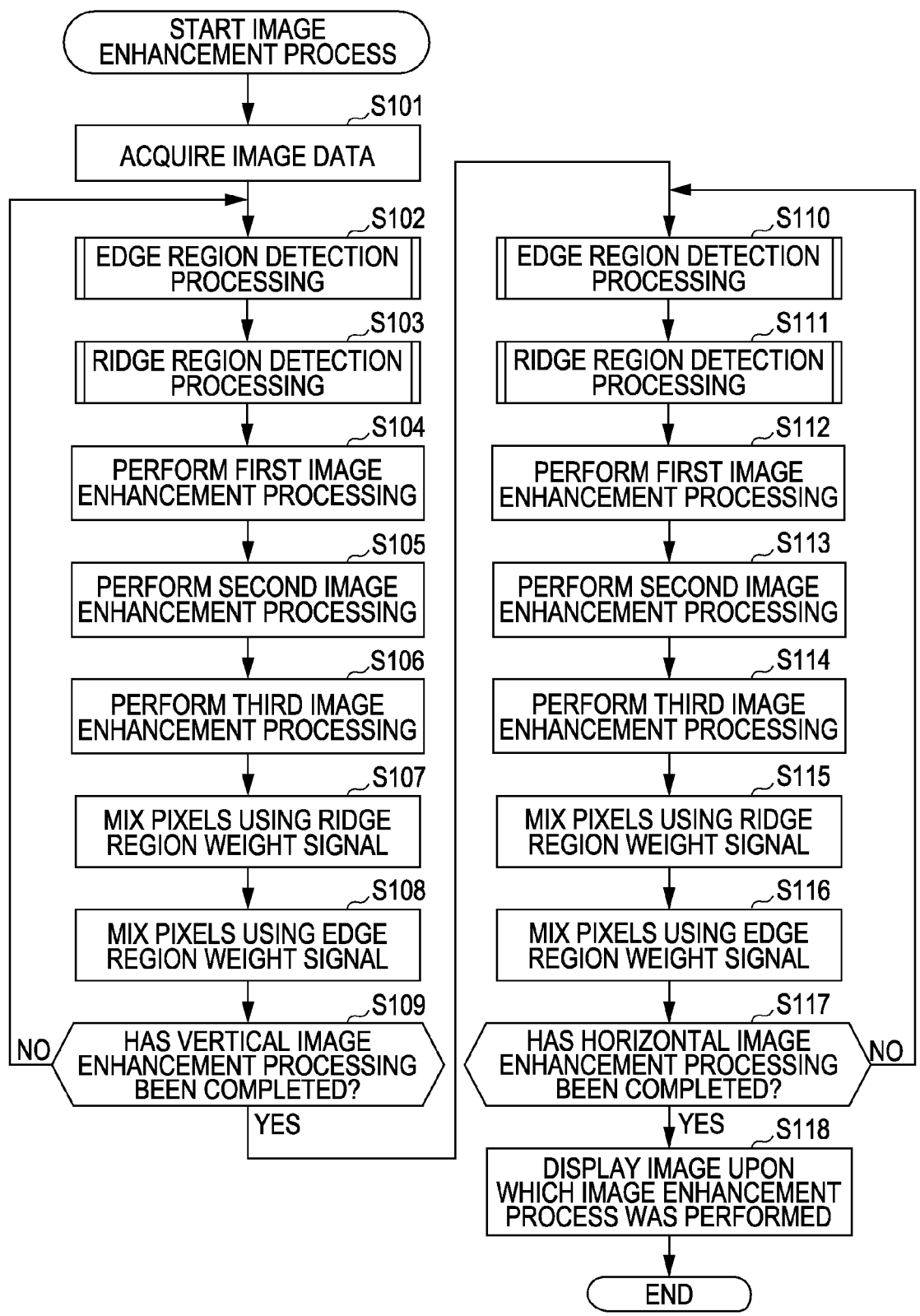
FIG. 43 is a flowchart describing an image enhancement process performed by the image enhancement apparatus shown in FIG. 38.

As will be described later with reference to FIG. 43, the image processing section 411 performs image enhancement processing upon image data received from the image input section 111 so as to improve the quality of the image. The image processing section 411 transmits the image data upon which the image enhancement processing has been performed to the image display section 113.

As will be described later with reference to FIG. 43, the image enhancement unit 421-1 performs vertical image enhancement processing upon the image data transmitted from the image input section 111, and transmits the processed image data to the image enhancement unit 421-2. As will be described later with reference to FIG. 43, the image enhancement unit 421-2 performs horizontal image enhancement processing upon the image data transmitted from the image enhancement unit 421-1, and transmits the processed image data to the image display section 113. In the following, when it is not required to discriminate between the image enhancement units 421-1 and 421-2, the image enhancement unit 421 is simply used.

The parameter acquisition unit 422 receives various types of control information from the controller 114 via the bus 412, and transmits the received control information to the image enhancement units 421-1 and 421-1.

FIG. 39 is a block diagram showing an exemplary functional configuration of the image enhancement unit 421. The image enhancement unit 421 is provided with the edge region detection unit 141, the ridge region detection unit 142, an enhancement computation unit 441, and the image mixing unit 144. Here, the same reference numerals are used for components having the same functions as those of FIG. 8 to avoid repeated explanation.

The enhancement computation unit 441 is provided with the first enhancement computation units 451-1 and 451-2, and the second enhancement computation unit 452. As will be described later with reference to FIG. 43, the first enhancement computation units 451-1 and 451-2, and the second enhancement computation unit 452 perform image enhancement processing upon received image data using different factors (setting values). The first enhancement computation unit 451-1 mainly performs image enhancement processing for a region including a ridge. The first enhancement computation unit 451-2 mainly performs image enhancement processing for a flat region. The second enhancement computation unit 452 mainly performs image enhancement processing for a region including a step edge. The first enhancement computation unit 451-1 and the second enhancement computation unit 452 transmit the image data upon which the image enhancement processing has been performed to the first mixing unit 161. The first enhancement computation unit 451-2 transmits the processed image data to the second mixing unit 162. In the following, when it is not required to discriminate between the first enhancement computation units 451-1 and 451-2, the first enhancement computation unit 451 is simply used.

The first mixing unit 161 performs weighted addition of pixel values of pixels at corresponding positions included in two pieces of image data upon which the image enhancement processing has been performed by the first enhancement computation unit 451-1 and the second enhancement computation unit 452 on the basis of a ridge region weight signal, thereby mixing the two pieces of image data. The first mixing unit 161 transmits the mixed image data to the second mixing unit 162.

The second mixing unit 162 performs weighted addition of the image data mixed by the first mixing unit 161 and a pixel value of a pixel at a corresponding position included in image data upon which the image enhancement processing has been performed by the first enhancement computation unit 451-2 on the basis of an edge region weight signal, thereby mixing the two pieces of image data. The second mixing unit 162 externally outputs the mixed image data.

Figure 40:
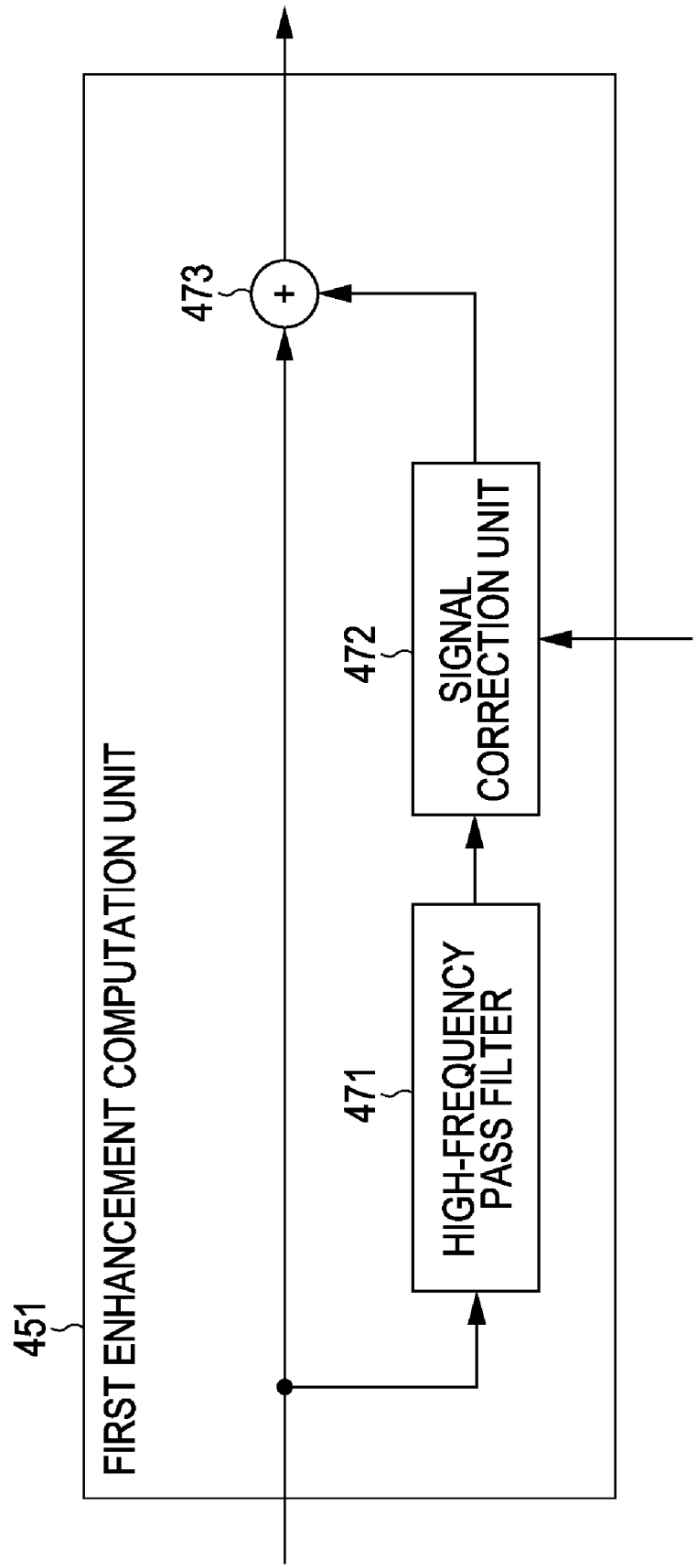
FIG. 40 is a block diagram showing an exemplary functional configuration of a first enhancement computation unit shown in FIG. 39.

FIG. 40 is a block diagram showing an exemplary functional configuration of the first enhancement computation unit 451. The first enhancement computation unit 451 is provided with a high-frequency pass filter 471, a signal correction unit 472, and an adding unit 473.

The high-frequency pass filter 471 is a filter that allows high-frequency components included in externally received image data to pass therethrough.

Figure 41:
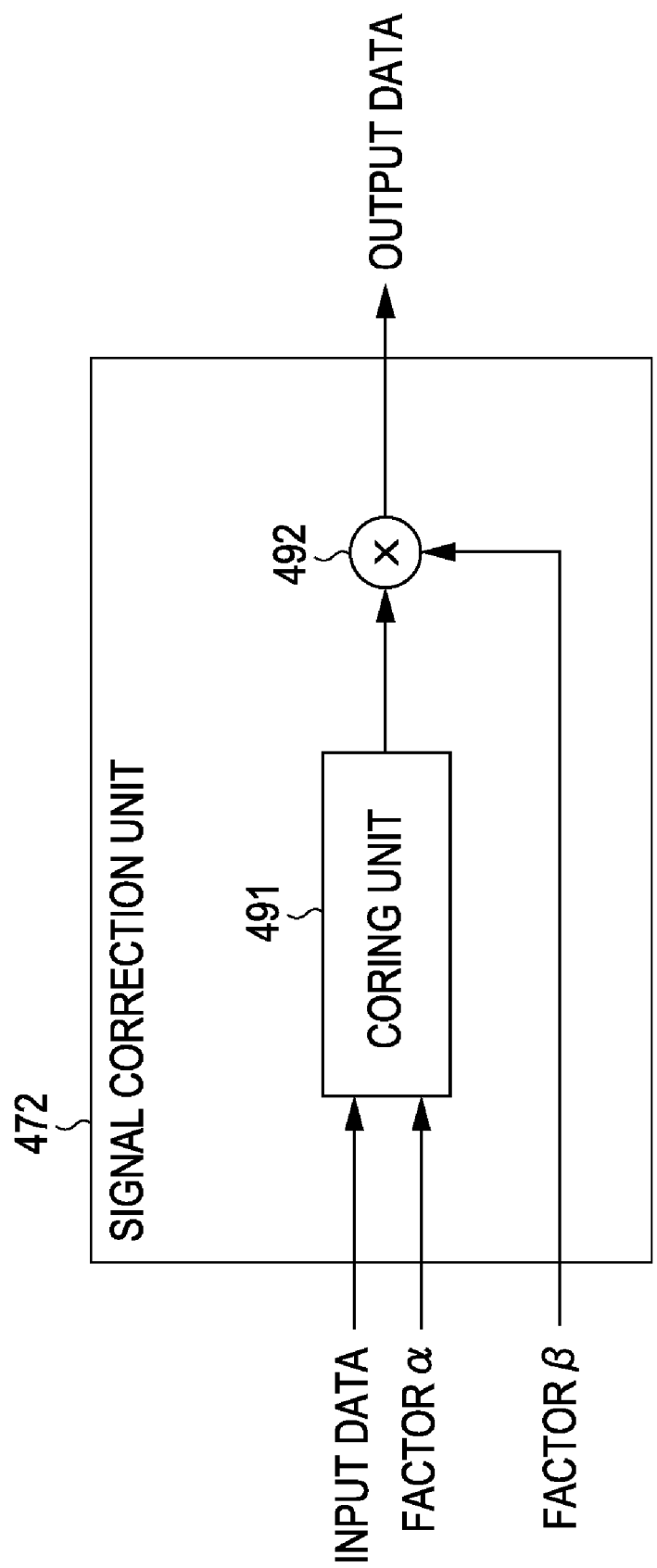
FIG. 41 is a block diagram showing an exemplary functional configuration of a signal correction unit shown in FIG. 40.

As shown in FIG. 41, the signal correction unit 472 is provided with a coring unit 491 and a multiplying unit 492.

The coring unit 491 acquires the image data including extracted high-frequency components from the high-frequency pass filter 471 and data representing a factor α from the parameter acquisition unit 422. As will be described later with reference to FIG. 44, the coring unit 491 converts a pixel value of a pixel included in the acquired image data using the factor α, and transmits image data including the converted pixel value of the pixel to the multiplying unit 492.

The multiplying unit 492 acquires data representing a factor β from the parameter acquisition unit 422, multiplies the pixel value of the pixel included in the image data received from the coring unit 491 by the factor β, and transmits image data including the multiplied pixel value of the pixel to the adding unit 473.

The adding unit 473 adds pixel values of pixels at corresponding positions included in externally received image data and the image data transmitted from the signal correction unit 472, thereby mixing these pieces of image data. The adding unit 473 externally transmits the mixed image data (to the first mixing unit 161 or the second mixing unit 162).

Figure 42:
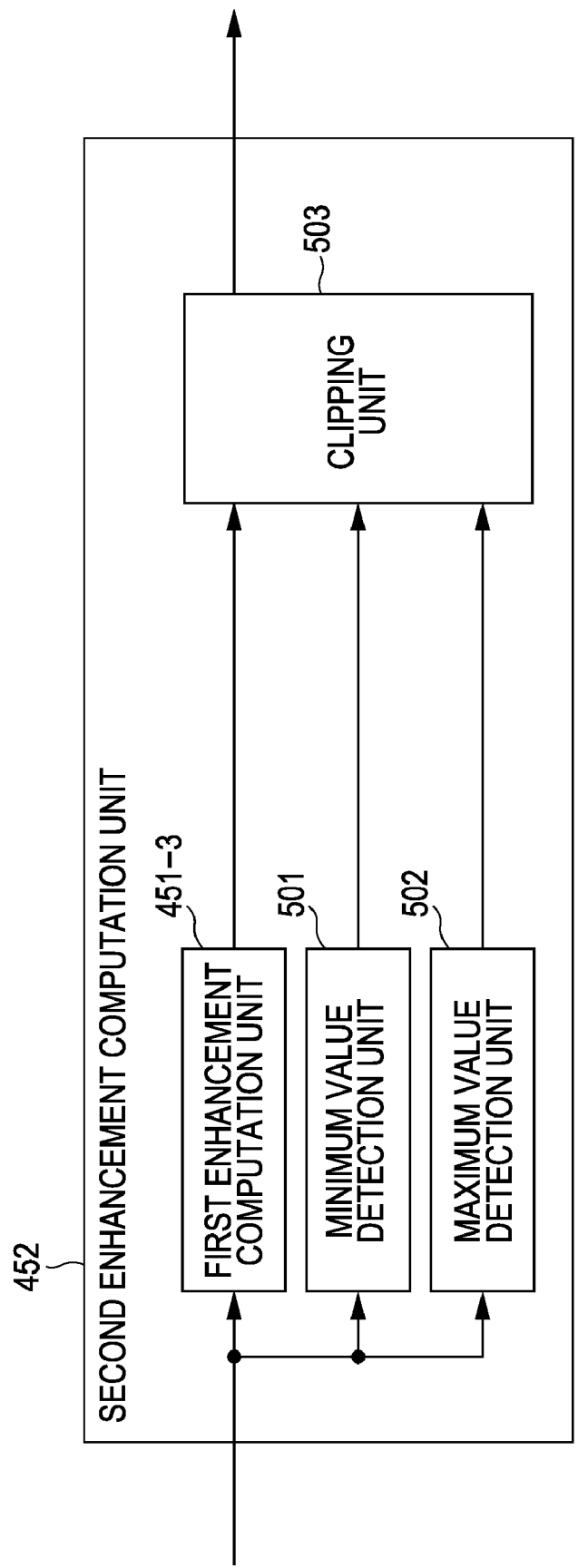
FIG. 42 is a block diagram showing an exemplary functional configuration of a second enhancement computation unit shown in FIG. 39.

FIG. 42 is a block diagram showing an exemplary functional configuration of the second enhancement computation unit 452. The second enhancement computation unit 452 is provided with a first enhancement computation unit 451-3, which has the same function as that of the first enhancement computation units 451-1 and 451-2, a minimum value detection unit 501, a maximum value detection unit 502, and a clipping unit 503.

The minimum value detection unit 501 detects the minimum value from among received pixel values, and transmits data representing the minimum value to the clipping unit 503.

The maximum value detection unit 502 detects the maximum value from among received pixel values, and transmits data representing the maximum value to the clipping unit 503.

The clipping unit 503 compares a pixel value of each pixel included the image data transmitted from the first enhancement computation unit 451-3 with the minimum value detected by the minimum value detection unit 501 and the maximum value detected by the maximum value detection unit 502. If the pixel value of a pixel included in the image data transmitted from the first enhancement computation unit 451-3 is smaller than the minimum value, the clipping unit 503 selects the minimum value for the pixel. On the other hand, if the pixel value is larger than the maximum value, the clipping unit 503 selects the maximum value for the pixel. In other cases, the clipping unit 503 selects the original pixel value of the pixel included in the image data. The clipping unit 503 transmits data representing the selected pixel values to the first mixing unit 161.

A user can set the factors α and β for each of the first enhancement computation units 451-1, 451-2, and 451-3 by operating an operation unit (not shown) included in the image enhancement apparatus 401.

Next, an image enhancement process performed by the image enhancement apparatus 401 will be described with reference to a flowchart shown in FIG. 43. This process is started when a user operates an operation unit (not shown) included in the image enhancement apparatus 401 so as to instruct the image enhancement apparatus 401 to perform the image enhancement process.

In step S101, the image enhancement unit 421-1 receives image data upon which image enhancement processing will be performed from the image input section 111, and stores the received image data in a buffer (not shown).

Figure 27:
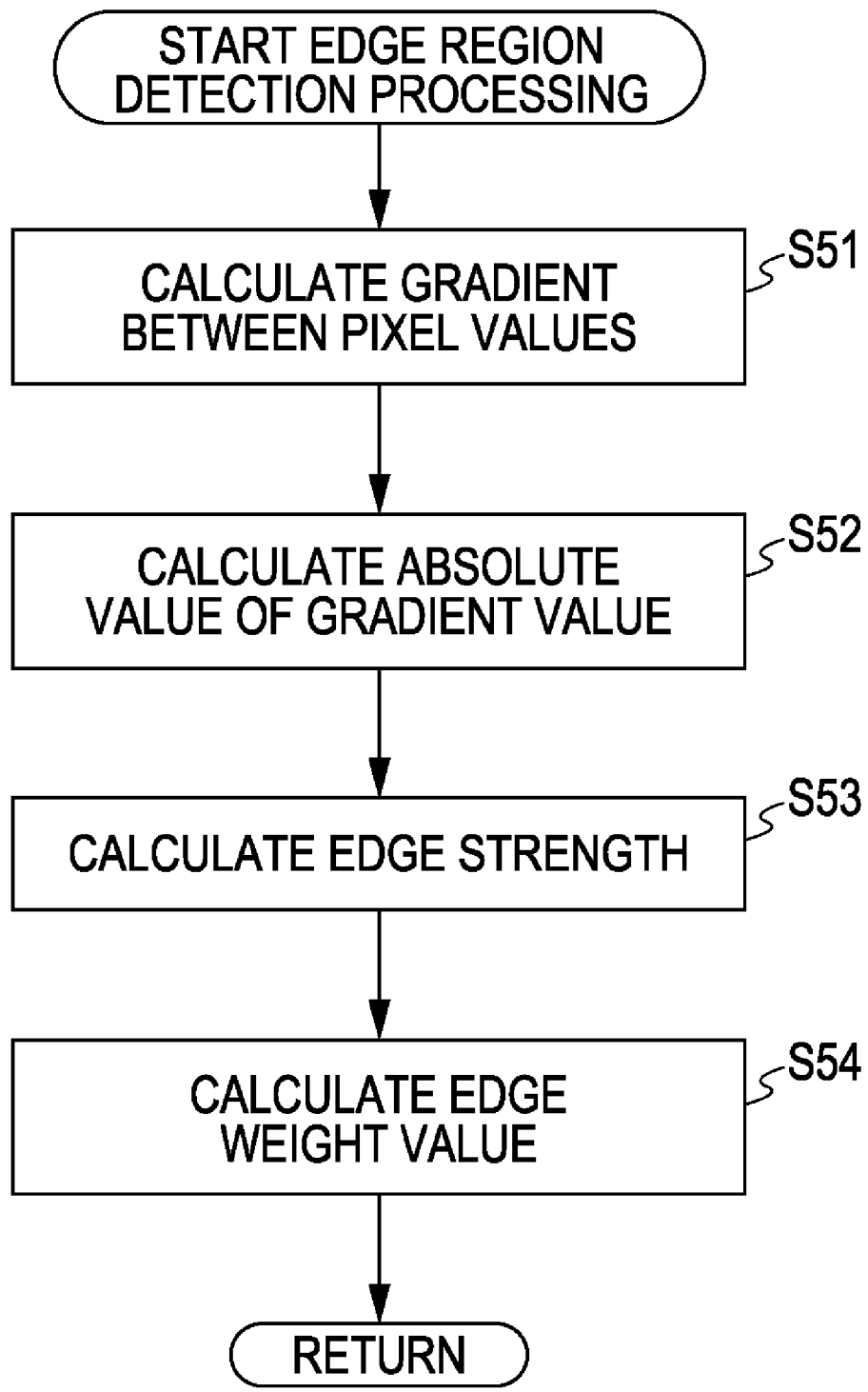
FIG. 27 is a flowchart describing details of edge region detection processing performed in steps S2 and S10 of FIG. 26.

In step S102, the edge region detection processing described with reference to FIG. 27 is performed, and an edge region weight signal is then transmitted from the edge region detection unit 141 to the second mixing unit 162. For example, if the image enhancement processing is performed upon the pixel y shown in FIG. 28, the edge detection processing is performed upon a region that includes the pixels y−1, y, y+1, and y+2.

In step S103, the ridge region detection processing described with reference to FIG. 30 is performed, and a ridge region weight signal is then transmitted from the ridge region detection unit 142 to the first mixing unit 161. For example, if the image enhancement processing is performed upon the pixel y shown in FIG. 28, the ridge detection processing is performed upon the region that includes the pixels y−1, y, y+1, and y+2.

In step S104, the first enhancement computation unit 451-1 included in the image enhancement unit 421-1 performs a first image enhancement processing. More specifically, the high-frequency pass filter 471 included in the first enhancement computation unit 451-1 acquires data representing a pixel value of a target pixel upon which the image enhancement processing will be performed and data representing pixel values of pixels right above and right below the target pixel from a buffer (not shown) included in the image enhancement unit 421-1. The high-frequency pass filter 471 calculates a pixel value Hd using the following equation 25.

$$Hd = c[0] \times f(y-1) + c[1] \times f(y) + c[2] \times f(y+1) \qquad 25$$

A pixel value f(y) represents a pixel value of the target pixel, a pixel value f(y−1) represents a pixel value of a pixel right above the target pixel, and a pixel value f(y+1) represents a pixel value of a pixel right below the target pixel. Filter factors c[0], c[1], and c[2] are set as, for example, c[0]=−0.25, c[1]=0.5, and c[2]=−0.25, respectively.

Subsequently, the coring unit 491 converts the pixel value Hd into a pixel value Cd using the following equation 26.

$$Cd = \begin{cases} Hd - \alpha & (Hd < -\alpha) \\ 0 & (-\alpha \leq Hd \leq \alpha) \\ Hd + \alpha & (Hd > +\alpha) \end{cases} \qquad 26$$

Figure 44:
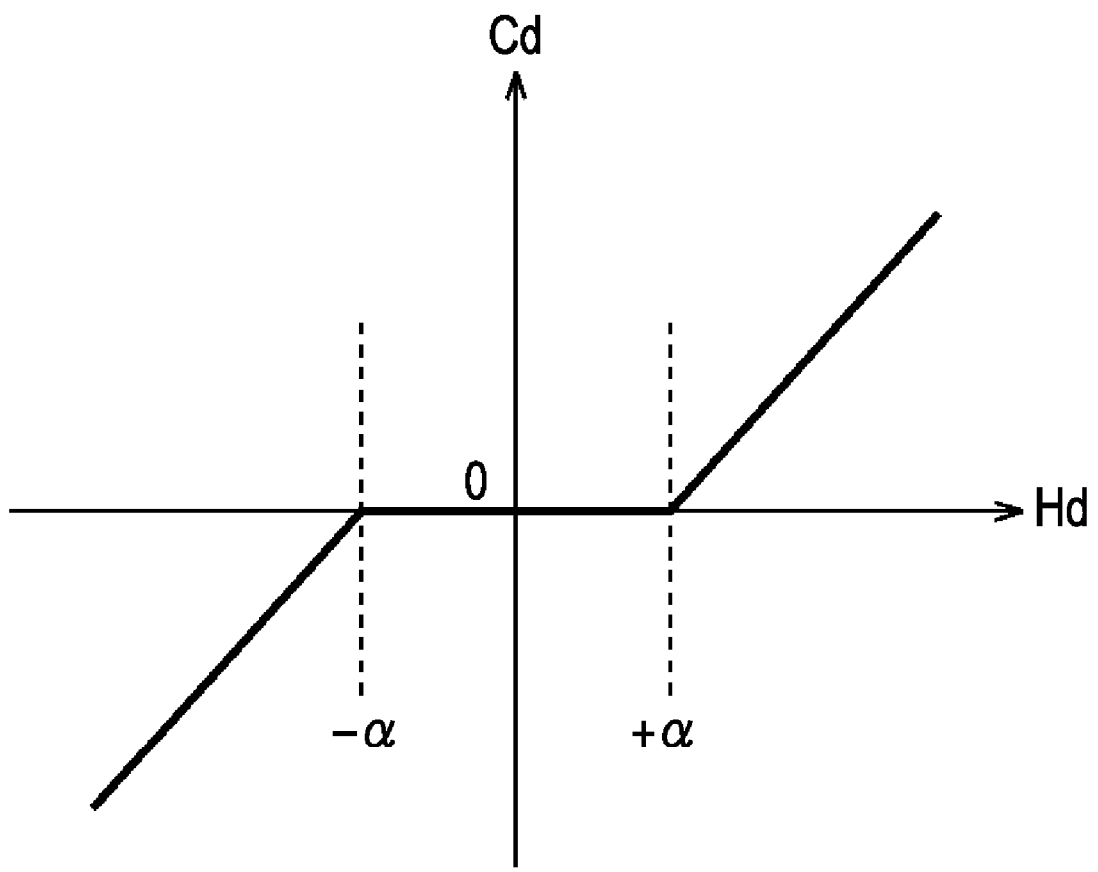
FIG. 44 is a graph showing a relationship between the input and output of a coring unit shown in FIG. 41.

FIG. 44 is a graph showing a relationship between the pixel values Hd and Cd. As shown in FIG. 44, if an absolute value of a pixel value of a certain pixel included in the image data transmitted from the high-frequency pass filter 471 is lower than a factor α of the amount of coring, a pixel value of the certain pixel is set to zero (high-frequency components corresponding to pixel values whose absolute values are equal to or lower than the factor α are removed).

The multiplying unit 492 calculates a pixel value Md by multiplying the pixel value Cd by a factor β of a gain using the following equation 27.

$$Md = Cd \times \beta \qquad 27$$

The adding unit 473 calculates a pixel value Pd using the following equation 28.

$$Pd = f(y) + Md \qquad 28$$

Thus, image data including the pixel value Pd is image data acquired by extracting high-frequency components whose amplitudes are equal to or larger than a predetermined amplitude from among high-frequency components included in the input image data, and enhancing the extracted high-frequency components. The adding unit 473 transmits data representing the pixel value Pd to the first mixing unit 161.

In step S105, the second enhancement computation unit 452 performs the second image enhancement processing. More specifically, the first enhancement computation unit 451-3 performs the same processing as that performed by the first enhancement computation unit 451-1 in step S104, that is, converts a pixel value of each pixel included in the input image data using the above-described equations 25 through 28. A pixel value calculated by the first enhancement computation unit 451-3 using the above-described equation 28 is defined as a pixel value Em so as to distinguish it from the pixel value Pd calculated by the first enhancement computation unit 451-1.

The minimum value detection unit 501 detects a minimum value M0 using the following equation 29 from among pixel values of a target pixel and pixels near the target pixel. The maximum value detection unit 502 detects a maximum value M1 using the following equation 30 from among pixel values of the target pixel and pixels near the target pixel.

$$M0 = \mathrm{MIN}(f(y-1), f(y), f(y+1)) \qquad 29$$

$$M0 = \mathrm{MAX}(f(y-1), f(y), f(y+1)) \qquad 30$$

Here, MIN( ) represents a function used to calculate the minimum value of data included in the parentheses ( ), and MAX( ) represents a function used to calculate the maximum value of data included in the parentheses ( ).

The minimum value detection unit 501 transmits the detected minimum value M0 to the clipping unit 503. The maximum value detection unit 502 transmits the detected maximum value M1 to the clipping unit 503. The clipping unit 503 corrects the pixel value Em so that the pixel value Ed to be output therefrom can fall within the range between the minimum value M0 and the maximum value M1 using the following equation 31. That is, clipping is performed so that the pixel value Em can fall within the range between the minimum value M0 and the maximum value M1.

$$Ed = \begin{cases} M0 & (Em < M0) \\ Em & (M0 \le Em \le M1) \\ M1 & (Em > M1) \end{cases} \qquad 31$$

In step S106, the first enhancement computation unit 451-2 performs the third image enhancement processing. More specifically, the first enhancement computation unit 451-2 performs the same processing as that performed by the first enhancement computation unit 451-1 in step S104, that is, converts a pixel value of each pixel included in the input image data using the above-described equations 25 through 28. A pixel value calculated by the first enhancement computation unit 451-2 using the above-described equation 28 is defined as a pixel value Fd so as to distinguish it from the pixel value Pd calculated by the first enhancement computation unit 451-1. The adding unit 473 included in the first enhancement computation unit 451-2 transmits data representing the pixel value Fd to the second mixing unit 162.

The image enhancement processing performed by the first enhancement computation units 451-1, 451-2, and 451-3 is processing performed using a general image enhancement method. By performing such image enhancement processing, the sharpness of the contrast around an edge can be improved. On the other hand, however, ringing components called a preshoot and an overshoot are prone to be amplified in the case of a step edge.

On the other hand, the image enhancement processing performed by the second enhancement computation unit 452 is processing performed using an image enhancement method called LTI (Luminance Transient Improvement). In this image enhancement processing, the occurrence of a preshoot and an overshoot can be prevented and the rise of an edge can be improved by performing clipping processing using the minimum value M0 and the maximum value M1. This image enhancement processing is particularly effective for step edges, but is not suitable for ridges, because the degree of edge enhancement is reduced and jaggies are prone to occur.

Here, factors α and factors β input into the first enhancement computation units 451-1, 451-2, and 451-3 are defined as factors α1, α2, and α3 and factors β1, β2, and β3, respectively. The factor α2 and the factor β2 are set so that image data including the pixel value Ed calculated by the second enhancement computation unit 452 can become image data in which the occurrence of ringing is prevented and edges are more sharply enhanced compared with image data including the pixel value Pd calculated by the first enhancement computation unit 451-1 and image data including the pixel value Fd calculated by the first enhancement computation unit 451-2.

The factor α3 and the factor β3 are set so that the image data including the pixel value Fd calculated by the first enhancement computation unit 451-2 can become image data in which noise enhancement is prevented and image quality in a flat region therein is higher compared with the image data including the pixel value Pd calculated by the first enhancement computation unit 451-1 and the image data including the pixel value Ed calculated by the second enhancement computation unit 452.

The factor α1 and the factor β1 are set so that the image data including the pixel value Pd calculated by the first enhancement computation unit 451-1 can become image data in which the occurrence of jaggies is prevented in a region including a number of high-frequency components compared with the image data including the pixel value Ed calculated by the second enhancement computation unit 452 and in which edges are more enhanced compared with the image data including the pixel value Fd calculated by the first enhancement computation unit 451-2.

For example, when $\alpha 3 \geq \alpha 1$ and $\beta 1 \geq \beta 3$, the above-described conditions can be satisfied. The relationships between α2 and α, α2 and α3, β2 and β1, β2 and β3 are not particularly defined.

Figure 26:
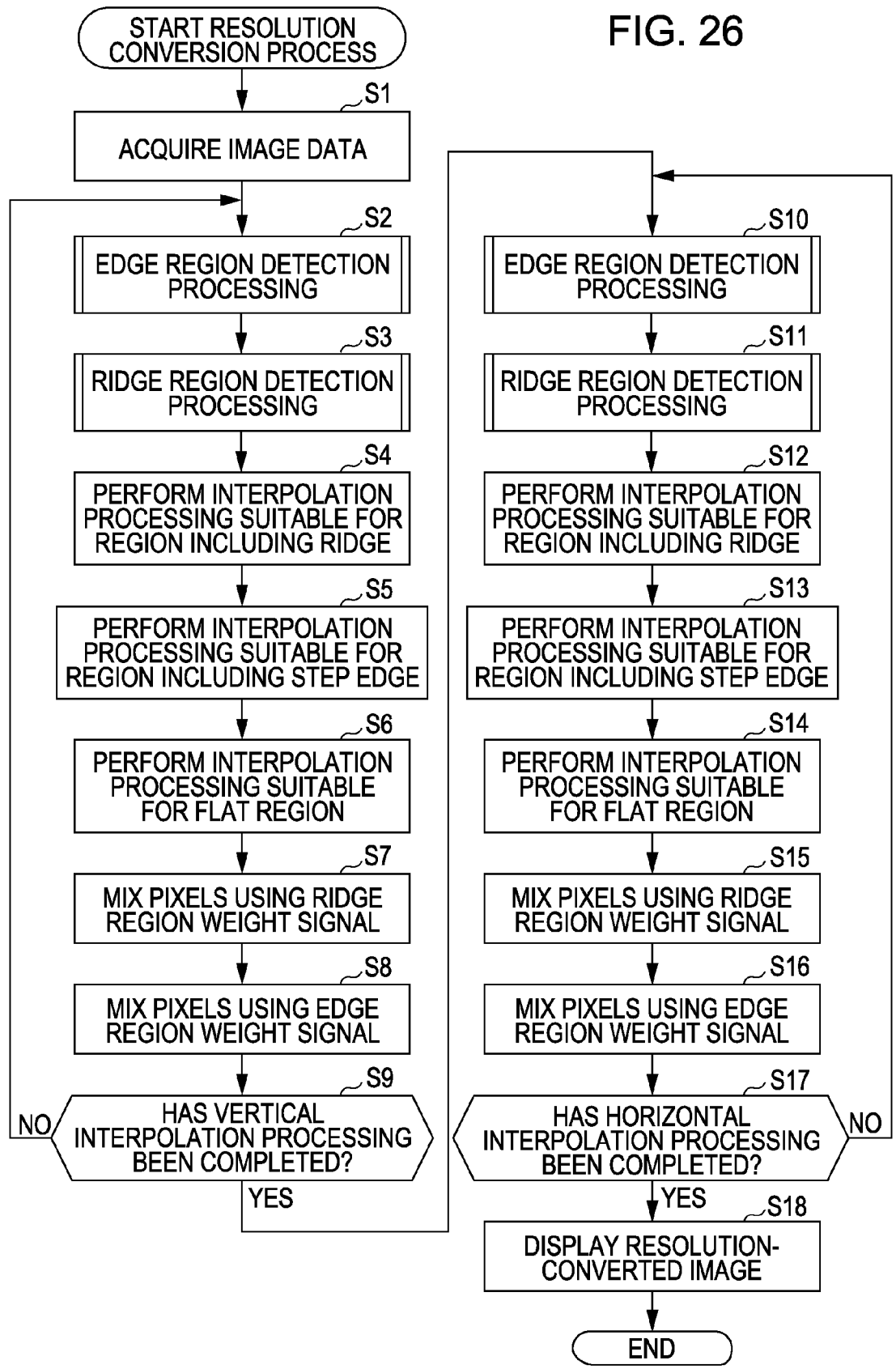
FIG. 26 is a flowchart describing a resolution conversion process performed by the resolution converter shown in FIG. 7.

In step S107, the first mixing unit 161 performs the same processing as that of step S7 in FIG. 26 using the above-described equation 23, that is, performs weighted addition of the pixel value Pd transmitted from the first enhancement computation unit 451-1 and the pixel value Ed transmitted from the second enhancement computation unit 452 using the ridge weight value Pw indicated by the ridge region weight signal transmitted from the ridge region detection unit 142. The first mixing unit 161 transmits data representing the pixel value M1 acquired from the weighted addition to the second mixing unit 162.

In step S108, the second mixing unit 162 performs the same processing as that of step S8 in FIG. 26 using the above-described equation 24, that is, performs weighted addition of the pixel value M1 transmitted from the first mixing unit 161 and the pixel value Fd transmitted from the first enhancement computation unit 451-2 using the edge weight value Ew indicated by the edge region weight signal transmitted from the edge region detection unit 141.

In step S109, the image enhancement unit 421-1 determines whether the vertical image enhancement processing has been completed. If pixels upon which the vertical image enhancement processing has not yet been performed still exist, the image enhancement unit 421-1 determines that the vertical image enhancement processing has not yet been completed. Subsequently, the process returns to step S102. Until it is determined in step S109 that the vertical image enhancement processing has been completed, the process from step S102 through step S109 is repeatedly performed. That is, the pixel value M2 of each pixel included in the image data received from the image input section 111 is calculated, and data representing the pixel value M2 is transmitted to the image enhancement unit 421-2.

If it is determined in step S109 that the vertical image enhancement processing has been completed, the process proceeds to step S110. Until it is determined in step S117 that horizontal image enhancement processing has been completed, the process from step S110 through step S117 is repeatedly performed. The process from step S110 through step S117 is the same as the process from step S102 through step S109, the description thereof will be therefore omitted. Although the vertical image enhancement processing is performed upon the image data received from the image input section 111 in the process from step S102 through step S109, the horizontal image enhancement processing is performed upon the image data including the pixel value M2 transmitted from the image enhancement unit 421-1 upon which the vertical image enhancement processing has been performed in the process from step S110 through step S117.

If it is determined in step S117 that the horizontal image enhancement processing has been completed, the process proceeds to step S118.

In step S118, the image display section 113 displays an image upon which the image enhancement processing has been performed, and then the image enhancement process ends. More specifically, the image display section 113 displays an image on the basis of the image data including the pixel value M2 which is transmitted from the image enhancement unit 421-2, that is, image data acquired by performing the vertical image enhancement processing and the horizontal image enhancement processing upon the image data received from the image input section 111.

Thus, in the image data received by the image enhancement unit 421-1 or 421-2, a pixel in the vicinity of a ridge whose ridge weight value Pw is 1.0 or close to 1.0 is converted into a pixel having a number of components of the pixel value Pd. A pixel in the vicinity of a step edge whose edge weight value Ew is 1.0 or close to 1.0 and whose ridge weight value Pw is 0.0 or close to 0.0 is converted into a pixel having a number of components of the pixel value Ed. A pixel in a region located apart from a ridge and a step edge whose edge weight values Ew are 0.0 or close to 0.0 is converted into a pixel having a number of components of the pixel value Fd. That is, the image data including the pixel value M2 which has output from the image enhancement unit 421-1 or 421-2 is image data in which a step edge and a ridge are enhanced, the image quality in a flat region is high, and noise enhancement in a flat region, the occurrence of a preshoot and an overshoot in a step edge, the occurrence of jaggies near a ridge are prevented.

As described previously, the ridge strength is the strength of a ridge included in an image. When a pixel value is changed in the form of a pulse in accordance with a positional change in a region that includes a plurality of pixels, the ridge strength is represented by the gradient and height of the pulse. In such a case, the ridge strength of the image can be easily and accurately detected, whereby image processing can be performed in accordance with the features of the image.

In the above description, a gradient value used to detect the edge strength and the ridge strength is acquired by calculating the difference between pixel values of adjacent pixels, but may be acquired using another method.

For example, the difference between pixel values of pixels that are not next to each other, but are positioned close to each other in a region in which the edge strength and the ridge strength will be detected may be used as a gradient value. For example, in the region shown in FIG. 20 in which the pixels x−1 through x+2 are included, a difference value acquired by the following equation $f(x+1)-f(x-1)$ may be used as a gradient value. This method is effective when it is determined whether rather thick lines are spaced in an image such as a blurred image or an enlarged image in which a number of high-frequency components are not included.

For example, a gradient value may be calculated using a differentiation filter. For example, in the region shown in FIG. 20 in which the pixels x−1 through x+2 are included, a gradient value can be calculated using a differentiation filter that uses the following equation $1 \times f(x+2)+2 \times f(x+1)-2 \times f(x)-1 \times f(x-1)$. In this case, the detection accuracy of the edge strength and the ridge strength can be improved in a narrow band image by increasing the number of taps included in a filter, that is, by enlarging a region upon which the edge strength and the ridge strength will be detected.

By changing a method of acquiring a gradient value on the basis of the features of an image upon which image processing will be performed using the edge strength and the ridge strength, for example, on the basis of the determination of whether the image includes a number of high-frequency components, the effect acquired from image processing can be changed.

In the image interpolation unit 121 shown in FIG. 8, interpolation processing intended mainly for preventing the occurrence of aliasing distortion may be performed by causing the second mixing unit 162 to mix the image data interpolated by the ridge region interpolation computation unit 151 with the image data interpolated by the flat region interpolation computation unit 153 using the edge region weight signal.

Embodiments of the present invention may be applied to image processing aimed only at ridges (for example, image processing for ridge extraction) or edges (for example, image processing for edge extraction) by using features of embodiments of the present invention which enable detection of the ridge strength and edge strength of an image with high accuracy.

The strength of a high-frequency striped pattern (set of closely spaced thin lines) may be detected as the ridge strength.

In the above-described embodiments, adding processing and calculation of an absolute value may be performed by the same unit.

In the above-described embodiments, the case in which the horizontal one-dimensional image interpolation processing and the vertical one-dimensional image interpolation processing are performed and the case in which the horizontal one-dimensional image enhancement processing and the vertical one-dimensional image enhancement processing are performed were described by way of example. However, two-dimensional image interpolation processing and two-dimensional image enhancement processing may be performed.

In order to prevent a ridge region weight signal and an edge region weight signal from becoming unstable under the influence of noise, each weight signal may be smoothed and a median value in a predetermined region may be used as a weight value indicated by each weight signal.

In the above-described flowcharts, individual pieces of processing of steps are chronologically performed. For example, individual pieces of processing of step S2 through step S6 shown in FIG. 26 may be performed in parallel with individual pieces of processing of step S10 through S14, and individual pieces of processing of step S102 through step S106 shown in FIG. 43 may be performed in parallel with individual pieces of processing of step S110 through S114.

The image display section 113 included in the resolution converter 101 or the image enhancement apparatus 401 may be, for example, a recording apparatus for storing image data or a transmitting apparatus for transmitting image data to another apparatus which can process image data upon which interpolation processing or image enhancement processing has been performed.

In the above description, if a pixel is interpolated between the same pixels, the same edge weight value Ew and the same ridge weight value Pw are used regardless of an interpolation position. However, for example, the edge weight value Ew and the ridge weight value Pw may be corrected using a linear interpolation method in accordance with an interpolation position.

The above-described processing flow may be performed by hardware or software. If the processing flow is performed by software, a program configuring the software is installed from a program recording medium on a computer embedded in a piece of dedicated hardware or, for example, on a general-purpose personal computer that is allowed to perform various functions by installing various programs thereon.

FIG. 45 is a block diagram showing an exemplary configuration of a personal computer 900 that performs the above-described processing flow using a program. A CPU 901 performs various pieces of processing in accordance with a program stored in a ROM 902 or a recording unit 908. A RAM 903 stores a program to be executed by the CPU 901 and data as appropriate. The CPU 901, the ROM 902, and the RAM 903 are connected to each other via a bus 904.

The CPU 901 is also connected to an input and output interface 905 via the bus 904. The input and output interface 905 is connected to an input unit 906 configured with a keyboard, a mouse, and a microphone, and an output unit 907 configured with a display and a speaker. The CPU 901 performs various pieces of processing in accordance with instructions input from the input unit 906, and outputs the result of processing to the output unit 907.

The recording unit 908 connected to the input and output interface 905 is configured with, for example, a hard disk, and stores a program to be executed by the CPU 901 and various pieces of data. A communication unit 909 communicates with an external apparatus via a network such as the Internet or a local area network.

A program may be acquired via the communication unit 909 and stored in the recording unit 908.

When a removable medium 911 such as a magnetic disk, an optical disc, a magneto-optical disk, or a semiconductor memory is attached to a drive 910 connected to the input and output interface 905, the drive 910 drives the removable medium 911 to acquire a program or data recorded thereon. The acquired program or data is transferred to the recording unit 908 as appropriate, and is then recorded in the recording unit 908.

As shown in FIG. 45, the program recording medium storing the program to be installed on the computer and to be executed by the computer includes: the removable medium 911 that is a package medium such as a magnetic disk (including a flexible disk), an optical disc (including a CD-ROM (Compact Disc-Read-Only Memory) and a DVD (Digital Versatile Disc)), a magneto-optical disk, or a semiconductor memory; the ROM 902 in which the program is temporarily or permanently stored; and the hard disk configuring the recording unit 908. The storage of the program on the program recording medium is performed via the communication unit 909 that is an interface such as a router or a modem using a wired or wireless communication medium such as a local area network, the Internet, or digital satellite broadcasting as appropriate.

In this description, the steps describing the program to be stored in the program recording medium do not have to be executed in chronological order described above. The steps may be concurrently or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising ridge strength detecting means for detecting a ridge strength that is a strength of a ridge included in an image, the ridge strength detecting means being configured to (a) calculate gradient values within a region of the image based on pixel value differences within the region, and (b) calculate a ridge strength value based on (i) an absolute value of the sum of the gradient values and (ii) a sum of absolute values of each of the gradient values.

2. The image processing apparatus according to claim 1, wherein the ridge strength detecting means comprises:
   first difference value calculating means for calculating gradient values each of which is a difference value between pixel values of pixels included in the region;
   first absolute value calculating means for calculating absolute values of the gradient values;
   first adding means for calculating a sum of the absolute values of the gradient values;
   second adding means for calculating a sum of the gradient values;
   second absolute value calculating means for calculating an absolute value of the sum of the gradient values; and
   second difference value calculating means for calculating a difference value between the sum of the absolute values of the gradient values and the absolute value of the sum of the gradient values as the ridge strength value.

3. The image processing apparatus according to claim 1, further comprising edge strength detecting means for detecting an edge strength that is the magnitude of a change in a pixel value with respect to a positional change in the region.

4. The image processing apparatus according to claim 3, wherein the edge strength detecting means comprises:

difference value calculating means for calculating gradient values each of which is a difference value between pixel values of pixels included in the region;

absolute value calculating means for calculating absolute values of the gradient values; and adding means for calculating a sum of the absolute values of the gradient values as the edge strength.

5. An image processing apparatus comprising:

ridge strength detecting means for detecting a ridge strength that is a strength of a ridge included in an image, the ridge strength means being configured to (a) calculate gradient values within a region of the image based on pixel value differences within the region, and (b) calculate a ridge strength value based on (i) an absolute value of the sum of the gradient values and (ii) a sum of absolute values of each of the gradient values;

edge strength detecting means for detecting an edge strength that is the magnitude of a change in a pixel value with respect to a positional change in the region;

first image processing means for performing image processing for a region that includes a ridge;

second image processing means for performing image processing for a region that includes a step edge;

third image processing means for performing image processing for a flat region in which the magnitude of a change in a pixel value is small; and mixing means for mixing images by performing weighted addition of pixel values of pixels at corresponding positions in a second image which the first image processing means generates by performing image processing upon a first image, a third image which the second image processing means generates by performing image processing upon the first image, and a fourth image which the third image processing means generates by performing image processing upon the first image on the basis of the ridge strength and the edge strength.

6. The image processing apparatus according to claim 5, wherein the first image processing means, the second image processing means, and the third image processing means individually perform image interpolation processing.

7. The image processing apparatus according to claim 6, wherein the first image processing means performs image interpolation processing using an interpolation method capable of preventing occurrence of aliasing distortion due to high-frequency components included in an image.

8. The image processing apparatus according to claim 6, wherein the second image processing means performs image interpolation processing using an interpolation method capable of preventing occurrence of a jaggy at a slanting edge.

9. The image processing apparatus according to claim 6, wherein the third image processing means performs image interpolation processing using an interpolation method capable of preventing occurrence of ringing in a flat region.

10. The image processing apparatus according to claim 5, wherein the first image processing means, the second image processing means, and the third image processing means individually perform image enhancement processing.

11. The image processing apparatus according to claim 10, wherein the first image processing means enhances high-frequency components included in an image which have an amplitude equal to or larger than a first amplitude using a first gain, and wherein the third image processing means enhances high-frequency components included in an image which have an amplitude equal to or larger than a second amplitude using a second gain, the second amplitude being equal to or larger than the first amplitude, the second gain being equal to or smaller than the first gain.

12. The image processing apparatus according to claim 10, wherein the second image processing means performs image enhancement processing using an image enhancement method capable of preventing occurrence of a preshoot and an overshoot at a step edge.

13. The image processing apparatus according to claim 5, wherein the mixing means comprises:

first mixing means for mixing images by performing weighted addition of pixel values of pixels at corresponding positions in the second image and the third image on the basis of the ridge strength; and second mixing means for mixing images by performing weighted addition of pixel values of pixels at corresponding positions in the fourth image and a fifth image generated by the first mixing means on the basis of the edge strength.

14. An image processing method implemented by an electronic processor, the method comprising:

detecting with the electronic processor a ridge strength that is a strength of a ridge included in an image, the ridge strength is detected by:

(a) calculating gradient values within a region of the image based on pixel value differences within the region, and (b) calculating a ridge strength value based on (i) an absolute value of the sum of the gradient values and (ii) a sum of absolute values of each of the gradient values.

15. A computer readable medium with a program stored thereon, which when implemented, causes a computer to perform processing including:

detecting a ridge strength that is a strength of a ridge included in an image, the ridge strength being represented by a ridge strength value that involves:

(a) calculating gradient values within a region of the image based on pixel value differences within the region, and (b) calculating the ridge strength value based on (i) an absolute value of the sum of the gradient values and (ii) a sum of absolute values of each of the gradient values.

16. An image processing apparatus comprising:

a ridge strength detecting unit for detecting a ridge strength that is a strength of a ridge included in an image, the ridge strength detecting unit is configured to (a) calculate gradient values within a region of the image based on pixel value differences within the region, and (b) calculate a ridge strength value based on (i) an absolute value of the sum of the gradient values, and (ii) a sum of absolute values of each of the gradient values.

* * * * *